(12) United States Patent
Gellaboina et al.

(10) Patent No.: US 9,968,899 B1
(45) Date of Patent: May 15, 2018

(54) CATALYST TRANSFER PIPE PLUG DETECTION

(71) Applicant: UOP LLC, Des Plaines, IL (US)

(72) Inventors: Mahesh Kumar Gellaboina, Kurnool (IN); Louis A Lattanzio, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 0 days. days.

(21) Appl. No.: 15/581,989

(22) Filed: Apr. 28, 2017

(51) Int. Cl.
*B01J 8/00* (2006.01)
*B01J 8/08* (2006.01)
*G05B 15/02* (2006.01)

(52) U.S. Cl.
CPC ............. *B01J 8/0015* (2013.01); *B01J 8/082* (2013.01); *G05B 15/02* (2013.01); *B01J 2208/00017* (2013.01); *B01J 2208/00539* (2013.01); *B01J 2208/00548* (2013.01); *B01J 2208/00761* (2013.01)

(58) Field of Classification Search
CPC ..... B01J 4/008; B01J 4/001; B01J 4/00; B01J 4/002; B01J 4/004; B01J 4/005; B01J 4/007; B01J 2208/00752; B01J 2208/00938; B01J 8/0278; B01J 2208/00893
See application file for complete search history.

(56) References Cited

U.S. PATENT DOCUMENTS

| | | | | |
|---|---|---|---|---|
| 2011/0152590 A1* | 6/2011 | Sadler | ................. | C07C 2/58 585/313 |
| 2011/0152591 A1* | 6/2011 | Sadler | ................. | C07C 2/58 585/313 |
| 2014/0114039 A1* | 4/2014 | Benham | ................. | C08F 4/00 526/348.5 |
| 2014/0163275 A1* | 6/2014 | Yanagawa | ............. | B01J 29/047 585/319 |
| 2014/0179968 A1* | 6/2014 | Yanagawa | ............. | C10G 45/68 585/476 |
| 2014/0294683 A1* | 10/2014 | Siedler | ................. | B01J 8/0214 422/129 |
| 2014/0294684 A1* | 10/2014 | Siedler | ................. | B01J 8/0214 422/129 |
| 2014/0296058 A1* | 10/2014 | Sechrist | ................. | B01J 38/10 502/53 |
| 2015/0078970 A1* | 3/2015 | Iddir | ................. | B01J 8/12 422/216 |
| 2015/0098862 A1* | 4/2015 | Lok | ................. | F16L 5/02 422/49 |

* cited by examiner

*Primary Examiner* — Shogo Sasaki
(74) *Attorney, Agent, or Firm* — Banner & Witcoff, Ltd.

(57) ABSTRACT

Apparatuses and methods are disclosed for detecting catalyst transfer pipe plugging in a chemical plant or petrochemical plant or refinery. The catalyst transfer pipe may extend from a reactor to a catalyst collector and enable the flow of catalyst from the reactor to the catalyst collector. Specifically, one or more sensors affixed to a catalyst transfer pipe may collect sensor data for analysis. Based on one or more detected changes in the sensor data outside a range, a data collection platform may send one or more alerts and/or send one or more signals to a control platform to adjust a flow rate, a pressure differential, or perform another action to clear a developing catalyst buildup and thereby attempt to avoid a catalyst transfer pipe from becoming plugged.

20 Claims, 58 Drawing Sheets

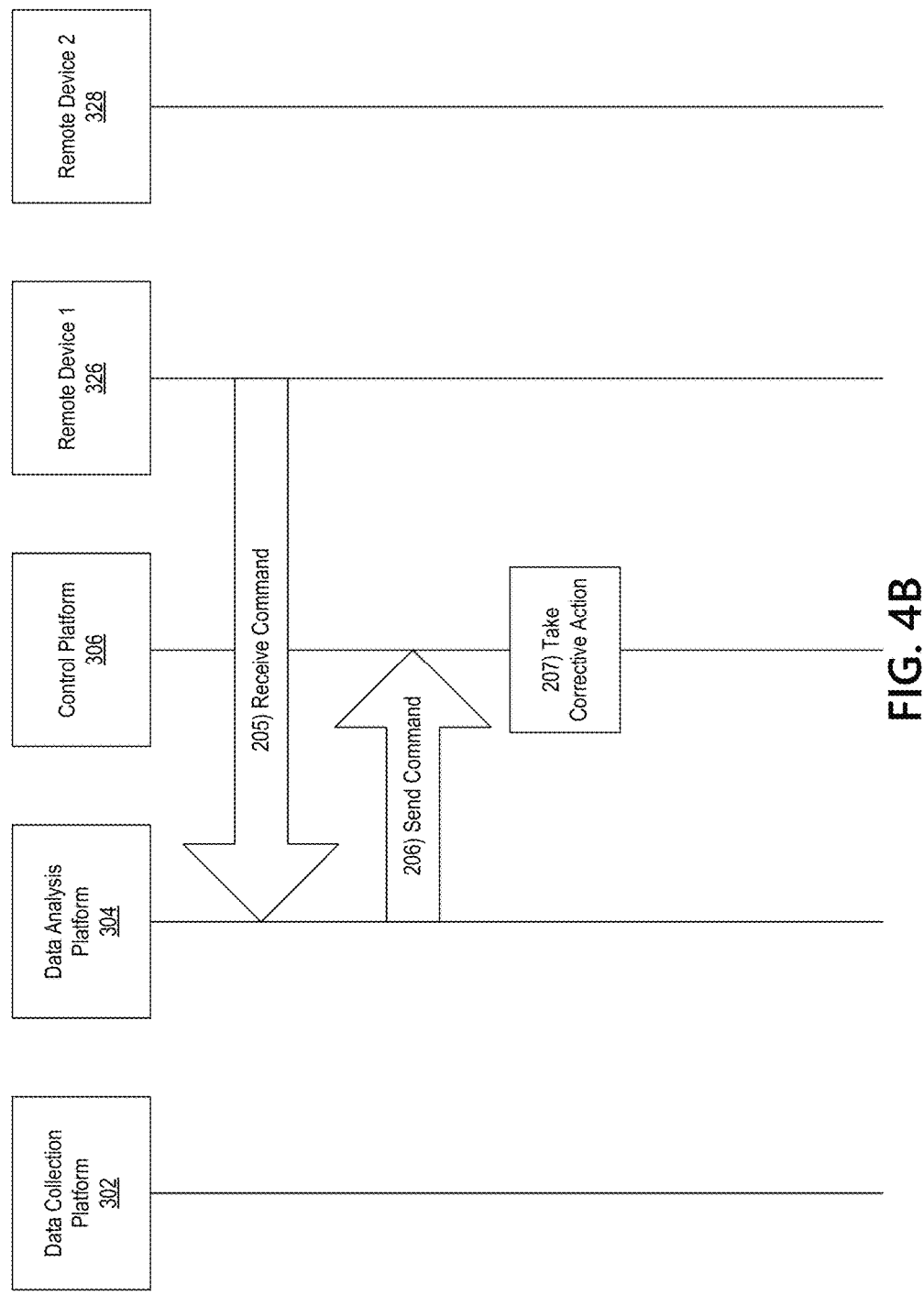

| Pipe | 1 | 2 | 3 | 4 | 5 | 6 | 7 | 8 | 9 | 10 | 11 | 12 |
|---|---|---|---|---|---|---|---|---|---|---|---|---|
| Max TP | 8.4 | 8.4 | 8.4 | 8.4 | 8.4 | 8.4 | 8.4 | 8.4 | 8.4 | 8.4 | 8.4 | 8.4 |
| 8hr TP | 6.8 | 6.8 | 6.8 | 6.8 | 6.8 | 6.8 | 6.8 | 6.8 | 6.8 | 6.8 | 6.8 | 6.8 |
| batch1 | 7.7 | 8.6 | 7.8 | 7.7 | 7.5 | 7.3 | 7.6 | 7.4 | 7.6 | 7.7 | 7.2 | 10.0 |
| batch2 | 8.1 | 7.9 | 8 | 8 | 7.9 | 8.1 | 8.1 | 8.1 | 8.2 | 8.1 | 8 | 9.7 |
| batch3 | 7.6 | 7.4 | 7.5 | 7.3 | 7.6 | 7.3 | 7.4 | 7.2 | 7.4 | 5.9 | 7.5 | 10.4 |
| batch4 | 7.6 | 7.7 | 7.6 | 7.5 | 7.6 | 7.6 | 7.5 | 7.6 | 7.5 | 7.3 | 7.6 | 10.2 |
| batch5 | 8.5 | 8.4 | 8.4 | 7.4 | 7.8 | 7.9 | 8.1 | 7.9 | 8.3 | 7.8 | 7.8 | 9.4 |

FIG. 11

| Pipe | 1 | 2 | 3 | 4 | 5 | 6 | 7 | 8 | 9 | 10 | 11 | 12 |
|---|---|---|---|---|---|---|---|---|---|---|---|---|
| Max PV | 18.7 | 9.4 | 10.66 | 11.85 | 10.69 | 9.37 | 9.7 | 11.26 | 10.18 | 8.45 | 12.57 | 17.59 |
| Min PV | 0.25 | 2.7 | 3.56 | 3.95 | 3.63 | 3.12 | 3.23 | 3.76 | 3.39 | 3.15 | 4.19 | 5.66 |
| batch1 | 13.1 | 8.14 | 8.5 | 9.1 | 9.03 | 7 | 7.6 | 7.3 | 5.79 | 6 | 8.8 | 6.5 |
| batch2 | 12.4 | 8.7 | 8.35 | 7.6 | 7.55 | 7.57 | 7.56 | 6.96 | 4.58 | 7.9 | 7.88 | 17.11 |
| batch3 | 13.5 3 | 8.2 | 7.11 | 7.5 | 8.5 | 8.3 | 7.7 | 7.6 | 8.17 | 7.8 | 9.8 | 3.9 |
| batch4 | 13.6 | 8.48 | 8.44 | 8.36 | 8.29 | 7.47 | 7.61 | 7.47 | 8.6 | 7.57 | 9.02 | 22.14 |
| batch5 | 12.8 2 | 8.25 | 8.48 | 8.86 | 8.6 | 7.11 | 7.5 | 8.5 | 8.3 | 7.89 | 9.48 | 7.4 |

FIG. 13

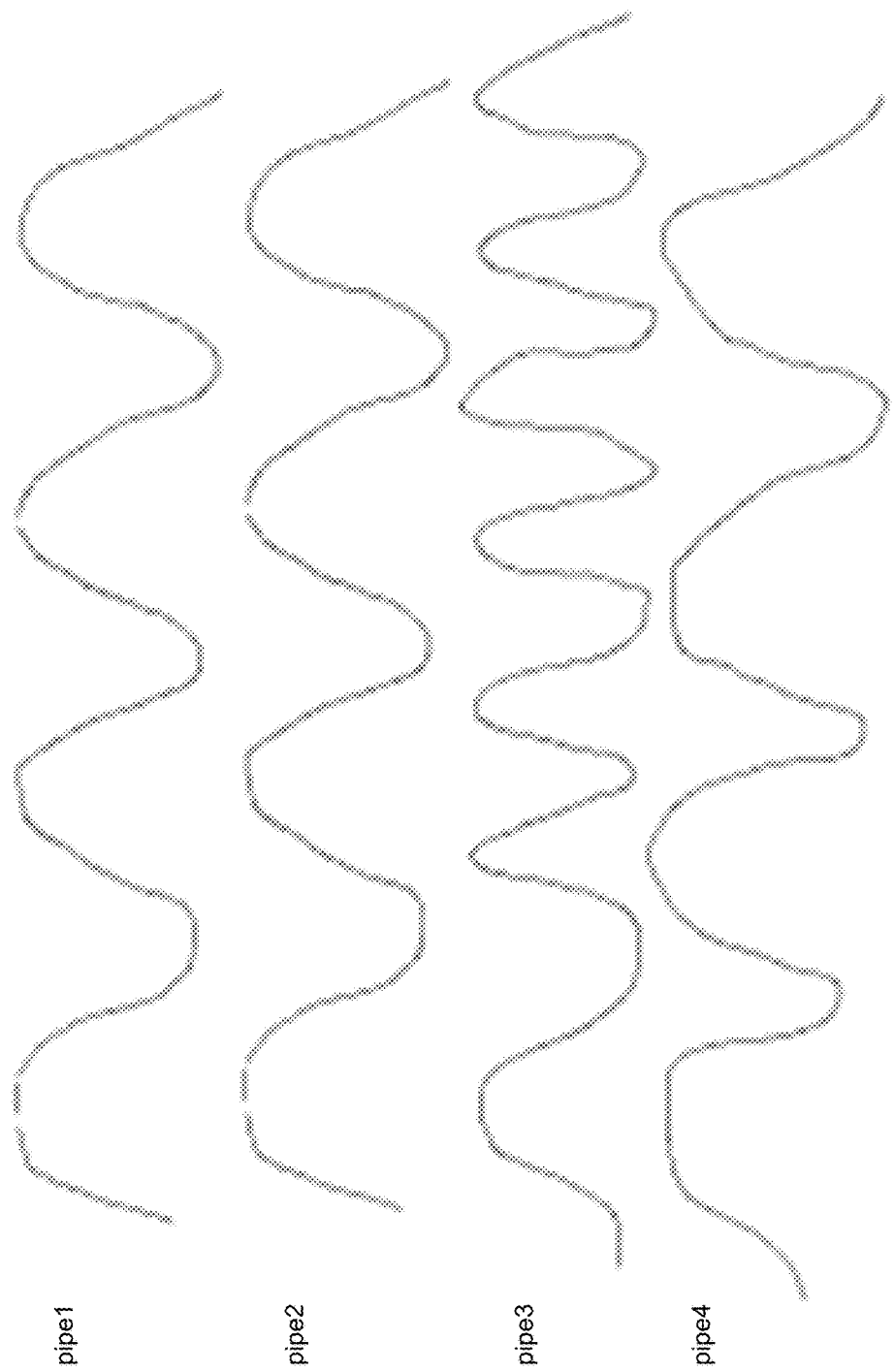

CATALYST TRANSFER PIPE PLUG DETECTION

TECHNICAL FIELD

The disclosure relates generally to an apparatus and method for enhancing a catalyzed reaction system. More particularly, the disclosure relates to a method for enhancing system performance of a catalyzed reaction system by, inter alia, detecting and resolving plug situations in one or more catalyst transfer pipes.

BRIEF DESCRIPTION OF DRAWINGS

The present disclosure is illustrated by way of example and not limited in the accompanying figures in which like reference numerals indicate similar elements and in which:

FIGS. 4A-4B depict an illustrative flow diagram of one or more steps that one more devices may perform in connection with controlling one or more catalyst transfer pipes in accordance with one or more example embodiments;

FIG. 11 depicts an illustrative table of time periods for catalyst transfer pipes in accordance with one or more example embodiments;

FIG. 13 depicts an illustrative table of example peak-to-valley amplitudes for catalyst transfer pipes of a plant in accordance with one or more example embodiments;

FIG. 15B depicts an illustrative graph of pipe signals, where one pipe is experiencing time-period deviation in accordance with one or more example embodiments.

DETAILED DESCRIPTION

Figure 1:
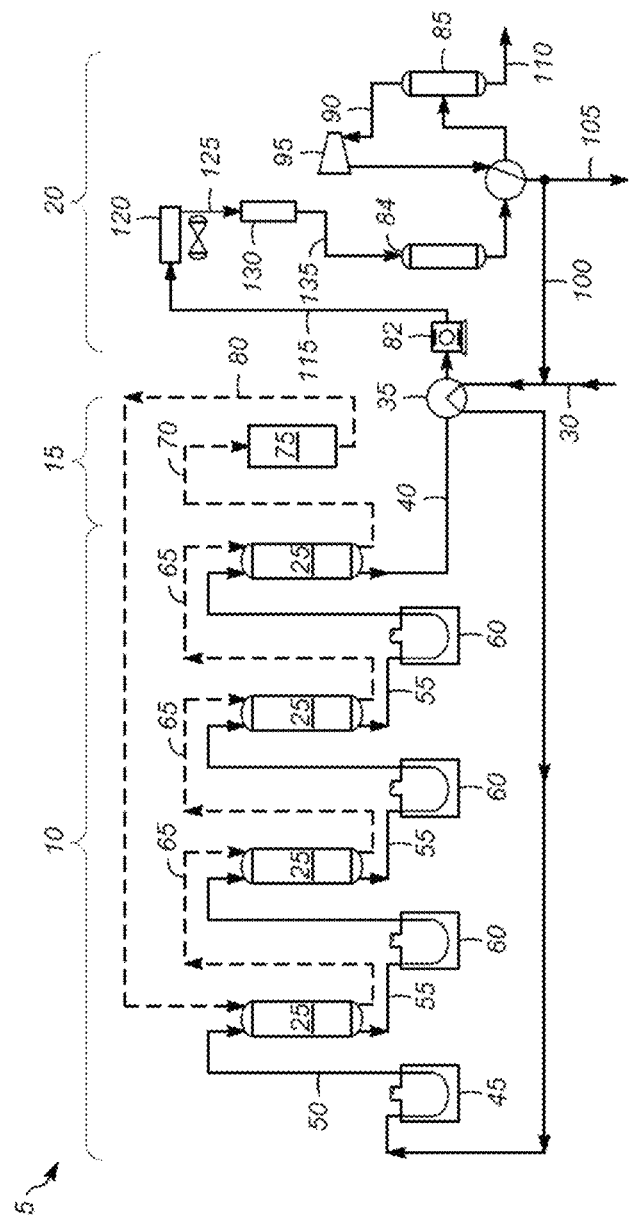
FIG. 1 depicts an illustrative arrangement for a catalytic dehydrogenation process in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

A chemical plant or a petrochemical plant or a refinery may include one or more pieces of equipment that process one or more input chemicals (e.g., in the form of a blend of hydrocarbons) to create one or more products. For example, catalytic dehydrogenation can be used to convert light paraffins to the corresponding olefins having the same number of carbon atoms, such as in the case of converting a feed including propane and/or isobutane to a product including propylene and/or isobutylene.

Elements of chemical and petrochemical/refinery plants may be exposed to the outside and thus can be exposed to various environmental stresses. Such stresses may be weather related, such as temperature extremes (hot and cold), high-wind conditions, and precipitation conditions such as snow, ice, and rain. Other environmental conditions may be pollution particulates, such as dust and pollen, or corrosive agents such as salt if located near an ocean, for example. Such stresses can affect the performance and lifetime of equipment in the plants. Different locations may have different environmental stresses. For example, a refinery in Texas may have different stresses than a chemical plant in Montana.

Process equipment may deteriorate over time, affecting the performance and integrity of the process. Such deteriorating equipment may ultimately fail, but before failing, may contribute to decreased energy efficiency, product yield, and/or product quality (such as increased impurity levels). Any such performance offsets may be related to the functioning of catalysts transfer pipes.

Catalyst transfer pipes may start to plug and eventually plug completely, such that catalyst is prevented from flowing altogether. This can occur during a unit turndown or other event having the potential to result in restricted catalyst flow. Such events can lead to the growth of a layer of stagnated catalyst on the reactor walls and other surfaces and lead to an eventual shut down. The catalyst transfer pipes in each reactor may follow periodic patterns based on cooling and heating during catalyst transfer cycles. Some or all pipes may behave with a similar pattern irrespective of temperature range for each pipe. When there is change in the transfer pipe pattern, an alarm may be raised. Sometimes, an operator might not monitor the catalyst transfer pipes or may be slow to react, and the catalyst transfer pipes become plugged.

A data analysis platform (e.g., data analysis platform 304) may analyze transfer-pipe temperature of one or more pipes in a reactor. An initial temperature profile of the one or more pipes may be taken, and a mean time period computation performed. If a pipe temperature does not follow the mean time period, then an alarm may be raised for a particular pipe.

To perform the time period computation, data analysis platform 304 may perform low pass filtering and then detect peaks in the signal. Distance between peaks may determine a time period of the signal. Each pipe temperature profile may be considered for mean time period computation based on the variance of noise in the signal. Mean time period may be regularly updated when catalyst circulation rate is changed.

Apart from time period, data analysis platform 304 may use the variance of residual to detect whether the signal is noisy or not, with respect to other pipes. Consistency in peak-to-valley amplitude difference may be considered as another metric for abnormality detection. When there is more variation in peak-to-valley amplitude difference, an alarm may be raised.

Auto-correlation may also be used for time period computation. Auto correlation of low-pass filtered signal may be computed, and then peaks may be detected in the auto-correlated signal. The first peak and its corresponding lag may be detected. A time period of the signal may be computed using the lag value. Each pipe temperature profile may be considered for mean time period computation based on the variance of noise in the signal. Mean time period may be regularly updated when catalyst circulation rate is changed. When a signal is periodic and following a stationary process, autocorrelation may be used to detect peaks. When autocorrelation fails, that may be an indicator that the signal is non-stationary, and peak finding algorithms may be used to detect peak in cycles. Furthermore, differences in successive peaks may be used to determine time period. An average of these time periods may be taken as the time period for that time duration of data.

These and other details are described below in connection with the various figures.

FIG. 1 shows one typical arrangement for a catalytic dehydrogenation process 5. The process 5 includes a reactor section 10, a catalyst regeneration section 15, and a product recovery section 20.

The reactor section 10 includes one or more reactors 25. A feed 30 (e.g., including paraffinic $C_3$ and/or $C_4$ hydrocarbons) may be sent to a heat exchanger 35 where it exchanges heat with a reactor effluent 40 to raise the feed temperature. The feed 30 is sent to a preheater 45 where it is heated to the desired inlet temperature. The preheated feed 50 is sent from the preheater 45 to the first reactor 25. Because the dehydrogenation reaction is endothermic, the temperature of the effluent 55 from the first reactor 25 is less than the temperature of the preheated feed 50, according to typical, near-adiabatic operation. The effluent 55 is sent to interstage heaters 60 to raise the temperature to the desired inlet temperature for the next reactor 25.

After the last reactor, the reactor effluent 40 is sent to the heat exchanger 35, and heat is exchanged with the feed 30. The reactor effluent 40 is then sent to the product recovery section 20. The catalyst 65 moves through the series of reactors 25. When the catalyst 70 leaves the last reactor 25, it is sent to the catalyst regeneration section 15. The catalyst regeneration section 15 includes a regenerator 75 where coke on the catalyst is burned off (through combustion with oxygen) and the catalyst may thereafter go through a reconditioning step. A regenerated catalyst 80 is sent back to the first reactor 25.

The reactor effluent 40 is compressed in a compressor 82 (e.g., a positive displacement compressor or centrifugal compressor). The compressed effluent 115 is introduced to a cooler 120, for instance a heat exchanger. The cooler 120 lowers the temperature of the compressed effluent. The cooled effluent 125 (cooled product stream) is then introduced into a chloride remover 130, such as a chloride scavenging guard bed. The chloride remover 130 includes an adsorbent, which adsorbs chlorides from the cooled effluent 125 and provides a treated effluent 135. Treated effluent 135 is introduced to a drier 84.

The dried effluent is separated in separator 85. Gas 90 exiting the overhead of separator 85 is expanded in expander 95 and separated into a recycle hydrogen stream 100 and a net separator gas stream 105. A liquid stream 110 exiting the bottoms of separator 85, the liquid stream 110 including the olefin product and unconverted paraffin, is sent for further processing, where the desired olefin product is recovered and the unconverted paraffin is recycled to the dehydrogenation reactor 25.

References herein to a "plant" are to be understood to refer to any of various types of chemical and petrochemical manufacturing or refining facilities. References herein to a plant "operators" are to be understood to refer to and/or include, without limitation, plant planners, managers, engineers, technicians, technical advisors, specialists (e.g., in instrumentation, pipe fitting, and welding), shift personnel, and others interested in, starting up, overseeing, monitoring operations of, and shutting down, the plant.

Catalyst Transfer

Figure 2A:
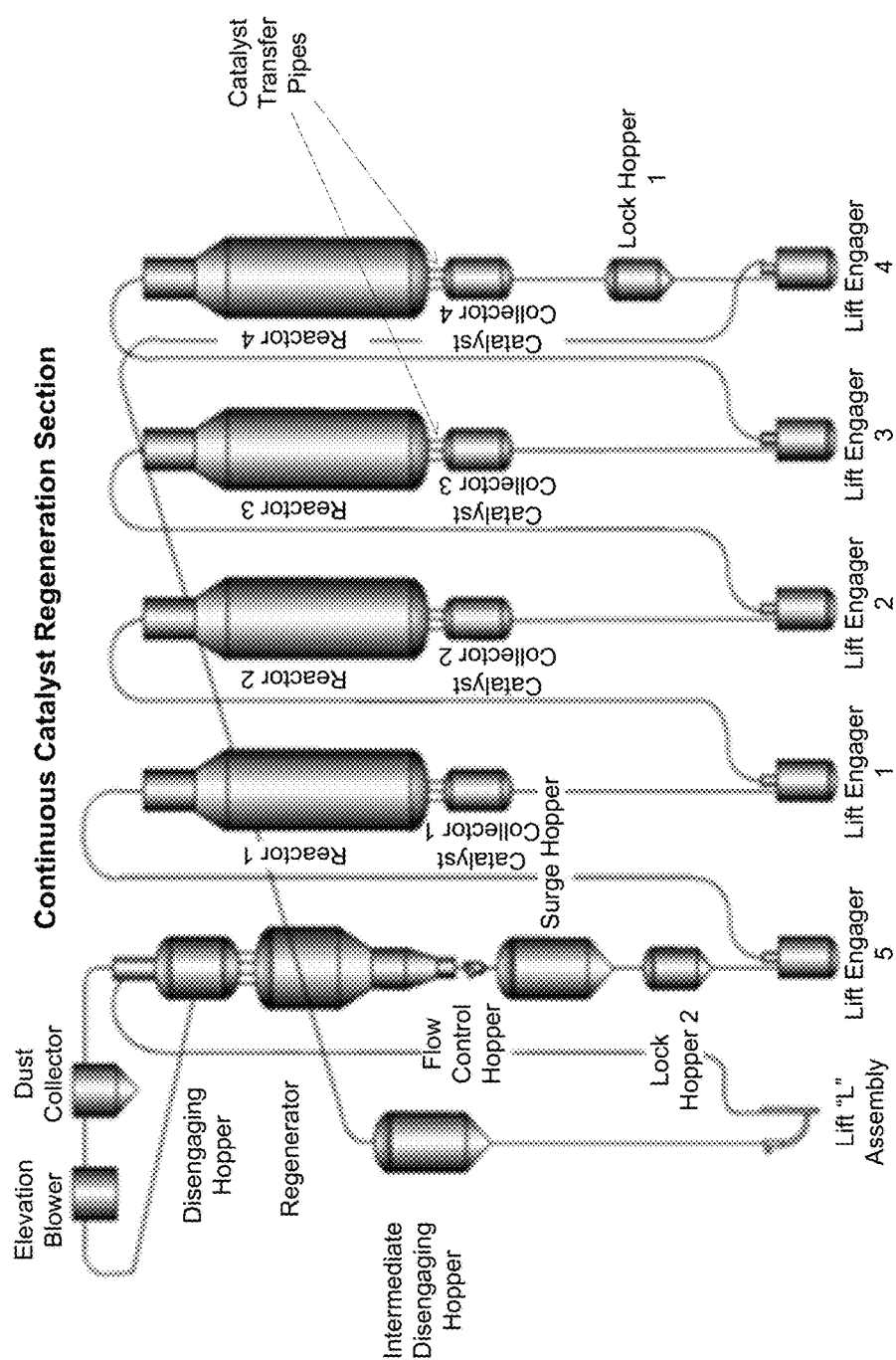
FIG. 2A depicts an illustrative continuous catalyst regeneration sections coupled with multiple reactors in series and their associated catalyst collector arrangements in accordance with one or more example embodiments.

As shown in FIG. 2A, reactors are in communication with a catalyst collector. Catalyst is transferred from each reactor to a respective catalyst collector via one or more catalyst transfer pipes.

Figure 2B:
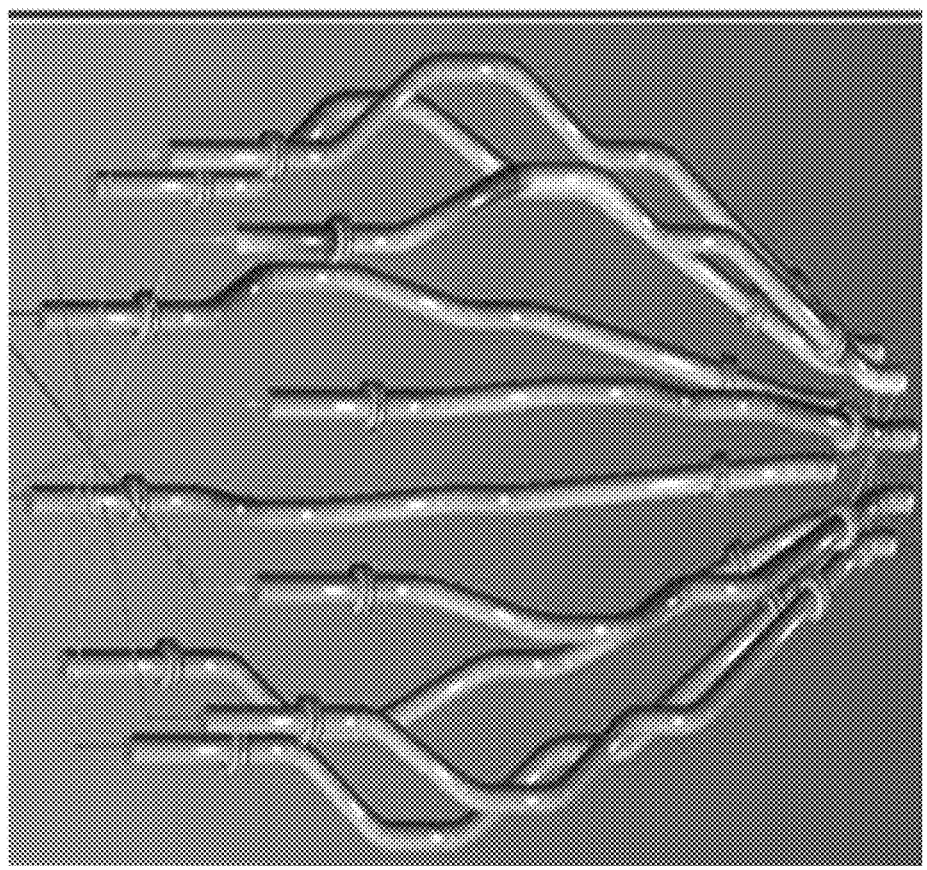
FIG. 2B depicts an illustrative catalyst transfer pipe arrangement in accordance with one or more example embodiments.

FIG. 2B depicts illustrative catalyst transfer pipes that may be used with a catalyst collector in accordance with one or more example embodiments. Catalyst may be transferred from the reactor to the catalyst collector through multiple catalyst transfer pipes. A hole may be drilled in the sides of each catalyst transfer pipe to allow an even catalyst flow. The catalyst transfer pipes keep uniform catalyst movement in the reactor bed above the catalyst collector. Internal catalyst transfer pipes may be 'fluted' to allow more even catalyst flow.

Figure 2C:
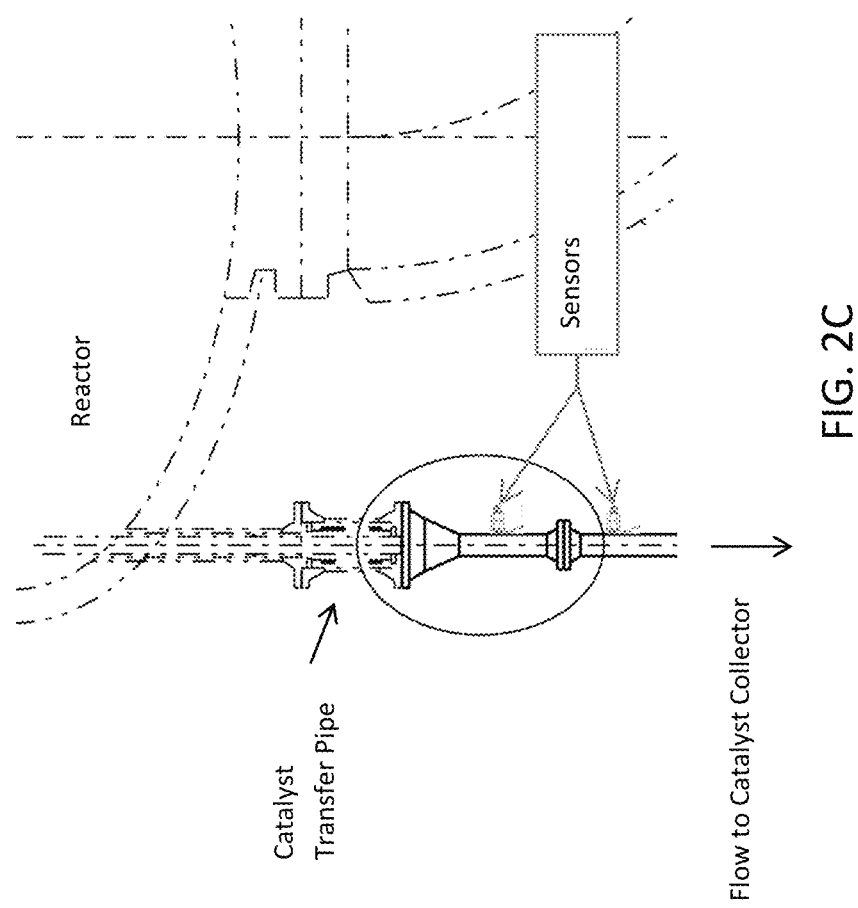
FIG. 2C depicts an illustrative catalyst transfer pipe with potential sensor locations in accordance with one or more example embodiments.

FIG. 2C illustrates a portion of a catalyst transfer pipe extending from a reactor. The catalyst flows out of the reactor, down the pipe, and then into the catalyst collector, as seen in FIG. 2B.

As noted above, the catalysts used in these processes become deactivated, most commonly due to the deposition iron sulfide scale or metallized coke. The catalyst may be removed from the reaction vessel and transported to the separate regenerator for the removal of these deposits. The semi-continuous or continuous transfer of spent catalyst particles from a reaction zone to a regeneration zone for iron sulfide scale and/or metallized coke removal, and the return of regenerated catalyst back to the reaction zone, are commonly practiced in the art.

Problems Encountered

During operation of the catalytic processes, the catalyst transfer pipes which carry the catalyst from a reactor vessel to the regenerator can be affected by a buildup or accumulation of unwanted substances. Such conditions, known as plugging, impede and/or stop the flow of catalyst in the catalyst transfer pipes. Plugging is typically caused by iron sulfide scale that is formed on equipment due to a high $H_2S$ concentration. The iron sulfide scale, in some instances, breaks off (e.g., becomes attrited due to frictional forces) and can impede catalyst flow and/or plug the reactor screens. Alternatively or additionally, the plugging may be caused by metallized coke or a combination of these deposited materials.

Plugging may further be caused by the lift gas not being adjusted properly, which can lead to an excessive generation of catalyst fines (e.g., small particles such as dust) which can also restrict normal catalyst flow. As an analogy, think of mixing sand with marbles and trying to get them to flow through a pipe.

Plugging may further be caused by precipitation of substances from the flow streams from a variety of sources such as crystallization, polymerization, oxidation, decomposition, corrosion, dirt, sediment, sludge, rust, dust, pollen, and biological deposits. Metal surfaces on tubes can act as a catalyst, causing reactions leading to products that may precipitate out and cause plugging.

Plugging leads to reduced capacity or throughput in the catalyst transfer pipes. Such impeded or stopped flow can lead to growth of stagnated portions of catalysts in the reactor vessel (e.g., adhered to the vessel walls or other surfaces) and may lead to a shutdown of the entire system. In other words, the catalyst backs up in the reactor as the flow out of the reactor is impeded.

A suitable pressure differential is needed between the reactor and the catalyst collector to ensure a continuous or steady flow through the pipes. When the reactor pressure relative to the catalyst collector is decreased, flow rates in the catalyst transfer pipe decrease, and plugging in the catalyst transfer pipes can occur, which may be exacerbated by the presence of coke or other deposits on the catalyst, as described above.

It is important, but not always feasible, to determine when the catalyst transfer pipe begins to plug, before the catalyst has had enough time to set with coke. Shortly after this initiation of plug formation, the lump (plug) of catalyst may grow rapidly. Sometimes some of the coked catalyst may break off and fall through one of the flowing catalyst transfer pipes, upsetting the catalyst regeneration operation. Process operators often overlook or cannot detect when such plugs are occurring.

Monitoring the catalyst transfer pipes and the overall processes conditions associated with using catalyst transfer pipes may be performed to determine if there is a reduced flow or a reduced pressure differential, which may lead to a plugging event, and/or to determine if equipment failures are imminent. Such monitoring also may help to collect data that can be correlated and used to predict behavior or problems in different catalyst transfer pipes used in the same plant or in other plants and/or processes.

In some aspects, process changes or operating conditions may be able to be altered to preserve the equipment, for example by allowing process operations to continue until the next scheduled maintenance period. The tracking of production rates, flow rates, and/or temperatures may indicate potential problems with catalyst flow, such as through catalyst transfer pipes.

Sensor Data Collection and Processing

Figure 3A:
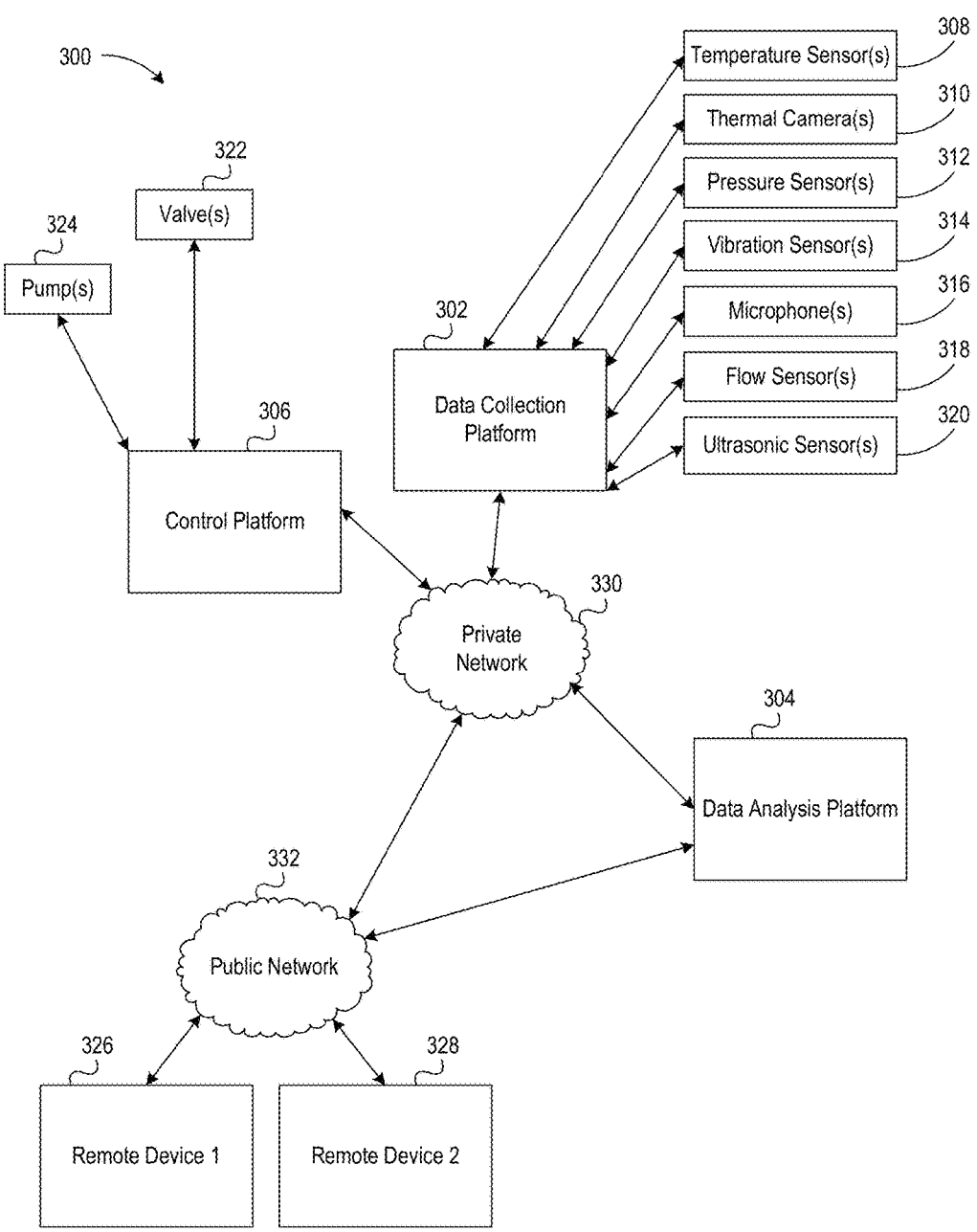
FIG. 3A depicts an illustrative computing environment for managing the operation of one or more catalyst transfer pipes in a plant in accordance with one or more example embodiments.

The system may include one or more computing devices or platforms for collecting, storing, processing, and analyzing data from one or more sensors. FIG. 3A depicts an illustrative computing system that may be implemented at one or more components, pieces of equipment (e.g., catalyst transfer pipes), and/or plants. FIG. 3A-FIG. 3E (hereinafter collectively "FIG. 3"), show, by way of illustration, various components of the illustrative computing system in which aspects of the disclosure may be practiced. It is to be understood that other components may be used, and structural and functional modifications may be made, in one or more other embodiments without departing from the scope of the present disclosure. Moreover, various connections between elements are discussed in the following description, and these connections are general and, unless specified otherwise, may be direct or indirect, wired or wireless, and/or combination thereof, and that the specification is not intended to be limiting in this respect.

FIG. 3A depicts an illustrative operating environment in which various aspects of the present disclosure may be implemented in accordance with example embodiments. The computing system environment 300 illustrated in FIG. 3A is only one example of a suitable computing environment and is not intended to suggest any limitation as to the scope of use or functionality contained in the disclosure. The computing system environment 300 may include various sensor, measurement, and data capture systems, a data collection platform 302, a data analysis platform 304, a control platform 306, one or more networks, one or more remote devices (e.g., first remote device 326, second remote device 328), and/or one or more other elements. The numerous elements of the computing system environment 300 of FIG. 3A may be communicatively coupled through one or more networks. For example, the numerous platforms, devices, sensors, and/or components of the computing system environment 300 may be communicatively coupled through a private network (e.g., private network 330). The sensors be positioned on various components in the plant and may communicate wirelessly or wired with one or more platforms illustrated in FIG. 3A. Private network 330 may include, in some examples, a network firewall device to prevent unauthorized access to the data and devices on private network 330. Alternatively, private network 330 may be isolated from external access through physical means, such as a hard-wired network with no external, direct-access point. The data communicated on private network 330 may be optionally encrypted for further security. Depending on the frequency of collection and transmission of sensor measurements and other data to data collection platform 302, private network 330 may experience large bandwidth usage and be technologically designed and arranged to accommodate for such technological issues. Moreover, the computing system environment 300 may also include a public network (e.g., public network 332) that may be accessible to remote devices (e.g., first remote device 326, second remote device 328). In some examples, a remote device may be located not in the proximity (e.g., more than one mile away) of the various sensor, measurement, and data capture systems illustrated in FIG. 3A. In other examples, a remote device may be physically located inside a plant, but restricted from access to private network 330; in other words, the adjective "remote," need not necessarily require the device to be located at a great distance from the sensor systems and other components.

Although the computing system environment 300 of FIG. 3A illustrates logical block diagrams of numerous platforms and devices, the disclosure is not so limited. In particular, one or more of the logical boxes in FIG. 3 may be combined into a single logical box or the functionality performed by a single logical box may be divided across multiple existing or new logical boxes. For example, aspects of the functionality performed by data collection platform 302 may be incorporated into one or each of the sensor devices illustrated in FIG. 3A. As such, the data collection may occur local to the sensor device, and the enhanced sensor system may communicate directly with one or more of the control platform 306 and/or data analysis platform 304. Such an embodiment is contemplated by FIG. 3A. Moreover, in such an embodiment, the enhanced sensor system may measure values common to a sensor, but may also filter the measurements such just those values that are statistically relevant or of-interest to the computing system environment 300 are transmitted by the enhanced sensor system. As a result, the enhanced sensor system may include a processor (or other circuitry that enables execution of computer instructions) and a memory to store those instructions and/or filtered data values. The processor may be embodied as an application-specific integrated circuit (ASIC), FPGA, or other hardware- or software-based module for execution of instructions. In another example, one or more sensors illustrated in FIG. 3A may be combined into an enhanced, multi-purpose sensor system. Such a combined sensor system may provide economies of scale with respect to hardware components such as processors, memories, communication interfaces, and others.

In yet another example, the data collection platform 302 and data analysis platform 304 may reside on a single server computer and be depicted as a single, combined logical box on a system diagram. Moreover, a data store may be illustrated in FIG. 3A separate and apart from the data collection platform 302 and data analysis platform 304 to store a large amount of values collected from sensors and other components. The data store may be embodied in a database format and may be made accessible to the public network 332; meanwhile, the control platform 306, data collection platform 302, and data analysis platform 304 may be restricted to the private network 330 and left inaccessible to the public network 332. As such, the data collected from a plant may be shared with users (e.g., engineers, data scientists, others), a company's employees, and even third parties (e.g., subscribers to the company's data feed) without compromising potential security requirements related to operation of a plant. The data store may be accessible to one or more users and/or remote devices over public network 332.

Referring to FIG. 3A, process measurements from various sensor and monitoring devices may be used to monitor conditions in, around, and on process equipment (e.g., catalyst transfer pipes). Such sensors may include, but are not limited to, pressure sensors 312, differential pressure sensors, various flow sensors 318, temperature sensors 308 including thermal cameras 310 and skin thermocouples, ultrasonic sensors 320, position sensors, timing sensors, microphones 316, vibration sensors 314, and other sensors commonly found in the refining and petrochemical industry, as is known in the art. Further, process laboratory measurements may be taken using gas chromatographs, liquid chromatographs, distillation measurements, octane measurements, and other laboratory measurements. System operational measurements also can be taken to correlate the system operation to the catalyst transfer pipe measurements.

In addition, sensors may include transmitters and deviation alarms. These sensors may be programmed to set off an alarm, which may be audible and/or visual.

Other sensors may transmit signals to a processor or a hub that collects the data and sends to a processor. For example, temperature and pressure measurements may be sent to a hub (e.g., data collection platform 302). Temperature sensors 308 may include thermocouples, fiber optic temperature measurement, thermal cameras 310, and/or infrared cameras. Skin thermocouples may be applied to catalyst transfer pipes. Alternatively, thermal cameras 310 and/or infrared cameras may be used to detect temperature in all aspects of the equipment. A shielded (insulated) tube skin thermocouple assembly may be used to obtain accurate measurements. One example of a thermocouple may be a removable Xtracto™ Pad. A thermocouple can be replaced without any additional welding. Clips and/or pads may be utilized for ease of replacement. Fiber Optic cable can be attached to a pipe to provide a complete profile of temperatures.

Corrective action may be taken based on this sensor information. For example, if the pipes are showing signs of plugging, corrective actions may be taken, such as taking an adjusting a flow rate through a pipe, adjusting a pressure differential across a pipe, or the like. A shutdown may be required. Some pipes may be safe for continued use, but a monitoring schedule may be implemented or adjusted. These and other details about the equipment, sensors, processing of sensor data, and actions taken based on sensor data are described in further detail below.

Monitoring the catalyst transfer pipes and the processes using catalyst transfer pipes includes collecting data that can be correlated and used to predict behavior or problems in different catalyst transfer pipes used in the same plant or in other plants and/or processes. Data collected from the various sensors may be correlated with external data, such as environmental and/or weather data. Process changes or operating conditions may be altered to preserve the equipment until the next scheduled maintenance period.

Systems Facilitating Sensor Data Collection

Sensor data may be collected by a data collection platform (e.g., data collection platform 302). The sensors may interface with data collection platform 302 via wired or wireless transmissions. Sensor data (e.g., temperature data) may be collected continuously or at random or recurring periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). Data may be collected at different locations at different intervals. For example, data at a pipe that has plugged before may be collected at a first interval, and data at a pipe that has not plugged before may be collected at a second interval. Data collection platform 302 may continuously, sporadically, or periodically (e.g., every second, every minute, every hour, every day, once a week, once a month) transmit collected sensor data to a data analysis platform 304, which may be nearby or remote from data collection platform 302.

Figure 3B:
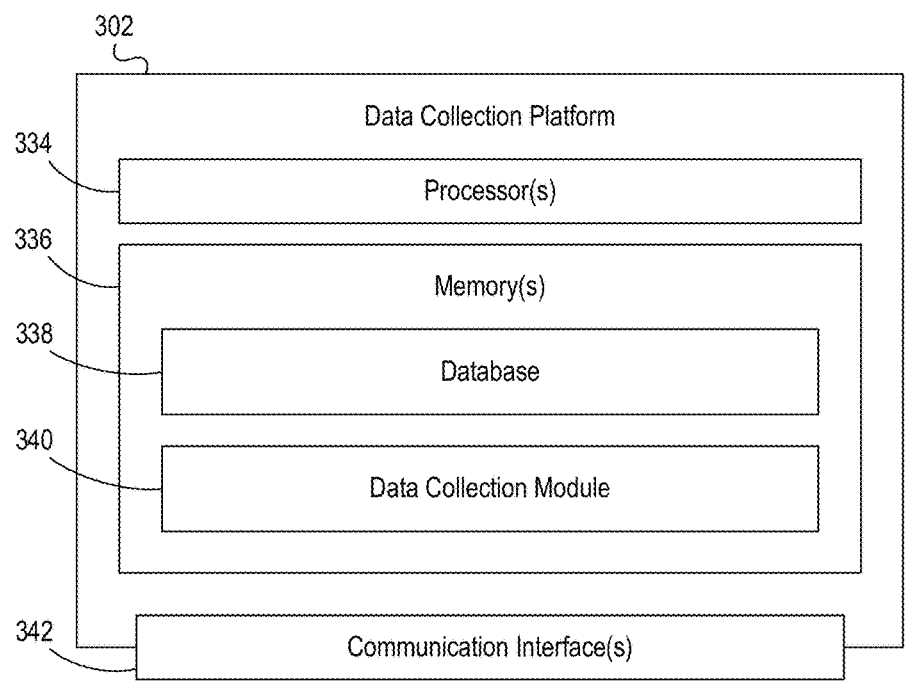
FIG. 3B depicts an illustrative data collection computing platform for collecting data related to the operation of one or more catalyst transfer pipes in a plant in accordance with one or more example embodiments.
Figure 3C:
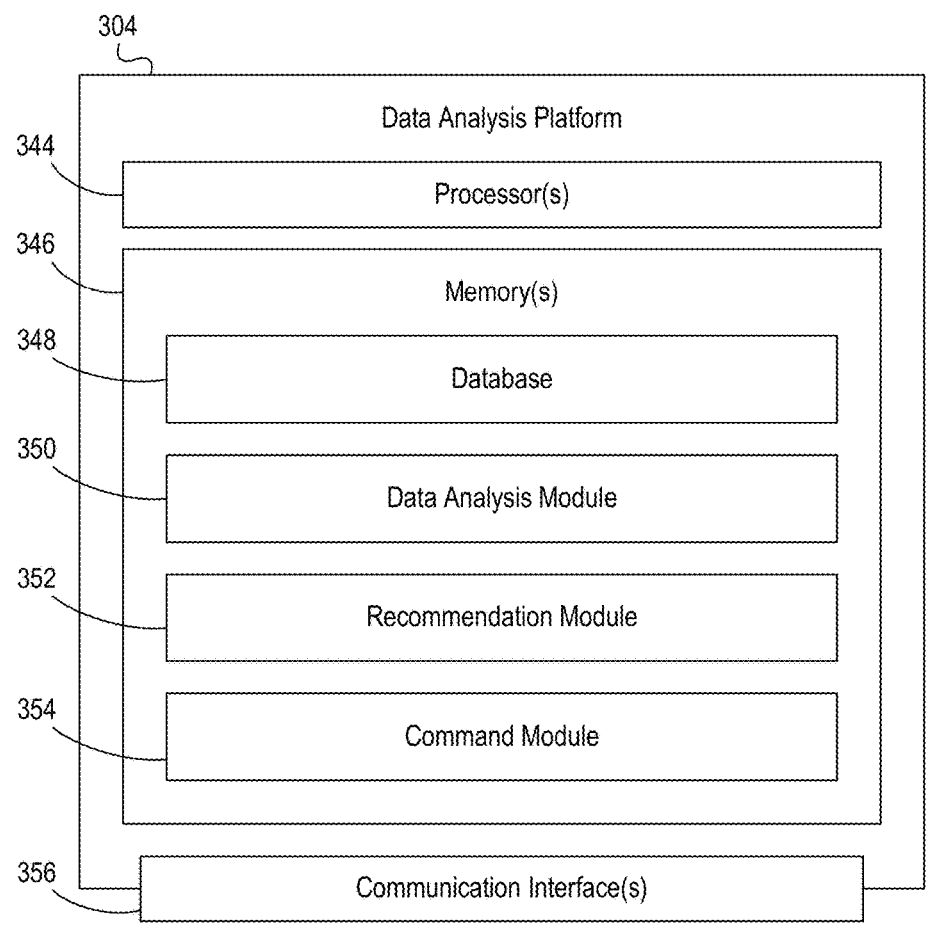
FIG. 3C depicts an illustrative data analysis computing platform for analyzing data related to the operation of one or more catalyst transfer pipes in a plant in accordance with one or more example embodiments.
Figure 3D:
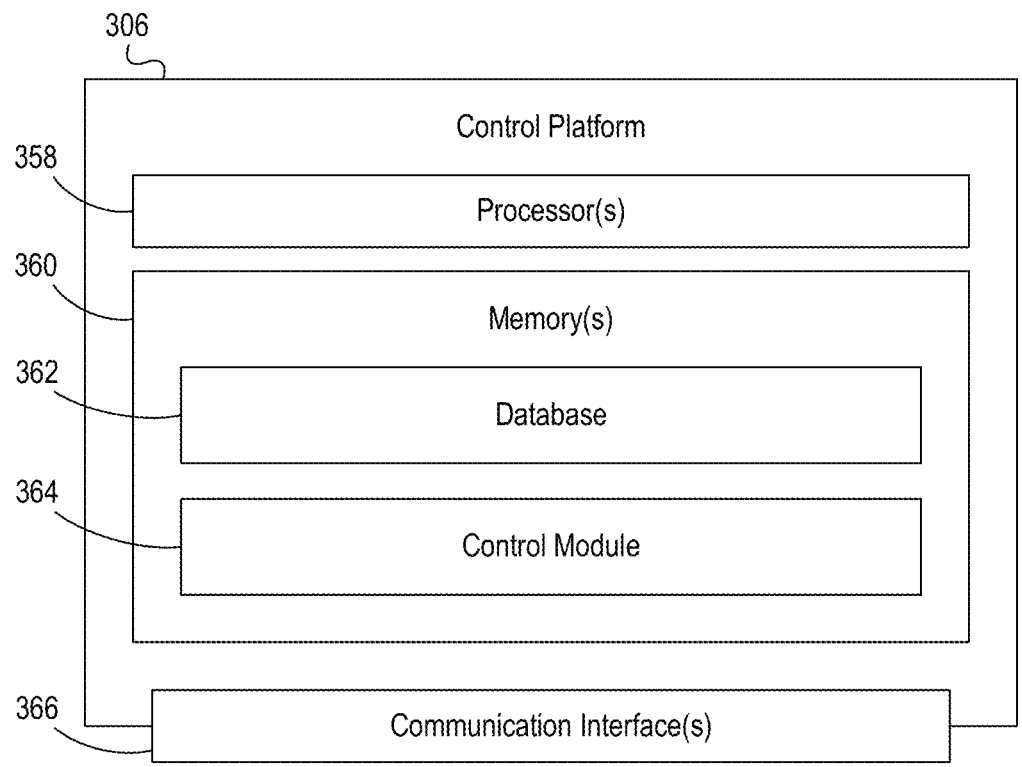
FIG. 3D depicts an illustrative data analysis computing platform for analyzing data related to the operation of one or more catalyst transfer pipes in a plant in accordance with one or more example embodiments.
Figure 3E:
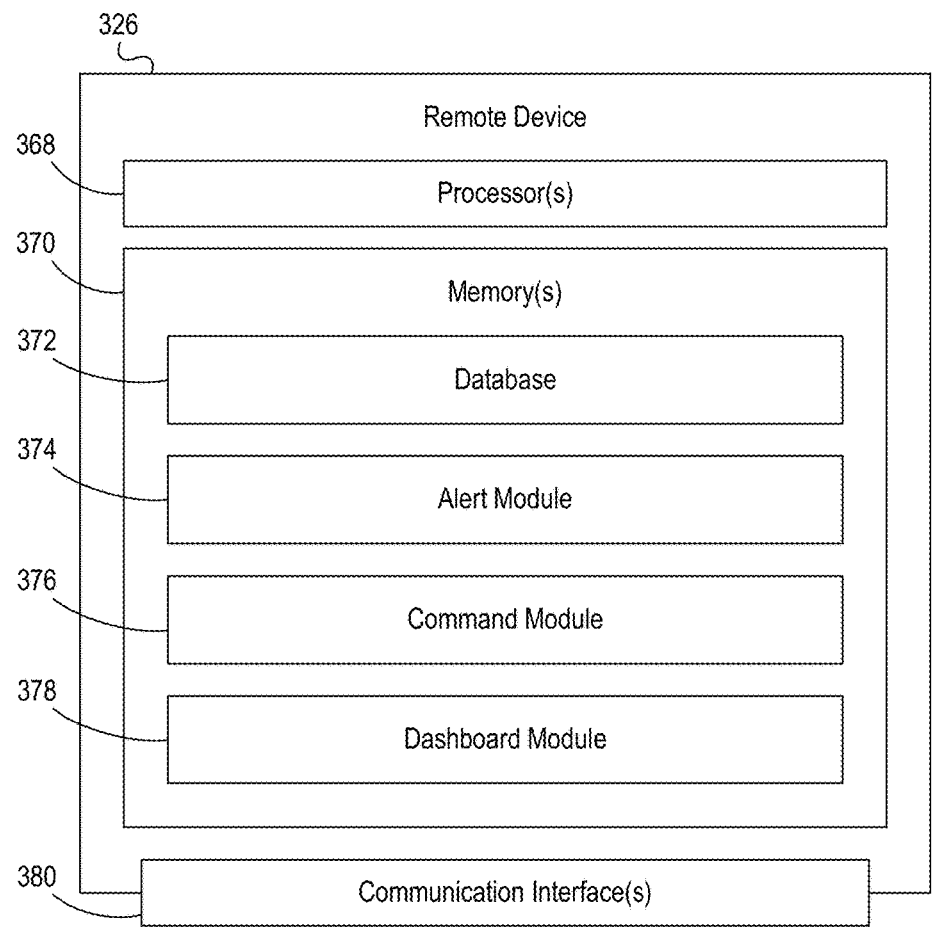
FIG. 3E depicts an illustrative control computing platform for controlling one or more parts of one or more catalyst transfer pipes in a plant in accordance with one or more example embodiments.

The computing system environment 300 of FIG. 3A includes logical block diagrams of numerous platforms and devices that are further elaborated upon in FIG. 3B, FIG. 3C, FIG. 3D, and FIG. 3E. FIG. 3B is an illustrative data collection platform (e.g., data collection platform 302). FIG. 3C is an illustrative data analysis platform (e.g., data analysis platform 304). FIG. 3D is an illustrative control platform (e.g., control platform 306). FIG. 3E is an illustrative remote device (e.g., first remote device 326, second remote device 328). These platforms and devices of FIG. 3 include one or more processing units (e.g., processors) to implement the methods and functions of certain aspects of the present disclosure in accordance with the example embodiments. The processors may include general-purpose microprocessors and/or special-purpose processors designed for particular computing system environments or configurations. For example, the processors may execute computer-executable instructions in the form of software and/or firmware stored in the memory of the platform or device. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, programmable consumer electronics, network PCs, minicomputers, mainframe computers, distributed computing environments that include any of the above systems or devices, and the like.

In addition, the platform and/or devices in FIG. 3 may include one or more memories include any of a variety of computer-readable media. Computer-readable media may be any available media that may be accessed by data collection platform 302, may be non-transitory, and may include volatile and nonvolatile, removable and non-removable media implemented in any method or technology for storage of information such as computer-readable instructions, object code, data structures, database records, program modules, or other data. Examples of computer-readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by data collection platform 302. The memories in the platform and/or devices may further store modules that may include compiled software code that causes the platform, device, and/or overall system to operate in a technologically improved manner as disclosed herein. For example, the memories may store software used by a computing platform, such as operating system, application programs, and/or associated database.

Furthermore, the platform and/or devices in FIG. 3 may include one or more communication interfaces including, but not limited to, a microphone, keypad, touch screen, and/or stylus through which a user of a computer (e.g., first remote device 326, second remote device 328) may provide input, and may also include a speaker for providing audio output and a video display device for providing textual, audiovisual and/or graphical output. The communication interfaces may include a network controller for electronically communicating (e.g., wirelessly or wired) over public network 332 or private network 330 with one or more other components on the network. The network controller may include electronic hardware for communicating over network protocols, including TCP/IP, UDP, Ethernet, and other protocols.

In some examples, one or more sensor devices in FIG. 3A may be enhanced by incorporating functionality that may otherwise be found in a data collection platform (e.g., data collection platform 302). These enhanced sensor system may provide further filtering of the measurements and readings collected from their sensor devices. For example, with some of the enhanced sensor systems in the operating environment illustrated in FIG. 3A, an increased amount of processing may occur at the sensor so as to reduce the amount of data needing to be transferred over private network 330 in real-time to a computing platform. The enhanced sensor system may filter at the sensor itself the measured/collected/captured data and only particular, filtered data may be transmitted to data collection platform 302 for storage and/or analysis.

Referring to FIG. 3B, in one example, a data collection platform (e.g., data collection platform 302) may include a processor 334, one or more memories 336, and communication interfaces 342. The memory may include a database 338 for storing data records of various values collected from one or more sources. In addition, a data collection module 340 may be stored in the memory and assist the processor in data collection platform 302 in communicating with, via communications interface 342, one or more sensor, measurement, and data capture systems, and processing the data received from these sources. In some embodiments, data collection module 340 may include computer-executable instructions that, when executed by the processor, cause data collection platform 302 to perform one or more of the steps disclosed herein. In other embodiments, data collection module 340 may be a hybrid of software-based and/or hardware-based instructions to perform one or more of the steps disclosed herein. In some examples, data collection module 340 may assist an enhanced sensor system with further filtering the measurements and readings collected from the sensor devices. Although the elements of FIG. 3B are illustrated as logical block diagrams, the disclosure is not so limited. In particular, one or more of the logical boxes in FIG. 3B may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while database 338 in FIG. 3B is illustrated as being stored inside one or more memories 336 in data collection platform 302, FIG. 3B contemplates that database 338 may be stored in a standalone data store communicatively coupled to data collection module 340 and processor 334 of data collection platform 302 via communications interface 342 of data collection platform 302.

In addition, data collection module 340 may assist processor 334 in data collection platform 302 in communicating with, via communications interface 342, and processing data received from other sources, such as data feeds from third-party servers and manual entry at the field site from a dashboard graphical user interface. For example, a third-party server may provide contemporaneous weather data to data collection module 340. Some elements of chemical and petrochemical/refinery plants may be exposed to the outside and thus may be exposed to various environmental stresses. Such stresses may be weather related such as temperature extremes (hot and cold), high wind conditions, and precipitation conditions such as snow, ice, and rain. Other environmental conditions may be pollution particulates such as dust and pollen, or salt if located near an ocean, for example. Such stresses can affect the performance and lifetime of equipment in the plants. Different locations may have different environmental stresses. For example, a refinery in Texas may have different stresses than a chemical plant in Montana. In another example, data manually entered from a dashboard graphical user interface (or other means) may be collected and saved into memory by the data collection module. Production rates may be entered and saved in memory. Tracking production rates may indicate issues with plugging.

Referring to FIG. 3C, in one example, a data analysis platform (e.g., data analysis platform 304) may include a processor 344, one or more memories 346, and communication interfaces 356. Memory 346 may include a database 348 for storing data records of various values collected from one or more sources. Alternatively, database 348 may be the same database (e.g., database 338) as that depicted in FIG. 3B and data analysis platform 304 may communicatively couple with the database via communication interface 356 of data analysis platform 304. At least one advantage of sharing a database between the two platforms is the reduced memory requirements due to not duplicating the same or similar data. In addition, a data analysis module 350 may be stored in memory 346 and assist processor 344 in data analysis platform 304 in processing and analyzing the data values stored in database 348. In some embodiments, data analysis module 350 may include computer-executable instructions that, when executed by processor 344, cause data analysis platform 304 to perform one or more of the steps disclosed herein. In other embodiments, data analysis module 350 may be a hybrid of software-based and/or hardware-based instructions to perform one or more of the steps disclosed herein. In some embodiments, data analysis module 350 may perform statistical analysis, predictive analytics, and/or machine learning on the data values in database 348 to generate predictions and models. For example, data analysis platform 304 may analyze sensor data to detect new problems and/or to monitor existing problems (e.g., to determine if an existing problem is growing, maintaining the same severity, or shrinking) in the equipment of a plant. Data analysis platform 304 may compare temperature or other data from different dates to determine if changes are occurring. Such comparisons may be made on a monthly, weekly, daily, hourly, real-time, or some other basis.

Referring to FIG. 3C, recommendation module 352 in data analysis platform 304 may coordinate with data analysis module 350 to generate recommendations for adjusting one or more parameters for the operation of the plant environment depicted in FIG. 3A. In some embodiments, recommendation module 352 may communicate the recommendation to command module 354, which may generate command codes that may be transmitted, via communications interface 356, to cause adjustments or halting/starting of one or more operations in the plant environment. The command codes may be transmitted to a control platform (e.g., control platform 306) for processing and/or execution. In an alternative embodiment, the command codes may be directly communicated, either wirelessly or in a wired fashion, to physical components at the plant such that the physical components include an interface to receive the commands and execute on them.

Although the elements of FIG. 3C are illustrated as logical block diagrams, the disclosure is not so limited. In particular, one or more of the logical boxes in FIG. 3C may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while database 348 is visually depicted in FIG. 3C as being stored inside one or more memories 346 in data analysis platform 304, FIG. 3C contemplates that database 348 may be stored in a standalone data store communicatively coupled to data analysis module 350 and processor 344 of data analysis platform 304 via communications interface 356 of data analysis platform 304. Furthermore, the databases from multiple plant locations may be shared and holistically analyzed to identify one or more trends and/or patterns in the operation and behavior of the plant and/or plant equipment. In such a crowdsourcing-type example, a distributed database arrangement may be provided where a logical database may simply serve as an interface through which multiple, separate databases may be accessed. As such, a computer with predictive analytic capabilities may access the logical database to analyze, recommend, and/or predict the behavior of one or more aspects of plants and/or equipment. In another example, the data values from a database from each plant may be combined and/or collated into a single database where predictive analytic engines may perform calculations and prediction models.

Referring to FIG. 3D, in one example, control platform 306 may include a processor 358, one or more memories 360, and communication interfaces 366. Memory 360 may include a database 362 for storing data records of various values transmitted from a user interface, computing device, or other platform. The values may include parameter values for particular equipment at the plant. For example, some illustrative equipment at the plant that may be configured and/or controlled by control platform 306 includes, but is not limited to, one or more valves 322 and/or one or more pumps 324. In addition, a control module 364 may be stored in memory 360 and assist processor 358 in control platform 306 in receiving, storing, and transmitting the data values stored in database 362. In some embodiments, control module 364 may include computer-executable instructions that, when executed by processor 358, cause control platform 306 to perform one or more of the steps disclosed herein. In other embodiments, control module 364 may be a hybrid of software-based and/or hardware-based instructions to perform one or more of the steps disclosed herein.

In a plant environment such as illustrated in FIG. 3A, if sensor data is outside of a safe range, this may be cause for immediate danger. As such, there may be a real-time component to the system such that the system processes and responds in a timely manner. Although in some embodiments, data could be collected and leisurely analyzed over a lengthy period of months, numerous embodiments contemplate a real-time or near real-time responsiveness in analyzing and generating alerts, such as those generated or received by the alert module in FIG. 3E.

Referring to FIG. 3E, in one example, a remote device (e.g., first remote device 326) may include a processor 368, one or more memories 370, and communication interfaces 380. Memory 370 may include a database 372 for storing data records of various values entered by a user or received through communications interface 380. In addition, an alert module 374, command module 376, and/or dashboard module 378 may be stored in memory 370 and assist processor 368 in processing and analyzing the data values stored in database 372. In some embodiments, the aforementioned modules may include computer-executable instructions that, when executed by processor 368, cause the remote device to perform one or more of the steps disclosed herein. In other embodiments, the aforementioned modules may be a hybrid of software-based and/or hardware-based instructions to perform one or more of the steps disclosed herein. In some embodiments, the aforementioned modules may generate alerts based on values received through the communications interface. The values may indicate a dangerous condition or even merely a warning condition due to odd sensor readings. Command module 376 in the remote device may generate a command that, when transmitted through communications interface 380 to the platforms at the plant, causes adjustment of one or more parameter operations of the plant environment depicted in FIG. 3A. In some embodiments, dashboard module 378 may display a graphical user interface to a user of the remote device to enable the user to enter desired parameters and/or commands. Dashboard module 378 may receive parameters and/or commands via the graphical user interface. These parameters and/or commands may be transmitted to command module 376 to generate the appropriate resulting command codes that may be then transmitted, via communications interface 380, to cause adjustments or halting/starting of one or more operations in the plant environment. The command codes may be transmitted, for example, to control platform 306 for processing and/or execution. In an alternative embodiment, the command codes may be directly communicated, either wirelessly or in a wired fashion, to physical components at the plant such that the physical components include an interface to receive the commands and execute them.

Although FIG. 3E is not so limited, in some embodiments the remote device may include a desktop computer, a smartphone, a wireless device, a tablet computer, a laptop computer, and/or the like. The remote device may be physically located locally or remotely, and may be connected by one of communications links to a public network (e.g., public network 332) that is linked via a communications link to a private network (e.g., private network 330). The network used to connect the remote device may be any suitable computer network, such as the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links may be any communications links suitable for communicating between workstations and server, such as network links, dial-up links, wireless links, hard-wired links, as well as network types developed in the future, and the like. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

Although the elements of FIG. 3E are illustrated as logical block diagrams, the disclosure is not so limited. In particular, one or more of the logical boxes in FIG. 3E may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while database 372 is visually depicted in FIG. 3E as being stored inside one or more memories 370 in the remote device, FIG. 3E contemplates that database 372 may be stored in a standalone data store communicatively coupled, via communications interface 380, to the modules stored at the remote device and processor 368 of the remote device.

Referring to FIG. 3, in some examples, the performance of operation in a plant may be improved by using a cloud computing infrastructure and associated methods, as described in U.S. Patent Application Publication No. US2016/0260041, which was published Sep. 8, 2016, and which is herein incorporated by reference in its entirety. The methods may include, in some examples, obtaining plant operation information from the plant and/or generating a plant process model using the plant operation information. The method may include receiving plant operation information over the Internet, or other computer network (including those described herein) and automatically generating a plant process model using the plant operation information. These plant process models may be configured and used to monitor, predict, and/or optimize performance of individual process units, operating blocks and/or complete processing systems. Routine and/or frequent analysis of predicted versus actual performance may further allow early identification of operational discrepancies which may be acted upon to optimize impact, including financial or other impact.

The aforementioned cloud computing infrastructure may use a data collection platform (e.g., data collection platform 302) associated with a plant to capture data, e.g., sensor measurements, which are automatically sent to the cloud infrastructure, which may be remotely located, where the data may be reviewed to, for example, eliminate errors and biases, and used to calculate and report performance results. The data collection platform (e.g., data collection platform 302) may include an optimization unit that acquires data from a customer site, other site, and/or plant (e.g., sensors and other data collectors at a plant) on a recurring basis. For cleansing, the data may be analyzed for completeness and corrected for gross errors by the optimization unit. The data may also be corrected for measurement issues (e.g., an accuracy problem for establishing a simulation steady state) and overall mass balance closure to generate a duplicate set of reconciled plant data. The corrected data may be used as an input to a simulation process, in which the process model may be tuned to ensure that the simulation process matches the reconciled plant data. An output of the reconciled plant data may be used to generate predicted data using a collection of virtual process model objects as a unit of process design.

The performance of the plant and/or individual process units of the plant is/are compared to the performance predicted by one or more process models to identify any operating differences or gaps. Furthermore, the process models and collected data (e.g., plant operation information) may be used to run optimization routines that converge on an optimal plant operation for a given values of, e.g., feed, products, and/or prices. For example, the system may determine an optimum reactor-to-catalyst-collector DP. Based on the cycling of the catalyst transfer pipes, the process model may recommend to increase DP if one or more of the pipes are not flowing correctly. Then, an operator and/or control platform 306 may increase the DP. The system may store a value defining a maximum DP. The DP may be increased until the system receives an acknowledgement that the catalyst transfer pipe or pipes experiencing flow problems are now experiencing normal flow. In some embodiments, the system and/or the operator may wait a threshold number of cycles (e.g., one cycle, two cycles, three cycles, four cycles, five cycles, six cycles, ten cycles) and/or a threshold amount of time (e.g., one hour, two hours, three hours, four hours, 12 hours, 24 hours, two days, three days, four days, one week), and monitor the one or more catalyst transfer pipes that were experiencing flow issues to determine whether those flow issues have recurred. Then, the system and/or the operator may slowly reduce the DP, and monitor the flow through the one or more catalyst control pipes to determine whether the flow continues to operate normally. The DP may be lowered to the design DP or to a newly determined optimum DP that is similar to, slightly lower than, or slightly higher than the design DP. In some aspects, the increasing DP, holding, and lowering DP may be an iterative process that is performed one or more times, based on monitoring of the catalyst transfer pipes. Specifically, if a catalyst transfer pipe begins to experience flow issues and/or plugging after the DP is lowered, the DP may be raised again to attempt to resolve the flow issues. A routine may be understood to refer to a sequence of computer programs or instructions for performing a particular task. Thereby, the monitoring and/or adjusting of the catalyst flow and/or DP may be performed by an operator or may be performed by one or more computing devices. For example, a PDIC controller (e.g., a differential pressure controller) may be used to obtain the set point from data analysis platform 304 and use the set-point information to control the catalyst transfer pipe(s).

Data analysis platform 304 may include an analysis unit that determines operating status, based on at least one of a kinetic model, a parametric model, an analytical tool, and/or a related knowledge and best practice standard. The analysis unit may receive historical and/or current performance data from one or a plurality of plants to proactively predict future actions to be performed. To predict various limits of a particular process and stay within the acceptable range of limits, the analysis unit may determine target operational parameters of a final product based on actual current and/or historical operational parameters. This evaluation by the analysis unit may be used to proactively predict future actions to be performed. In another example, the analysis unit may establish a boundary or threshold of an operating parameter of the plant based on at least one of an existing limit and an operation condition. In yet another example, the analysis unit may establish a relationship between at least two operational parameters related to a specific process for the operation of the plant. Finally, in yet another example, one or more of the aforementioned examples may be performed with or without a combination of the other examples.

The plant process model predicts plant performance that is expected based upon the plant operation information, e.g., how the plant is operated. The plant process model results can be used to monitor the health of the plant and to determine whether any upset or poor measurement occurred. The plant process model is desirably generated by an iterative process that models at various plant constraints to determine the desired plant process model.

Using a web-based system for implementing the method of this disclosure provides many benefits, such as improved plant economic performance due to an increased ability by plant operators to identify and capture economic opportunities, a sustained ability to bridge plant performance gaps, and an increased ability to leverage personnel expertise and improve training and development. Some of the methods disclosed herein allow for automated daily evaluation of process performance, thereby increasing the frequency of performance review with less time and effort required from plant operations staff.

Further, the analytics unit may be partially or fully automated. In one embodiment, the system may be performed by a computer system, such as a third-party computer system, remote from the plant and/or the plant planning center. The system may receive signals and parameters via the communication network, and displays in real time related performance information on an interactive display device accessible to an operator or user. The web-based platform allows all users to work with the same information, thereby creating a collaborative environment for sharing best practices or for troubleshooting. The method further provides more accurate prediction and optimization results due to fully configured models. Routine automated evaluation of plant planning and operation models allows timely plant model tuning to reduce or eliminate gaps between plant models and the actual plant performance. Implementing the aforementioned methods using the web-based platform also allows for monitoring and updating multiple sites, thereby better enabling facility planners to propose realistic optimal targets.

Figure 4A:
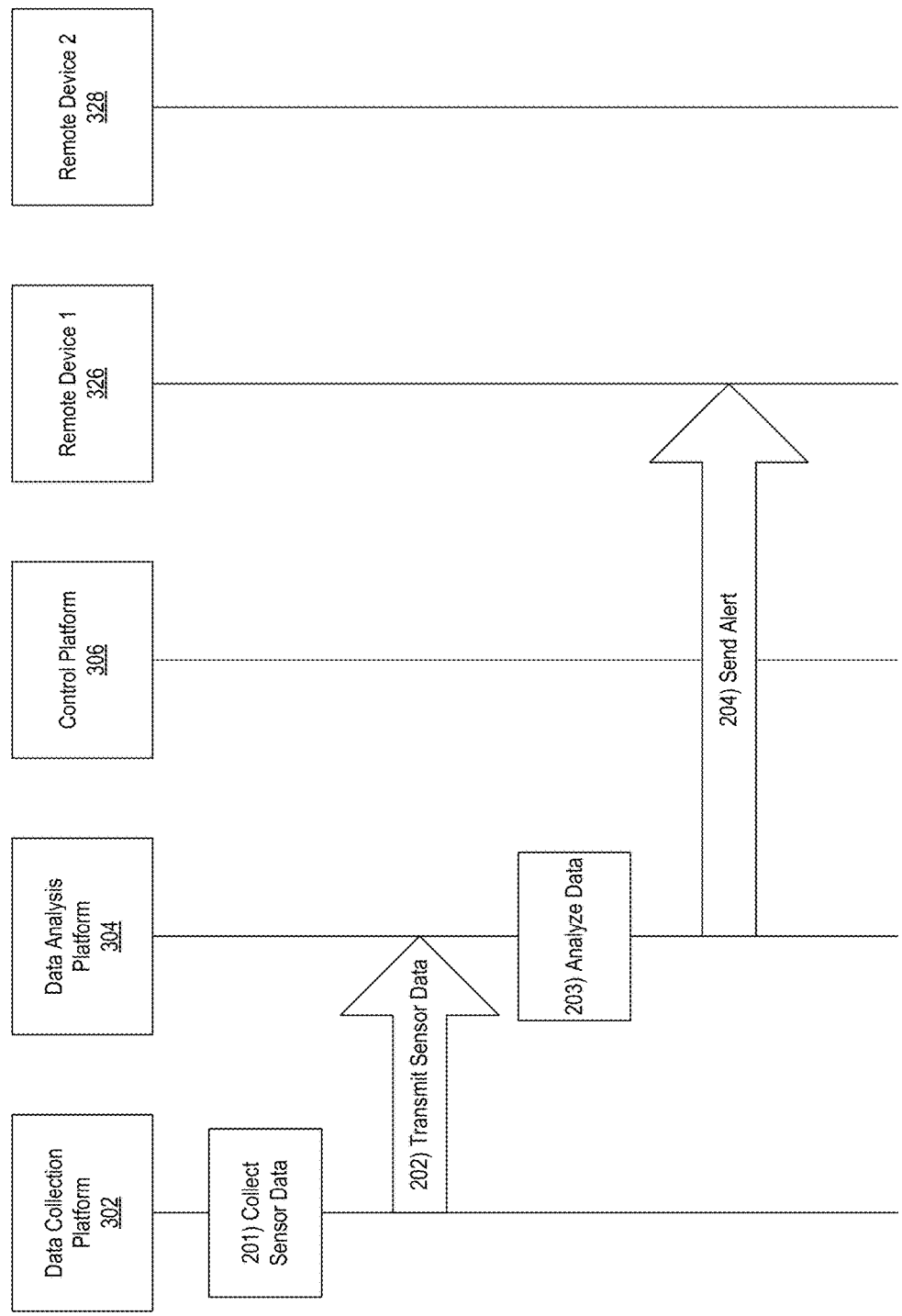

FIGS. 4A-4B depict illustrative system flow diagrams in accordance with one or more embodiments described herein. As shown in FIG. 4A, in step 201, data collection platform 302 may collect sensor data. In step 202, data collection platform 302 may transmit sensor data to data analysis platform 304. In step 203, data analysis platform 304 may analyze data. In step 204, data analysis platform 304 may send an alert to a first remote device 326 and/or a second remote device 328.

As shown in FIG. 4B, in step 205, data analysis platform 304 may receive a command from a first remote device 326 and/or a second remote device 328. In some embodiments, control platform 306 may receive the command from a first remote device 326 and/or a second remote device 328. In step 206, data analysis platform 304 may send a command to control platform 306. In some embodiments, the command may be similar to the command received from a first remote device 326 and/or a second remote device 328. In some embodiments, data analysis platform 304 may perform additional analysis based on the received command from a first remote device 326 and/or a second remote device 328 before sending a command to control platform 306. In step 207, control platform 306 may take corrective action. The corrective action may be based on the command received from data analysis platform 304, a first remote device 326 and/or a second remote device 328. The corrective action may be related to one or more pieces of equipment (e.g., catalyst transfer pipes) associated with sensors that collected the sensor data in step 201.

Figure 8:
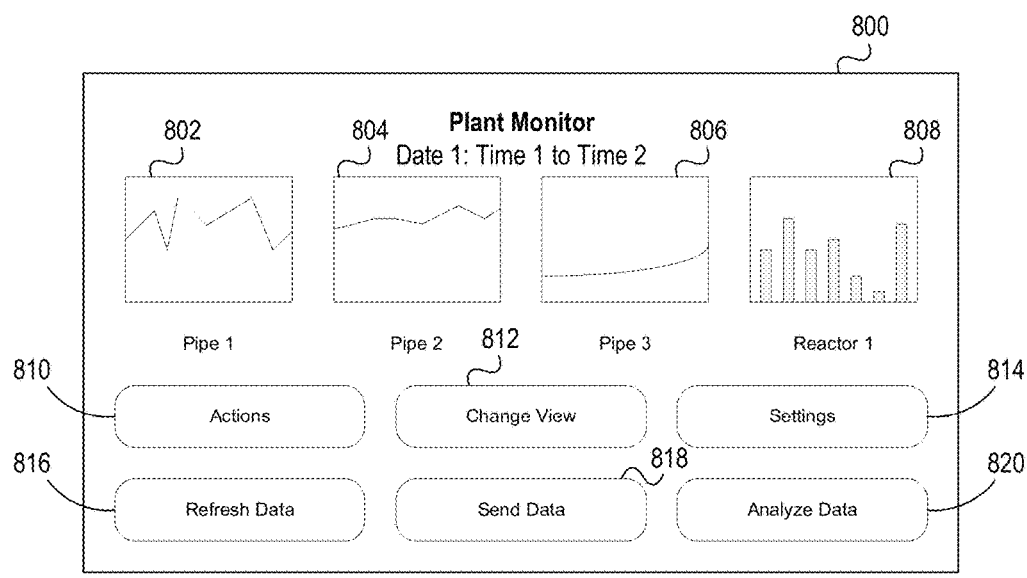
FIGS. 8-9 depict illustrative graphical user interfaces related to one or more catalyst transfer pipes of a plant in accordance with one or more example embodiments.

FIG. 8 depicts an illustrative graphical user interface 800 of an application that may be used for providing information received from one or more sensors or determined based on analyzing information received from one or more sensors, according to one or more embodiments described herein. Graphical user interface 800 may be displayed as part of a smartphone application (e.g., running on a remote device, such as first remote device 326 or second remote device 328), a desktop application, a web application (e.g., that runs in a web browser), a web site, an application running on a plant computer, or the like.

Graphical user interface 800 may include one or more visual representations of data (e.g., charts/graphs 802, 804, 806, 808) that shows information about a plant, a particular piece of equipment in a plant, or a process performed by a plant or a particular piece or combination of equipment in the plant. For example, a graph may show information about an operating condition, an efficiency, a production level, or the like. Graphical user interface 800 may include a description of the equipment, the combination of equipment, or the plant to which the visual display of information pertains.

In another example, graphical user interface 800 may include a graphical representation of one or more pipes (e.g., connected to a catalyst). If a pipe is operating according to a particular condition, then the pipe may be displayed in a particular mode (e.g., in a particular color, with an outline, with a highlight). For example, if a pipe is operating normally, the pipe may be displayed in blue. If the pipe is beginning to be plugged, the pipe may be displayed in red. If the pipe is completely plugged, the pipe may be displayed in black. Therefore, graphical user interface 800 may graphically display one or more operating characteristics or conditions for one or more pipes.

Graphical user interface 800 may display the information for a particular time or period of time (e.g., the last five minutes, the last ten minutes, the last hour, the last two hours, the last 12 hours, the last 24 hours). Graphical user interface 800 may be adjustable to show different ranges of time, automatically or based on user input.

Graphical user interface 800 may include one or more buttons that allow a user to take one or more actions. For example, graphical user interface 800 may include a button (e.g., an "Actions" button 810) that, when pressed, shows one or more actions available to the user. The graphical user interface may include a button (e.g., a "Change View" button 812) that, when pressed, changes one or more views of one or more elements of the graphical user interface. The graphical user interface may include a button (e.g., a "Settings" button 814) that, when pressed, shows one or more settings of the application of which the graphical user interface is a part. The graphical user interface may include a button (e.g., a "Refresh Data" button 816) that, when pressed, refreshes data displayed by the graphical user interface. In some aspects, data displayed by the graphical user interface may be refreshed in real time, according to a preset schedule (e.g., every five seconds, every ten seconds, every minute), and/or in response to a refresh request received from a user. The graphical user interface may include a button (e.g., a "Send Data" button 818) that, when pressed, allows a user to send data to one or more other devices. For example, the user may be able to send data via email, SMS, text message, iMessage, FTP, cloud sharing, AirDrop, or via some other method. The user may be able to select one or more pieces of data, graphics, charts, graphs, elements of the display, or the like to share or send. The graphical user interface may include a button (e.g., an "Analyze Data" button 820) that, when pressed, causes one or more data analysis functions to be performed. In some aspects, the user may provide additional input about the desired data analysis, such as desired input, desired output, desired granularity, desired time to complete the data analysis, desired time of input data, or the like.

Figure 9:
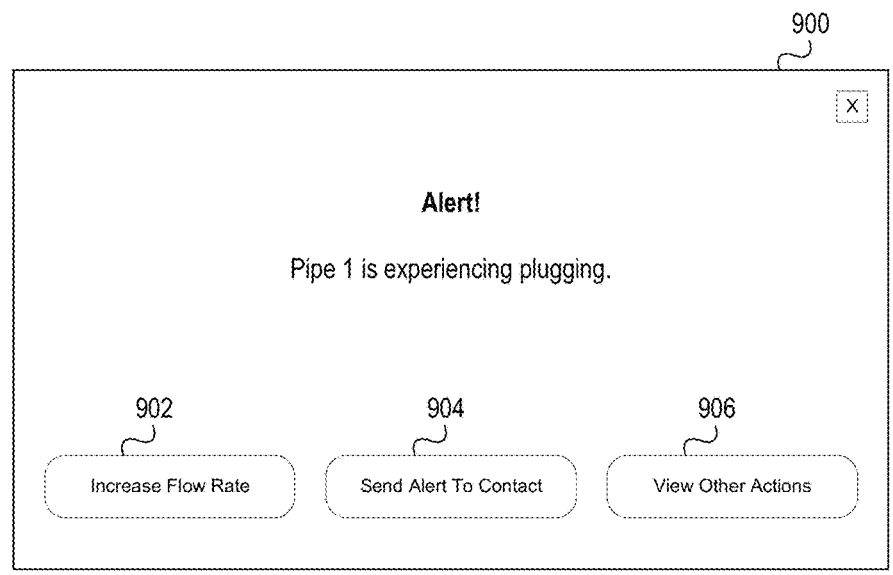

FIG. 9 depicts an illustrative graphical user interface 900 of an application that may be used for providing alerts and/or receiving or generating commands for taking corrective action, in accordance with one or more embodiments described herein. Graphical user interface 900 may be displayed as part of a smartphone application (e.g., running on a remote device, such as first remote device 326 or second remote device 328), a desktop application, a web application (e.g., that runs in a web browser), a web site, an application running on a plant computer, or the like. Graphical user interface 900 may include an alert with information about a current state of a piece of equipment (e.g., catalyst transfer pipe), a problem being experienced (e.g., plugging) by a piece of equipment (e.g., catalyst transfer pipe), a problem with a plant, or the like.

Graphical user interface 900 may include one or more buttons that, when pressed, cause one or more actions to be taken. For example, graphical user interface 900 may include a button (e.g., button 902) that, when pressed, causes a flow rate or pressure differential to change. In another example, graphical user interface 900 may include a button (e.g., button 904) that, when pressed, sends an alert to a contact, the alert including information similar to the information included in the alert provided via graphical user interface 900. In a further example, graphical user interface 900 may include a button (e.g., button 906) that, when pressed, shows one or more other actions that may be taken (e.g., additional corrective actions).

Detecting and Correcting Plugging/Plugging

Aspects of the disclosure are directed to a system that predicts, detects, and/or corrects process conditions before plugging or before plugging forcing a shut down in the system. The plant operator uses an algorithm to determine when a catalyst transfer pipe is starting to plug, thus allowing the operator to modify the process to get the pipe flowing again before it has time to set up with coke. In one aspect the operator watches for an alarm and manually makes the adjustment to the DP and then reduce the DP once the pipes are flowing normally. In a further aspect, the system may automatically increase the DP between the reactor and the catalyst collect.

In some aspects, data collected at the plant (e.g., by data collection platform 302) may be stored at the plant, in the cloud (e.g., by data analysis platform 304), or in one or more other locations. In some embodiments, data collection platform 302 may be synchronized between a data lake (e.g., in the cloud, in communication with data analysis platform 304) controlled by a first entity and a database (e.g., at the plant) controlled by a second entity. The data lake and the database may be linked by a process scout, which may communicate one way or two-ways between the data lake and the database. The process scout may use one or more protocols (e.g., odbc) to communicate between the data lake and the database. The data in the cloud may be processed and/or analyzed using one or more algorithms, e.g., by data analysis platform 304. After data processing and/or analysis is complete, the processed and/or analyzed data, and/or one or more results of the data processing and/or data analysis, may be synchronized between the data lake and the database (e.g., at the plant). Thereby, data and analytical results may be accessible at the plant and/or in the cloud.

As an illustrative example, temperature sensors (e.g., skin thermocouples) may be placed in or on catalyst transfer pipes (e.g., as shown in FIG. 2C). One or more temperature sensors may be placed in the middle of the catalyst transfer pipe, along the length of the catalyst transfer pipe, near the entrance to the catalyst transfer pipes between the reactor and the catalyst collector (e.g., above the flange, on the flange, below the flange), near the exit from the catalyst transfer pipes between the reactor and the catalyst collector (e.g., above the flange, on the flange, below the flange), or in one or more additional locations. One or more thermal cameras may be placed around the catalyst transfer pipes, and, e.g., collect temperature information using infrared or other technology. The sensors may provide, to a data collection platform (e.g., data collection platform 302), signals regarding temperature of the catalyst transfer pipes. When analysis of the temperature data indicates a potential plug situation, a signal may be sent to a plant operator (user) interface and/or a control computing platform, the signal identifying the potential plug situation. The operator and/or a control computing platform may be able to remedy the potential plug situation by increasing the pressure difference in the pipes to break up the potential plug and pass it through the pipes. Portions of the system or the entire system may be automated so that the system may automatically take corrective action.

In accordance with aspects of the disclosure, plugging or potential plugging can be detected by measuring temperature cycling such as measuring changes in temperatures, for example with temperature sensors, thermocouples, tomography, video cameras, and/or infrared thermal imaging.

In some aspects, data collection platform 302 may receive sensor data indicating temperatures for each path and the average and mean of the temperature for all paths at normal operating conditions. The measurements may be made from sensors at inlets and outlets of the catalyst transfer pipes in order to detect change in temperature between the inlets and outlets and so temperatures may be compared between pipes. Data collection platform 302 may continuously, sporadically, and/or periodically sense the temperatures.

Data from other sensors detecting flow and pressure drops may also be used (e.g., by data analysis platform 304) to determine and/or predict plugging and problems caused by plugging by detecting flow changes. When combined with data from a process simulation providing stream physical properties, calculations of observed and predicted temperature cycling performance and pressure drops can be used to identify plugging, and even trend the change in plugging magnitude.

Sensor information may be gathered by one or more sensors and transmitted to data collection platform 302. Data collection platform 302 may transmit the collected sensor data to data analysis platform 304, which may be at a plant or remote from a plant (e.g., in the cloud).

Data analysis platform 304 may analyze the received sensor data. Data analysis platform 304 may compare the sensor data to one or more rules to determine if plugging or damage from plugging is occurring.

Figure 5:
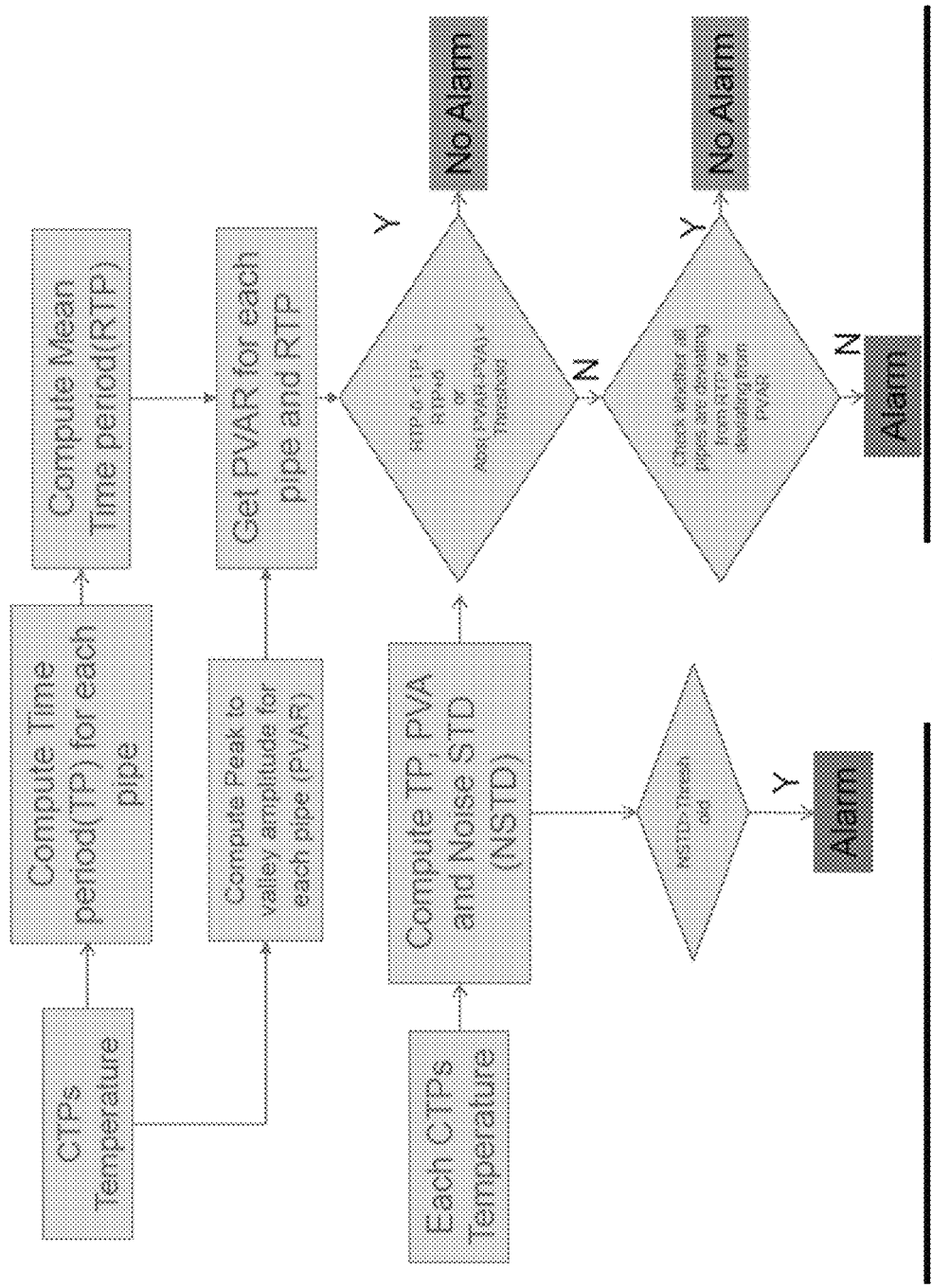
FIG. 5 depicts an illustrative flowchart of a process that one or more devices may perform in controlling one or more catalyst transfer pipes in accordance with one or more example embodiments.

Such monitoring will look for change in catalyst transfer pipe temperature time period though catalyst circulation rate is not changed; change in catalyst transfer pipe peak to valley amplitude though catalyst circulation rate is not changed; and noise in catalyst transfer pipe temperature. When there is change in periodicity of signal that triggers change in CTP temperature. FIG. 5 depicts an illustrative algorithm of a time period computation performed by one or more devices.

The one or more devices (e.g., data analysis platform 304) may receive catalyst transfer pipe temperature data. Using the temperature data, the one or more devices may compute time period (TP) for each pipe. The one or more devices may compute mean time period (RTP). The one or more devices may compute peak-to-valley amplitude (PVAR) for each pipe.

The one or more devices may compute TP, PVA, and noise STD (NSTD). The one or more devices may determine if NSTD is over a threshold. If so, the one or more devices may trigger an alarm.

The one or more devices may determine if RTP−$\bar{o}$<TP<RTP+$\bar{o}$. If so, the one or more devices might not raise an alarm. The one or more devices may determine if Abs(PVAR−PVA)<Threshold. If so, the one or more devices might not raise an alarm.

If not RTP−$\bar{o}$<TP<RTP a or not Abs(PVAR−PVA) <Threshold, the one or more devices may determine if one or more (e.g., one, some, a majority, all) are deviating from RTP or deviating from PVAR. If so, the one or more devices might not raise an alarm. If so, however, the one or more devices may raise an alarm.

In some instances, in addition to or instead of raising the alarm, the one or more devices may implement one or more corrective actions based on the determined potential transfer pipe plugging. For example, the one or more devices may increase a flow rate, a pressure differential, or the like, through the plugged or soon-to-be-plugged pipe, to clear out any catalyst buildup before the pipe is plugged. After the buildup is cleared, the flow rate or pressure differential may be returned to a normal level. By automatically taking corrective action based on the determined plugging or potential plugging, the system may prevent plugging from occurring, which may allow for longer runtimes between shutdowns.

Figure 6A:
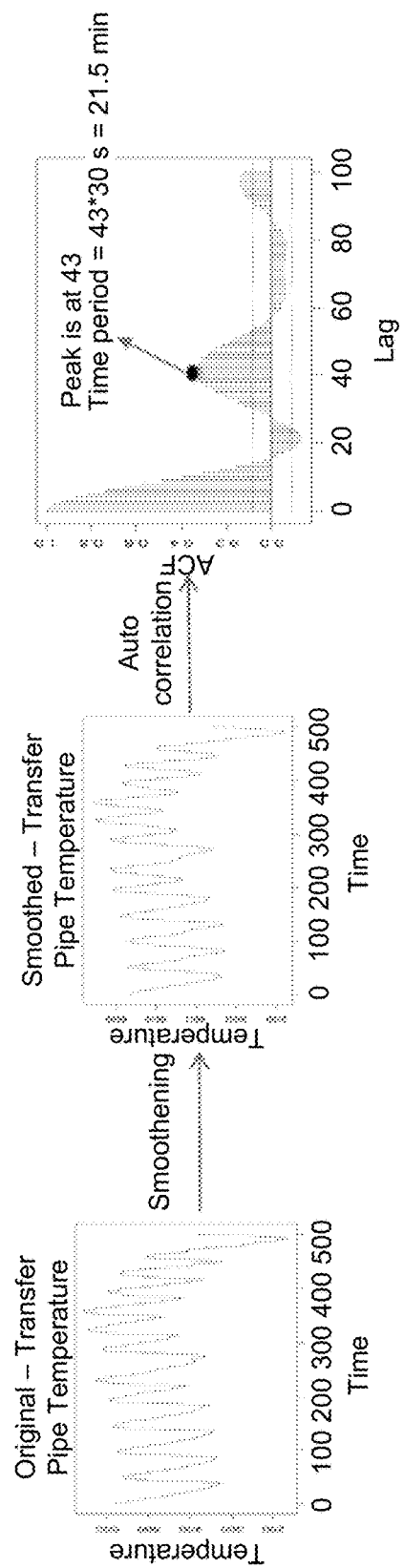
FIG. 6A depicts illustrative graphs of time period computation based on one or more catalyst transfer pipes in accordance with one or more example embodiments.

FIG. 6A depicts an illustrative time period computation method. One or more devices (e.g., data analysis platform 304) may use autocorrelation to compute the periodicity of the signal. Specifically, the one or more devices may compute auto-correlation for each signal. A position of a first peak in the auto-correlation may give a time period. A reference time period for all signals (pipes) may be equal to a mean of time period of all signals. In some aspects, times signal is periodic, and autocorrelation can be used to compute time period.

Figure 6B:
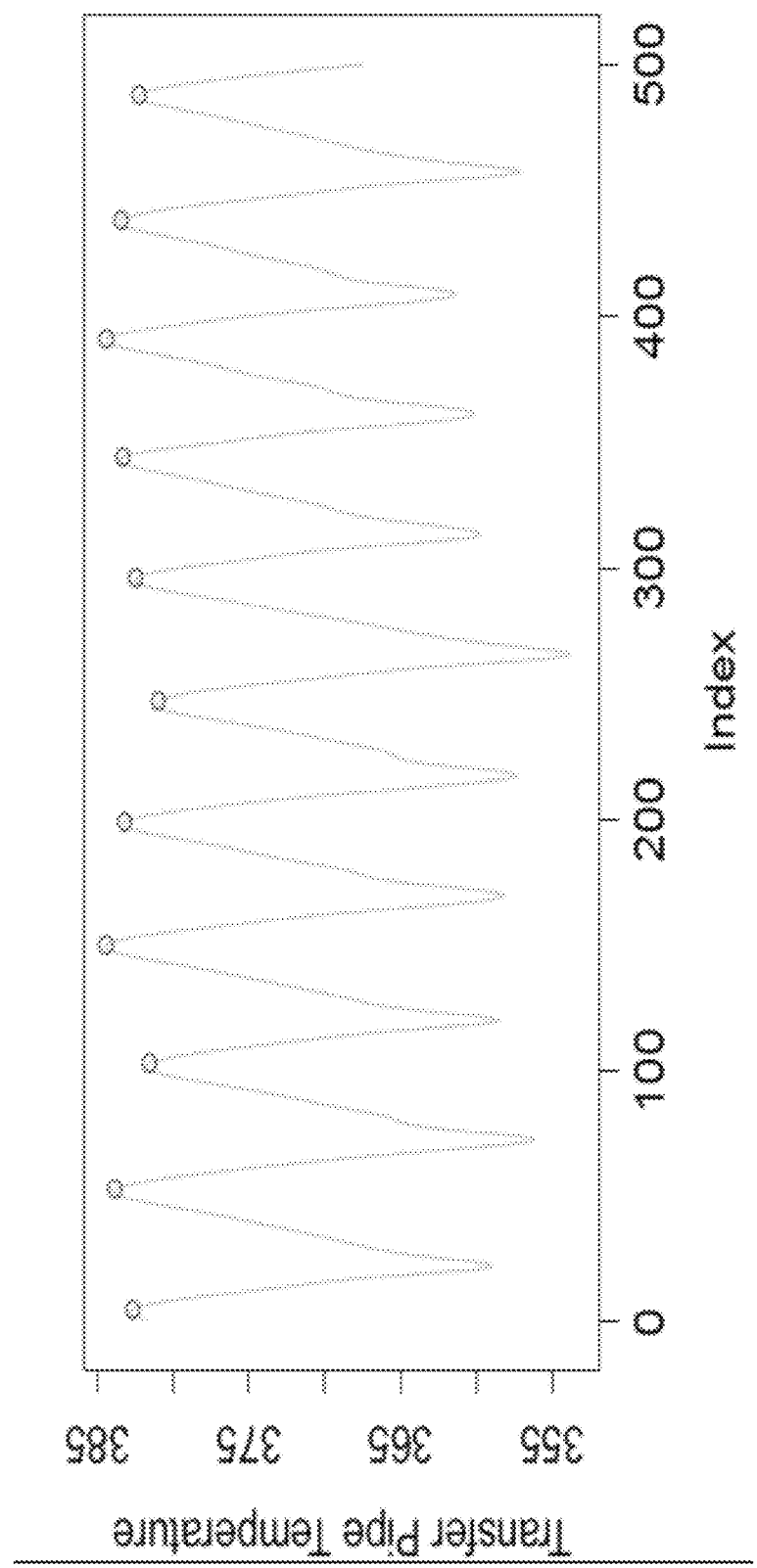
FIG. 6B depicts an illustrative graph of time period computation based on one or more catalyst transfer pipes in accordance with one or more example embodiments.

FIG. 6B depicts another illustrative time period computation method. In some aspects, when auto correlation is not able to compute time period, then a peak-finding algorithm may be used to detect peaks. Specifically, a peak-and-valley detection algorithm may be used to compute the time period. For example, a distance between successive peaks may be used to determine time period. The mean of this time period may be used to determine a mean time period for that set of cycles.

Specifically, one or more devices may first smooth the signal. Next, the one or more devices may detect peaks and valleys in the signal, which may include computing peak locations for each signal. Next, the one or more devices may determine the time period by finding the difference between successive peak locations. The time period of each signal may be equal to the maximum of successive difference of peaks. A reference time period for all signals (e.g., pipes) may be equal to the mean of time period of all signals. The mean of difference may give the peak-to-valley amplitude.

An algorithm may be used to detect abnormal behavior of transfer pipe temperature (TPT). An alarm may be raised and/or action taken once TPT deviates from reference time period for more than a threshold amount of time (e.g., 3 minutes). An alarm may be raised and/or action taken once peak to valley amplitude deviates from reference peak to valley amplitude for more than threshold (e.g., 3 minutes). An alarm may be raised and/or action taken once TPT has noise for more than threshold (e.g., 3 minutes).

Figure 7A:
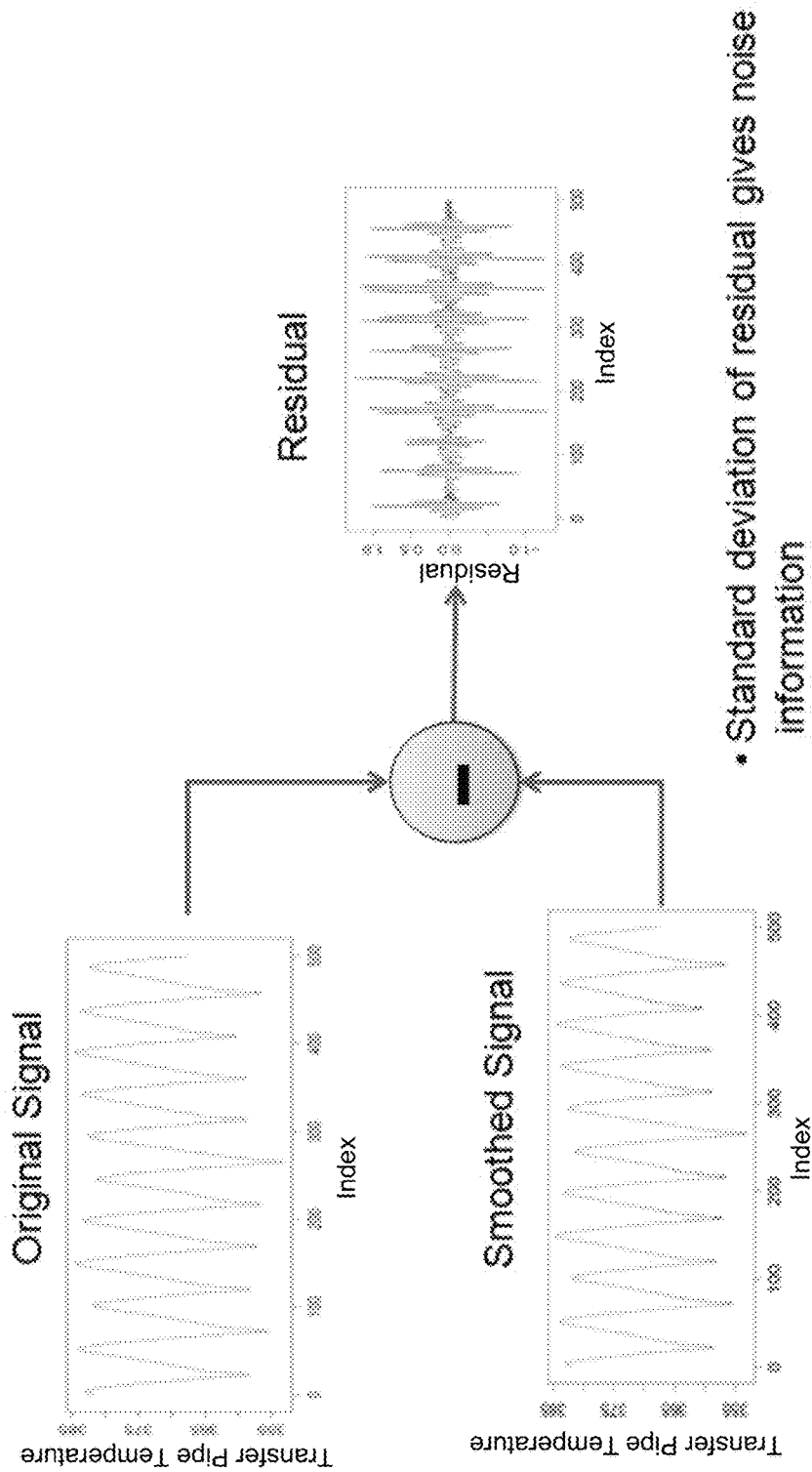
FIGS. 7A-7B depict illustrative graphs of noise level computation based on one or more catalyst transfer pipes in accordance with one or more example embodiments.
Figure 7B:
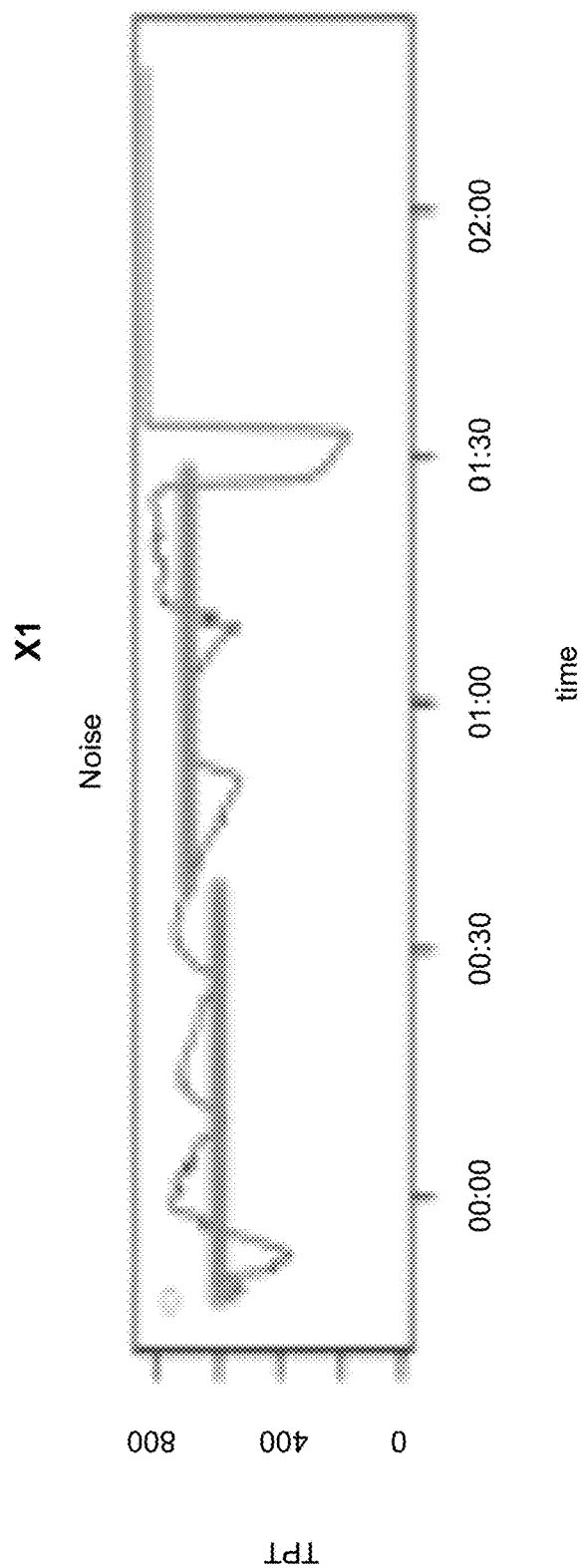

In some embodiments, detecting noise in a catalyst transfer pipe may assist in identifying a situation (e.g., determining if the equipment is malfunctioning). FIG. 7A depicts an illustrative noise level computation. One or more devices (e.g., data analysis platform 304) may determine a difference between an original signal and a smoothed signal. The difference may result in a residual signal. A standard of deviation of the residual signal may be used to determine noise information. In some aspects, signals with zero variance might not be considered for noise computation. FIG. 7B depicts an illustrative graph of noise over time versus TPT.

In some aspects, data analysis platform 304 may compare current sensor data to past sensor data from the catalyst transfer pipes, from other catalyst transfer pipes at the same plant, from other catalyst transfer pipes at other plants, from a manufacturer, or the like. Data analysis platform 304 may determine if one or more data characteristics of the sensor data match data that may indicate plugging or damage due to plugging. Data that may indicate plugging or damage due to plugging may, alone or in a combination, be considered a fingerprint. When current sensor data matches a fingerprint of a particular condition, data analysis platform 304 may determine that the condition is happening or potentially developing in the current system as well. Data may be collected over many years from many different locations, and data analysis platform 304 can match the current data to fingerprints of past data or situations. Thresholds used for particular rules may change or be adjusted over time based on past fingerprints calculation tools.

From the collected data, as well as data collected from other catalyst transfer pipes, data analysis platform 304 may run process simulations to determine if plugging or damage due to plugging is occurring or is likely to occur. In addition to temperature, one or more possible variables may be taken into account in these calculations, including pressure, flow, composition, and properties of components. Optimal operating conditions and limits of equipment (e.g., from vendor) may be taken into account.

Data analysis platform 304 may further run process simulations to determine process conditions that may be causing the plugging, and/or to determine recommendations for changes to flow compositions and operating parameters to avoid or limit further damage by plugging, and/or to optimize change conditions for the catalyst transfer pipes within the unit. In some aspects, data analysis platform 304 may communicate with one or more vendors regarding the results of the simulation, and receive recommendations from the vendor on how to change or optimize operation or geometry of the equipment. The results of the process simulation may further be used to determine how quickly a problem occurs, to identify one or more fingerprints for the problem, and/or identify one or more signatures for how the problem occurs. Data analysis platform 304 may use this information to create or expand a searchable database.

In some embodiments, data from different types of sensors may be cross-checked to confirm conclusions drawn from that data, to determine data reliability, and the like. For example, temperature readings from skin thermocouples may be compared to temperature readings from a thermal imaging camera, thermal topography may be compared to photographs, or the like.

In some aspects, data analysis platform 304 may use additional data from the catalyst transfer pipes or from other equipment connected to the catalyst transfer pipes (e.g., in the same plant, in a plant upstream of the plant) to determine additional information about the plugging. For example, if plugging or damage due to plugging occurs at a consistent rate or increases at a first rate when a first operating condition exists, and the plugging or damage due to plugging occurs at the consistent rate or increases at a second rate when a second operating condition exists, data analysis platform 304 may determine such a correlation by comparing the catalyst transfer pipes sensor data to other data. One or more examples of an operating condition may include, e.g., the plant is operated at a particular efficiency, a particular amount of feed is used, a particular operating temperature of a piece of equipment upstream of the catalyst transfer pipes is maintained, a particular amount of catalyst is used, a particular temperature of catalyst is used, and the like. In some aspects, a particular operating condition or combination of operating conditions may be determined to be more likely to cause development of plugging or damage due to plugging or worsening, stability, or stabilization of plugging or damage due to plugging.

In some aspects, data analysis platform 304 may determine if plugging is approaching a known damage or failure condition. For example, if plugging is acceptable within a particular range, data analysis platform 304 may determine that the plugging is within the acceptable range. In another example, however, if the plugging is within a range or threshold of exceeding the acceptable range, data analysis platform 304 may determine that the plugging may soon become severe enough to cause damage or equipment failure. Data analysis platform 304 may use historical data from the catalyst transfer pipes, data from other catalyst transfer pipes at the plant, data from other plants, data from a manufacturer, specification data, or other data to determine how plugging might develop, stabilize, cause failure, or the like.

In some embodiments, data analysis platform 304 may determine one or more failure modes in which to classify plugging or damage due to plugging. For example, plugging or damage due to plugging may occur in more than one way or due to more than one cause, and therefore might be detectable based on one or more data indicators from one or more different sensor types. Furthermore, different failure modes may be associated with different corrective measures. For example, a first failure mode might be a result of a first problem, might be detectable by a first type of sensor data, and might be correctable by a first action, while a second failure mode might be a result of a second problem, might be detectable by a second type of sensor data, and might be correctable by a second action.

Based on the sensor data, process simulations, fingerprint analysis, and/or other data processing, data analysis platform 304 may determine one or more recommended changes to operation of the catalyst transfer pipes, such as decreasing temperature or pressure. For example, collected data could be used to measure or calculate loss of efficiency due to plugging or damage due to plugging. The simulation may be used to suggest, for example, a timeline for taking equipment down to clean it, and/or other corrective measures.

In some aspects, if plugging or damage due to plugging or one or more conditions that may cause plugging or damage due to plugging are detected, an alarm (e.g., a visual and/or audible alarm) may be triggered. The alarm could be an alarm at a plant, an alarm that is sent to one or more devices, an alarm on the catalyst transfer pipes, an alarm that shows on a web page or dashboard, or the like.

In some aspects, if plugging or damage due to plugging is detected, control platform 306 may take one or more actions, which may be triggered, requested, or recommended by data analysis platform 304. Alternatively or additionally, data analysis platform 304 may trigger an alert to one or more remote devices (e.g., first remote device 326, second remote device 328). The alert may include information about the plugging or damage due to plugging (e.g., temperatures, pressures, flow rates, predicted plugging rates, predicted plugging chemical makeup, potential damage due to plugging, and history of plugging). The alert may provide information about one or more determined correlations between plugging or damage due to plugging and a particular operating condition or combination of operating conditions. The alert may include one or more recommendations for and/or commands causing adjustments to operating conditions, adjustments to flows, pressures, valves, nozzles, drains, pumps, or the like.

In some aspects, a remote device (e.g., first remote device 326, second remote device 328) may send a command for a particular action (e.g., a corrective action) to be taken, which may or may not be based on the alert. In some aspects, data analysis platform 304 may send a command for a particular action to be taken, whether or not an alert was sent to or a command was sent by the remote device. The command may cause one or more actions to be taken, which may mitigate plugging, prevent equipment (e.g., catalyst transfer pipe) damage, avoid failure, or the like. For example, if plugging rapidly develops, and, based on analyzing the growth rate of the plugging in view of current operating conditions, data analysis platform 304 determines that the plugging soon will cross over a particular threshold (e.g., over a tolerance level, over an efficiency-loss level, over a cost threshold, over a safety threshold, over a risk threshold, or the like), a command (e.g., a plant shutdown, a process shutdown, a backup reactor activation, or the like) may be sent in order to avoid loss of efficiency, equipment failure, catastrophic failure, catalyst transfer pipes damage, plant damage, or some other damage.

FIGS. 10A-10H depict illustrative snapshots of temperature versus time for a number of catalyst transfer pipes, where the signals for the various pipes are combined onto the same graph. In FIGS. 10A-10H, temperature signals of all transfer pipes have been normalized such that their amplitude is between 0-1 (for visualization purpose). As shown in one or more of these figures, pipes may start showing signs of abnormality early. This can help to predict the abnormal pipe. In some embodiments, an algorithm may be used to detect abnormal behavior of transfer pipe temperature (TPT). In some embodiments, an action may be taken (e.g., alarm may be raised) if TPT deviates from a reference time period for more than a threshold number of cycles (e.g., more than three cycles). A cycle may be a set amount of time (e.g., two hours and twenty minutes). In some embodiments, an action may be taken if peak-to-valley amplitude deviates from a reference peak-to-valley amplitude for more than a threshold number of cycles (e.g., three cycles). In some embodiments, an action may be taken if TPT has noise for more than a threshold number of cycles (e.g., three cycles).

Figure 10A:
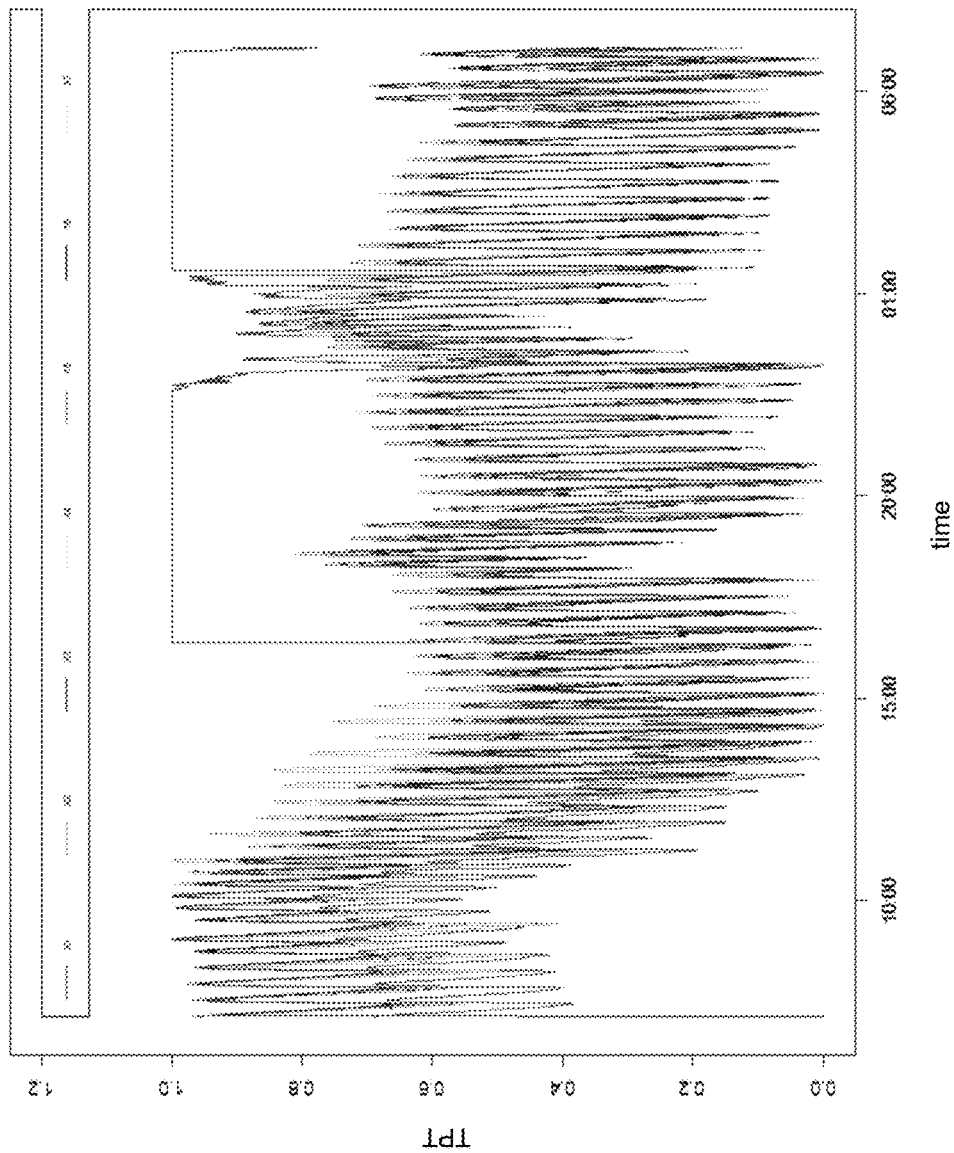
FIGS. 10A-10H depict illustrative snapshots of temperature versus time for a number of catalyst transfer pipes, in which the signals for the various pipes are combined onto the same graph in accordance with one or more example embodiments.

FIG. 10A depicts an illustrative graph where a signal corresponding to a particular pipe deviates from the other signals and maxes out at 1.0, drops down for a period of time, then maxes out at 1.0 again. Specifically, initially all pipes are behaving normally, but at 16:00, pipe 1 (corresponding to the red line) deviates from cyclic behavior, and its time period and peak-to-valley amplitude deviate from the normal behavior. This deviation from the signals of the other pipes shows that the particular pipe may be experiencing malfunction.

Figure 10B:
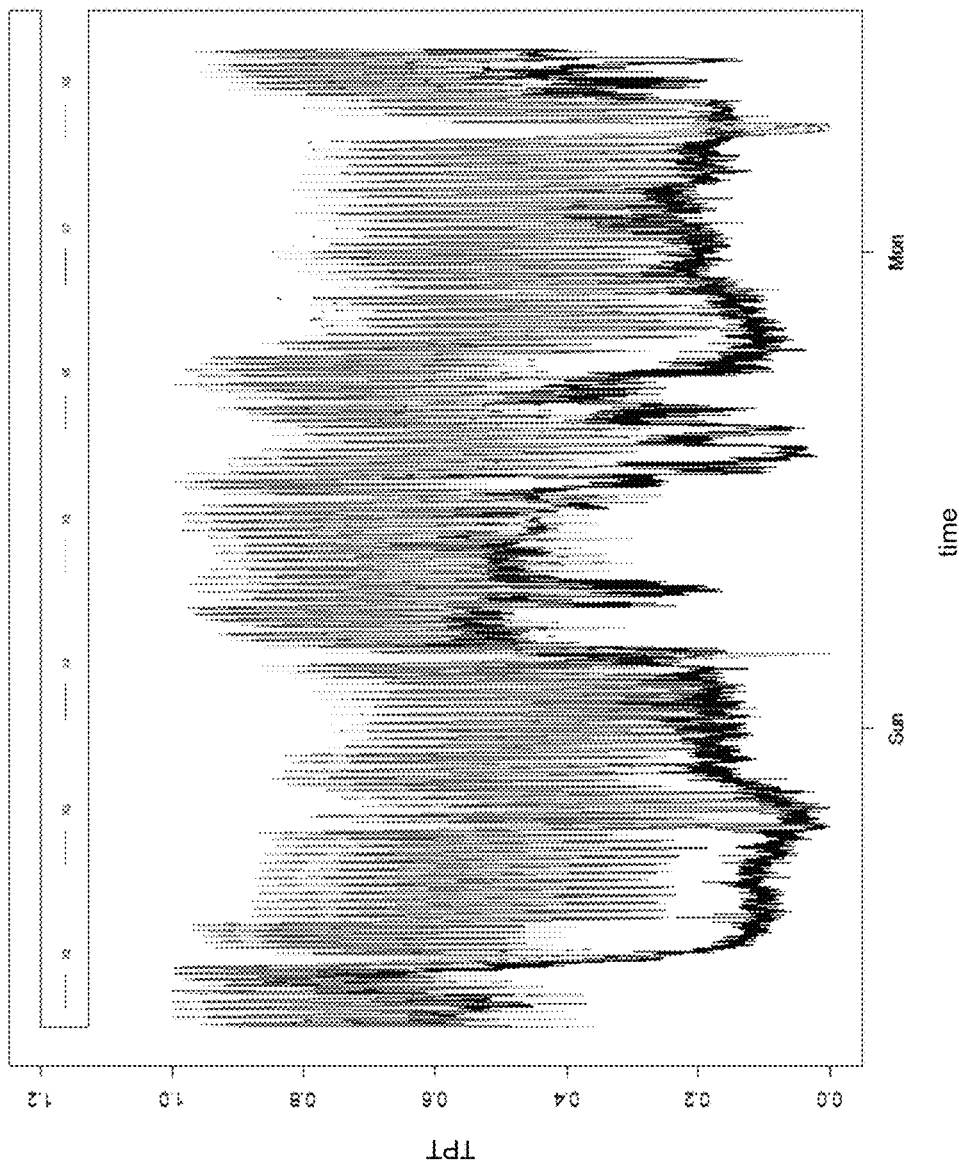

FIG. 10B depicts an illustrative graph where a signal corresponding to a particular pipe deviates from the other signals by having a lower temperature that is fairly consistently lower than the temperatures of the other pipes. Specifically, initially the pipe (corresponding to the black line) may behave normally, but after few cycles, its peak-to-valley amplitude and time period changes from the reference values. This shows that this pipe may be experiencing malfunction.

Figure 10C:
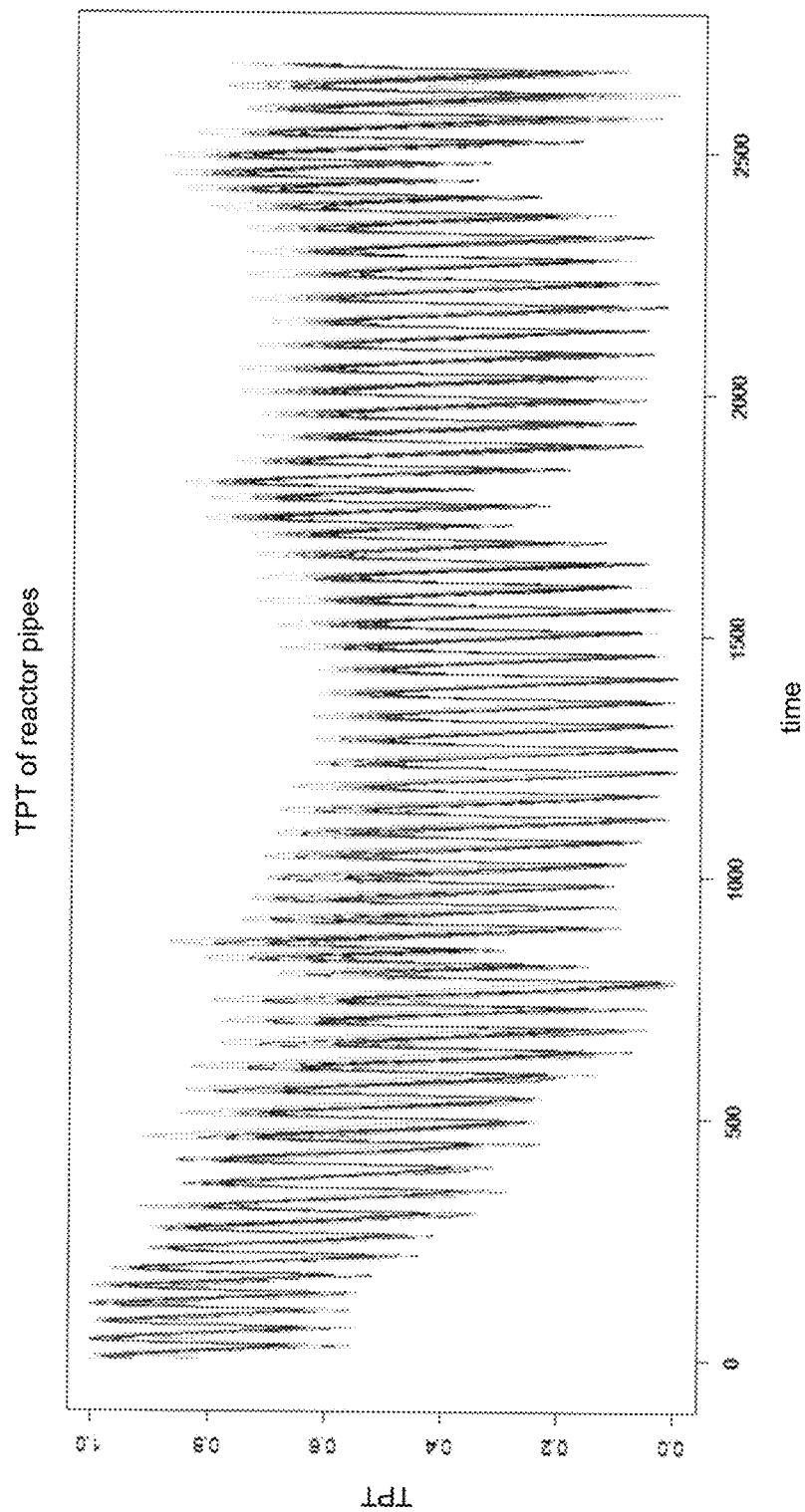

FIG. 10C depicts an illustrative graph where a number of signals corresponding to a number of different pipes do not show large deviation, and therefore these pipes are likely behaving normally and not malfunctioning.

Figure 10D:
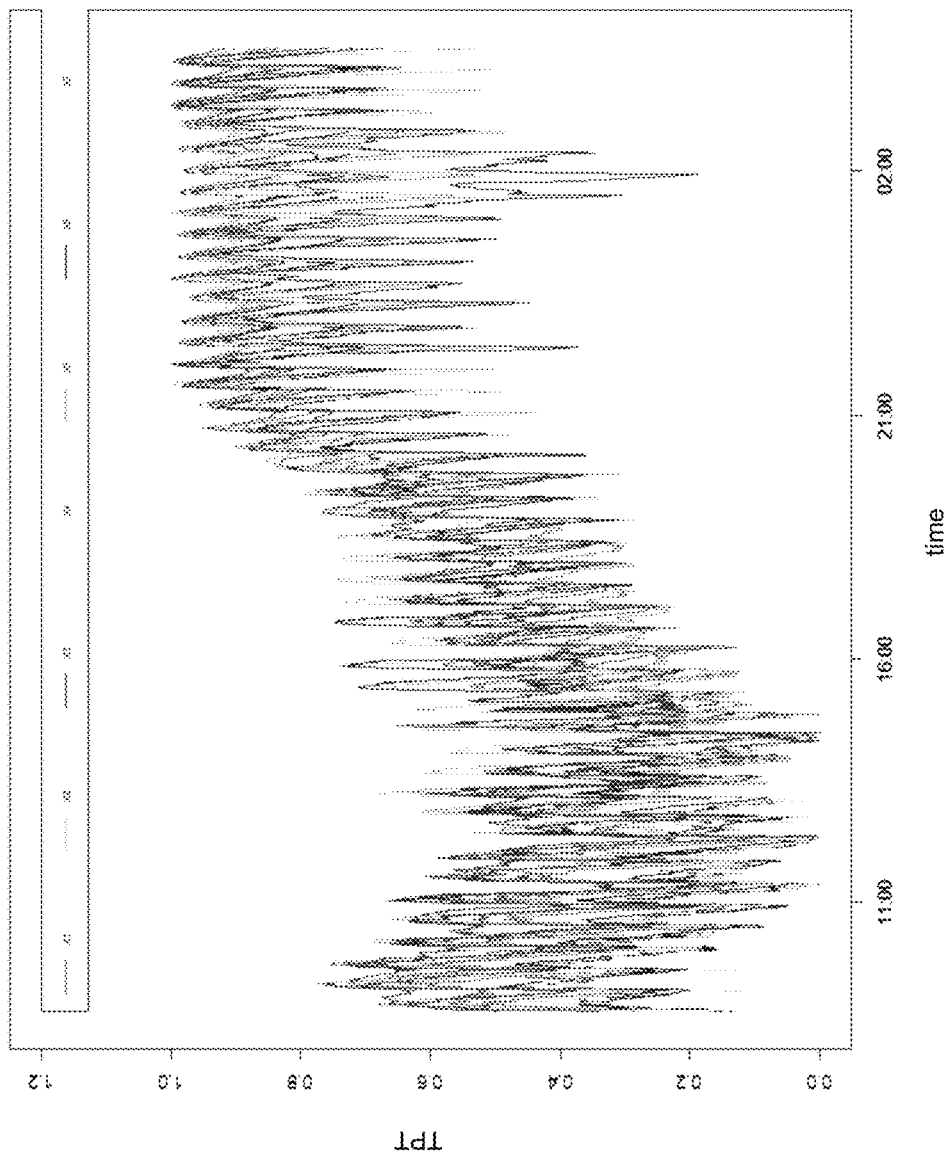

FIG. 10D depicts an illustrative graph where a signal for a particular pipe shows a small deviation for a few cycles (e.g., around 02:00), then returns to fairly consistent operation relative to the other pipes' signals. Specifically, some pipes (corresponding to the green line and the magenta line) are deviating from their reference time period and peak-to valley amplitude (around 17:00 and 19:00). This may be due to a pipe malfunctioning (e.g., plugging), or may alternatively be due to another factor (e.g., environmental factor, such as rain on that particular pipe).

Figure 10E:
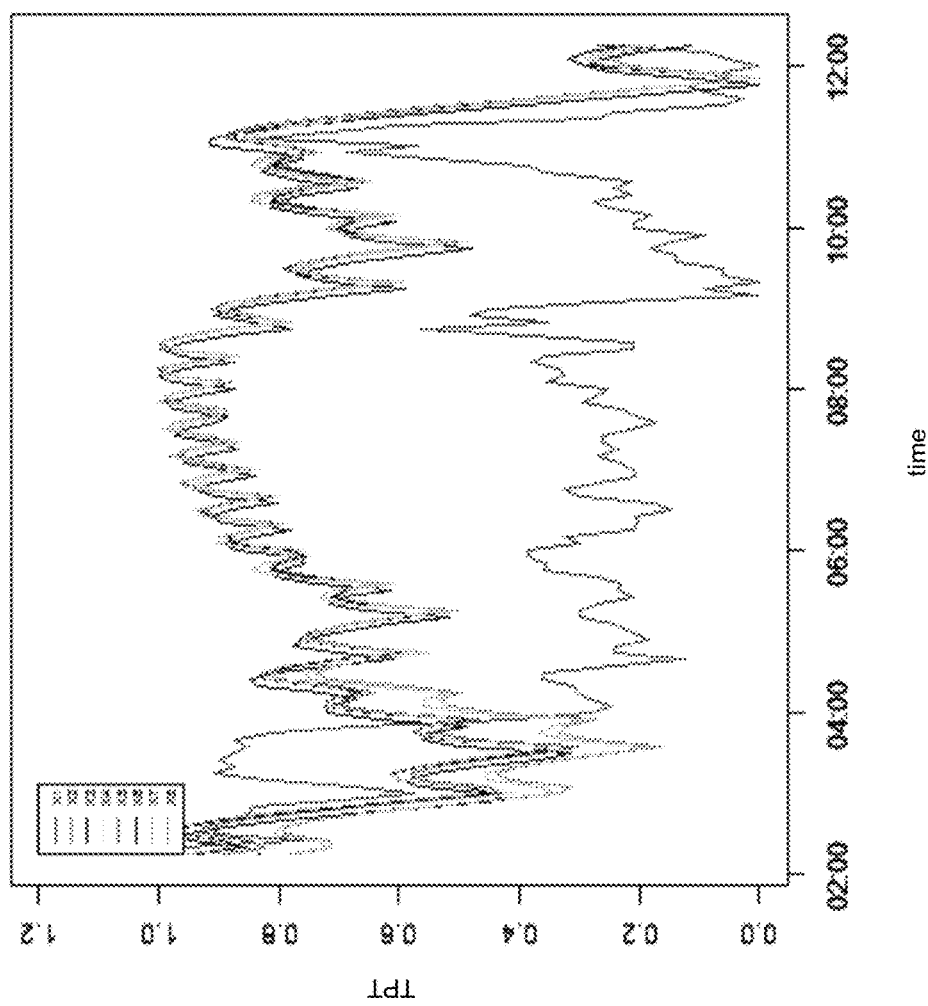

FIG. 10E depicts an illustrative graph where a signal corresponding to a particular pipe experiences significant deviation from the signals corresponding to the other pipes over nearly the entire measurement period. Specifically, the pipe (corresponding to the red line) is deviating from reference time period.

Figure 10F:
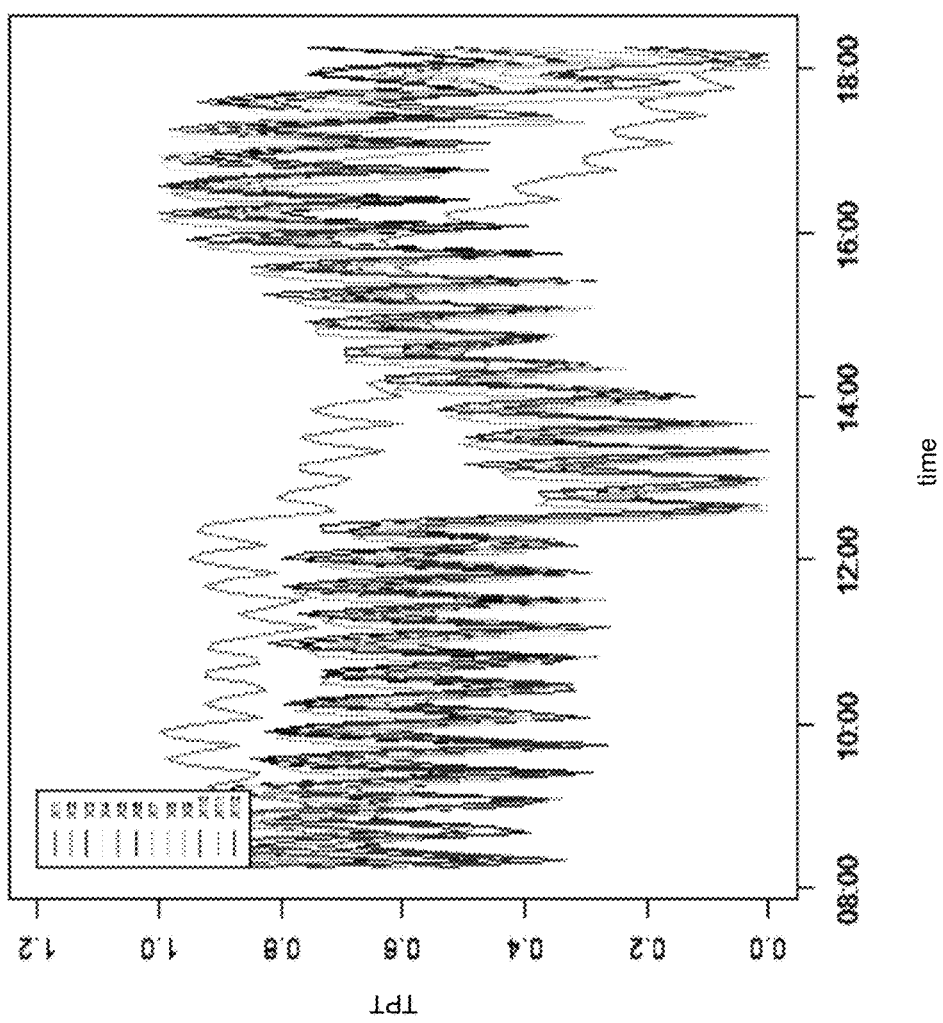

FIG. 10F depicts an illustrative graph where a signal corresponding to a particular pipe experiences significant deviation from the signals corresponding to the other pipes over nearly the entire measurement period. Specifically, the pipe (corresponding to the pink line) is deviating from the reference time period and also from the reference peak-to-valley amplitude.

Figure 10G:
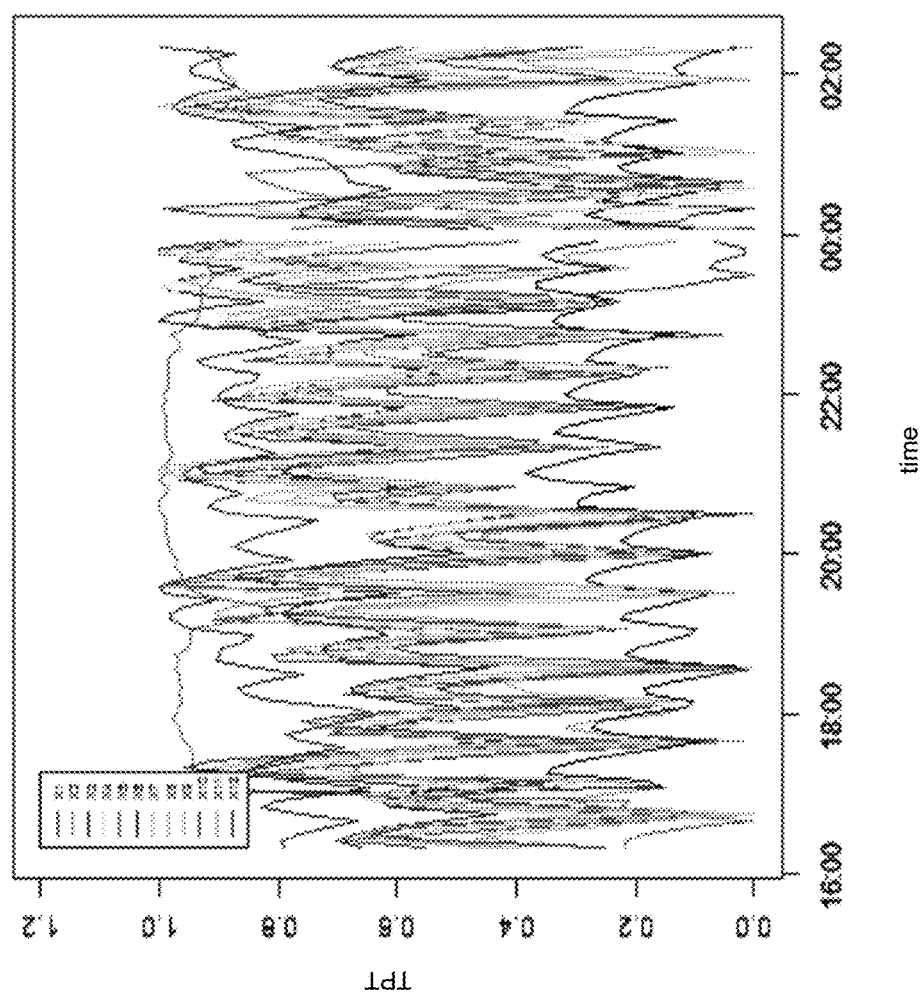

FIG. 10G depicts an illustrative graph where a number of different signals for a number of different pipes deviate from each other in a number of different ways. For example, the pipe (corresponding to the pink line) is deviating from the reference time period and also from the reference peak-to-valley amplitude. These pipes may be malfunctioning (e.g., plugging), or the deviations may be due to other factors (e.g., temperature sensors malfunctioning, temperature sensors becoming disconnected, environmental factors, vibration).

Figure 10H:
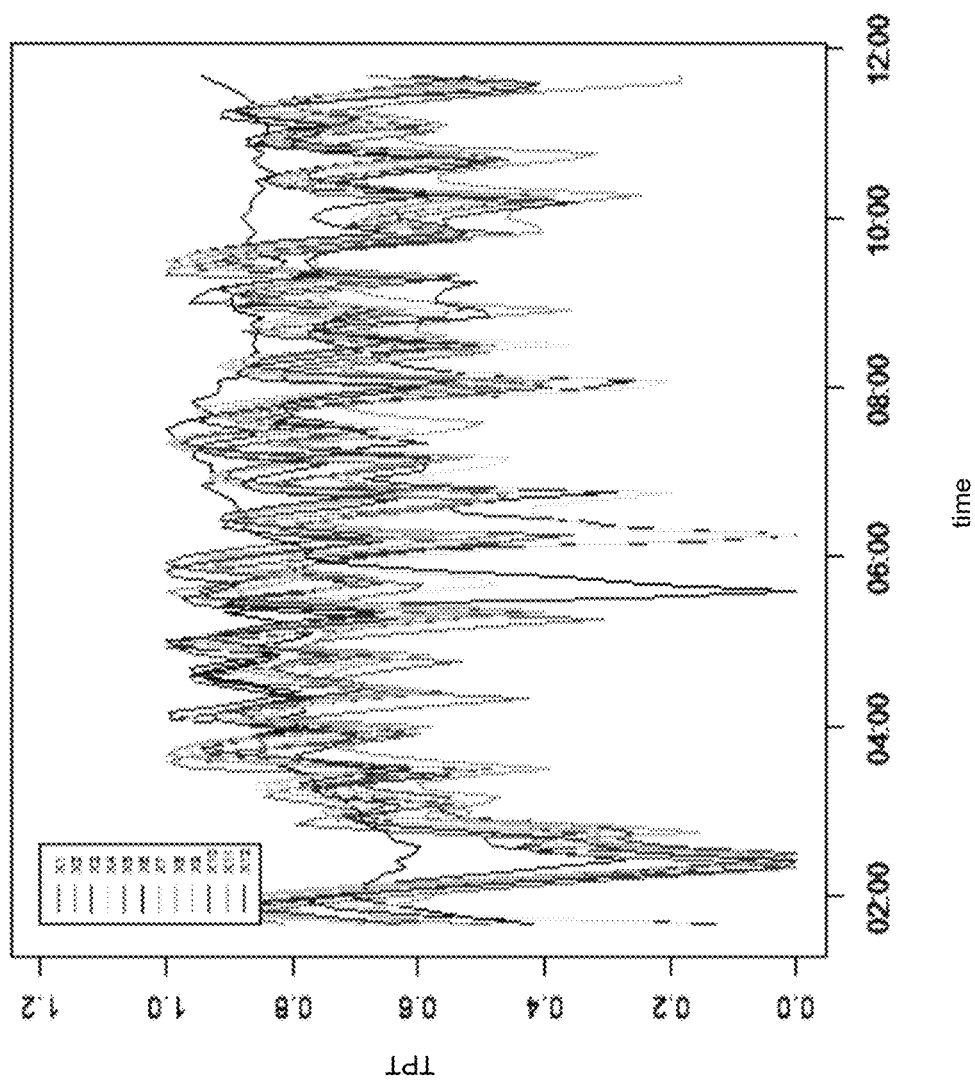

FIG. 10H depicts an illustrative graph where a number of different signals for a number of different pipes may show some deviation from the signals of the majority of the pipes. For example, the pipe (corresponding to the black line) is deviating from the reference time period and also from the reference peak-to-valley amplitude. None or one or more of these pipes may be malfunctioning (e.g., plugging), while none or one or more of these pipes may be experiencing temperature deviations due to one or more other factors.

FIG. 11 depicts an illustrative table of time periods for catalyst transfer pipes. Max TP may be the mean reference TP+threshold. Therefore, max TP may be determined 7.6+0.8=8.4. Min PV may be the mean reference TP−threshold. Therefore, min PV may be determined 7.6−0.8=6.8. Threshold may be 0.8. Therefore, a sampling rate of five minutes may have a threshold of 4 minutes, because 0.8*5 minutes=4 minutes. If a time period of pipe in batch data is not within MaxTP and MinTP for a threshold number (e.g., five) of successive batches, then the alarm may be raised. As shown in FIG. 11, pipe 12 may be giving an alarm for peak-to-valley amplitude deviation.

FIGS. 12A-12L each depict an illustrative temperature profile for a different catalyst transfer pipe.

Figure 12A:
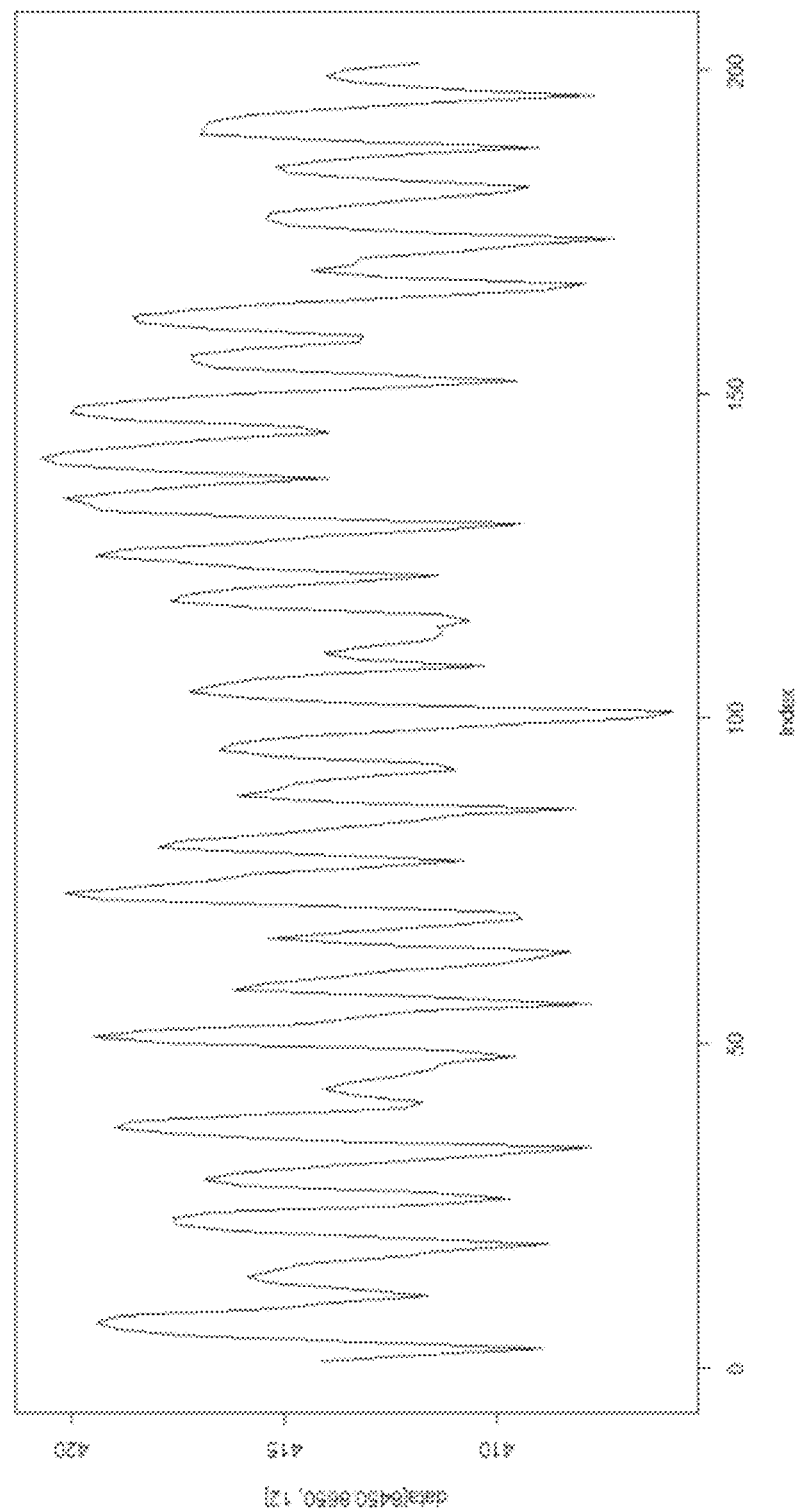
FIGS. 12A-12L each depict an illustrative temperature profile for a different catalyst transfer pipe in accordance with one or more example embodiments.

FIG. 12A depicts an illustrative temperature profile for a first catalyst transfer pipe, where TP=7.2, 8, 7.5, 7.6, and 7.8. This pipe is behaving normally.

Figure 12B:
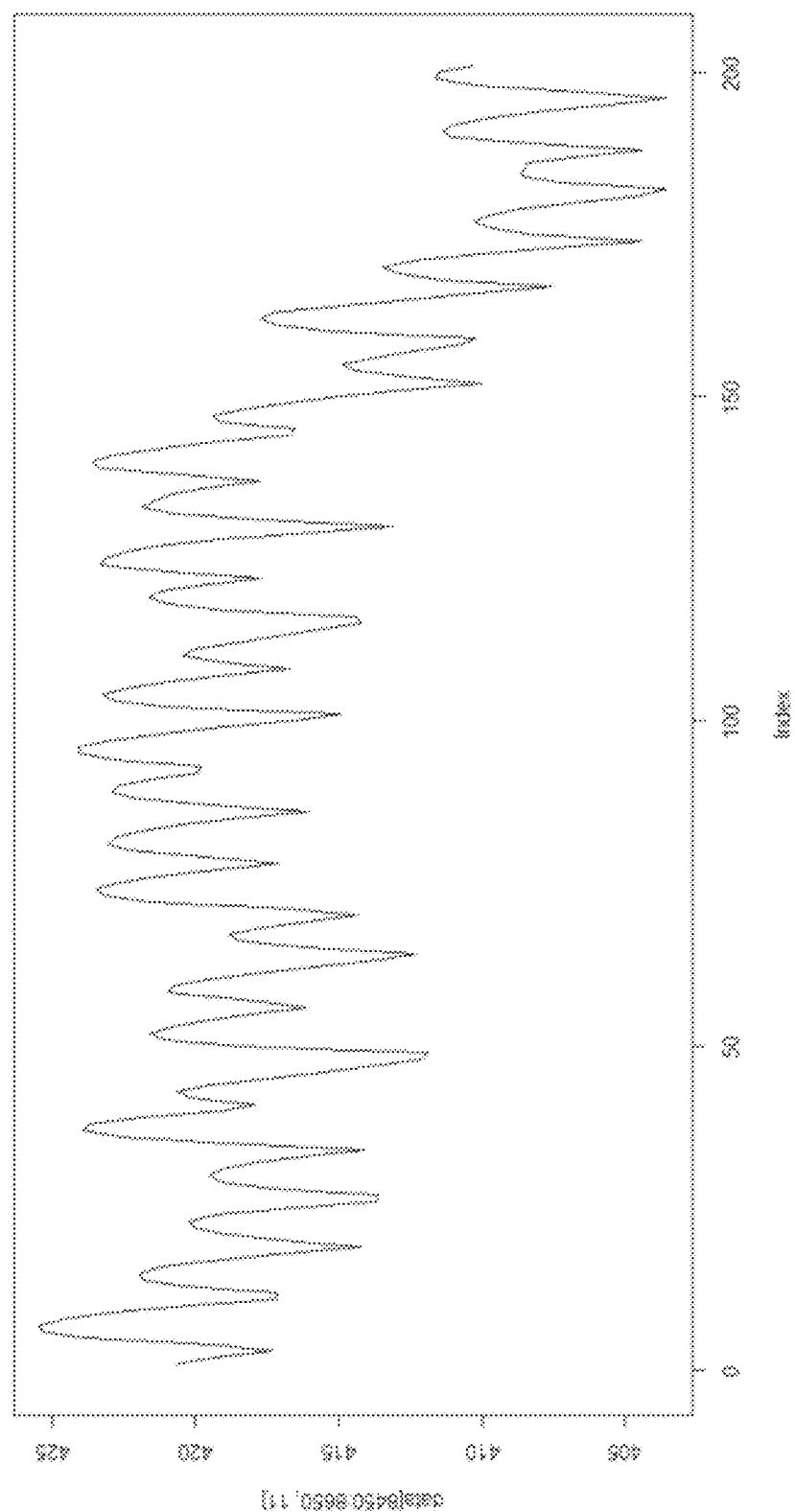

FIG. 12B depicts an illustrative temperature profile for a second catalyst transfer pipe, where TP=7.7, 8.1, 5.9, 7.3, and 7.9. This pipe is behaving normally.

Figure 12C:
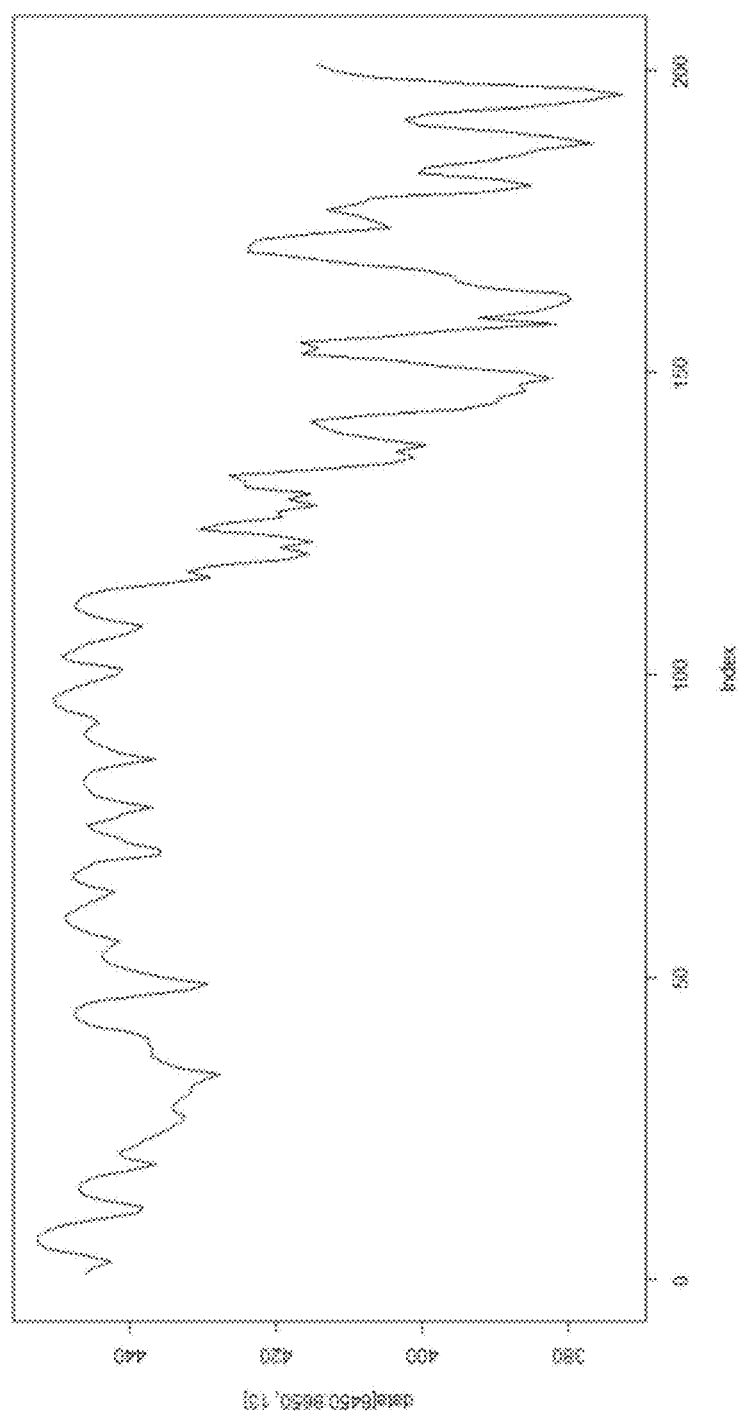

FIG. 12C depicts an illustrative temperature profile for a third catalyst transfer pipe, where TP=11.9, 8.7, 12.4, 19.2, and 8.4. This pipe is not behaving normally; it is deviating from its reference time period (details given in table in FIG. 11).

Figure 12D:
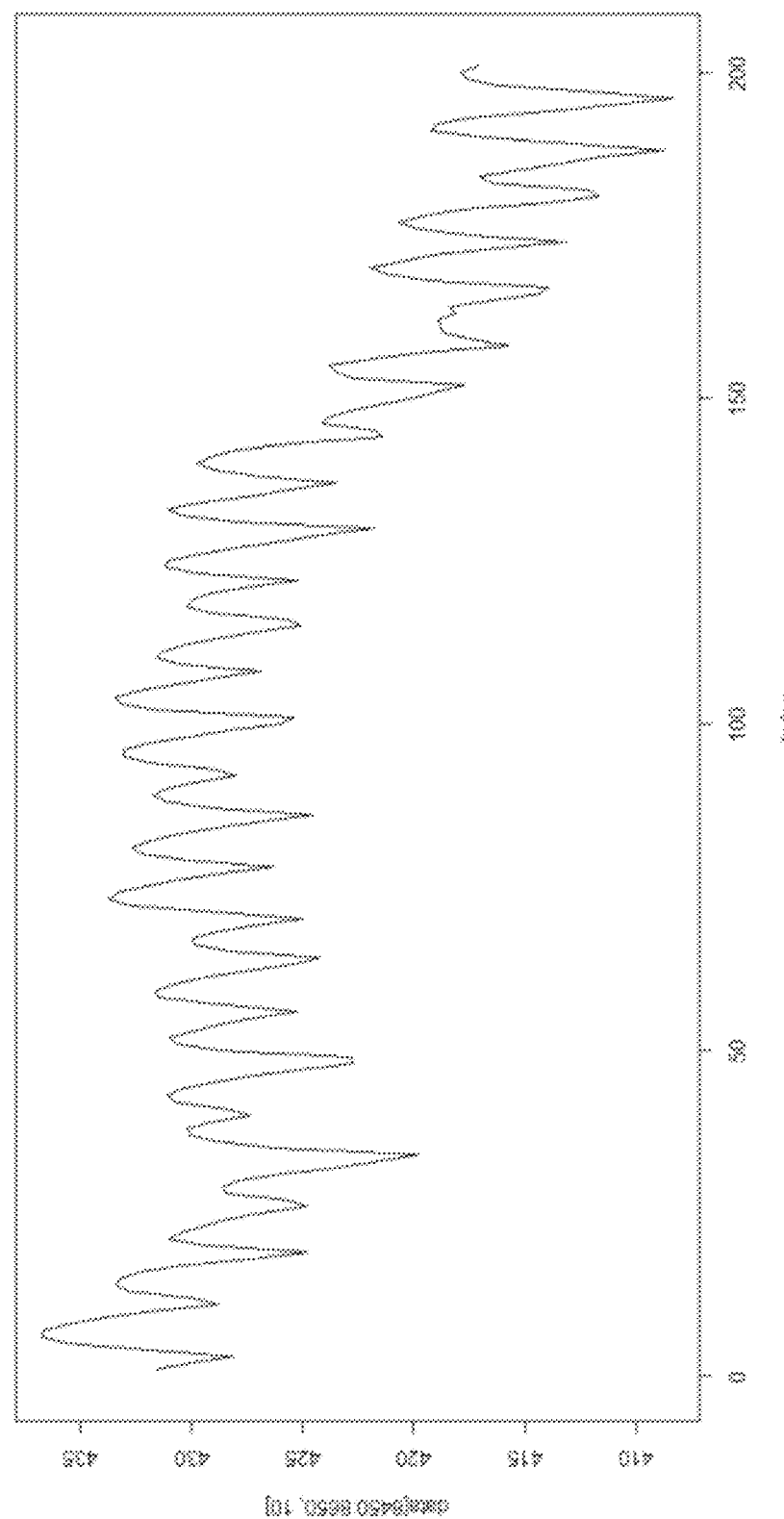

FIG. 12D depicts an illustrative temperature profile for a fourth catalyst transfer pipe, where TP=7.6, 8.2, 7.4, 7.5, 8.3. This pipe is behaving normally.

Figure 12E:
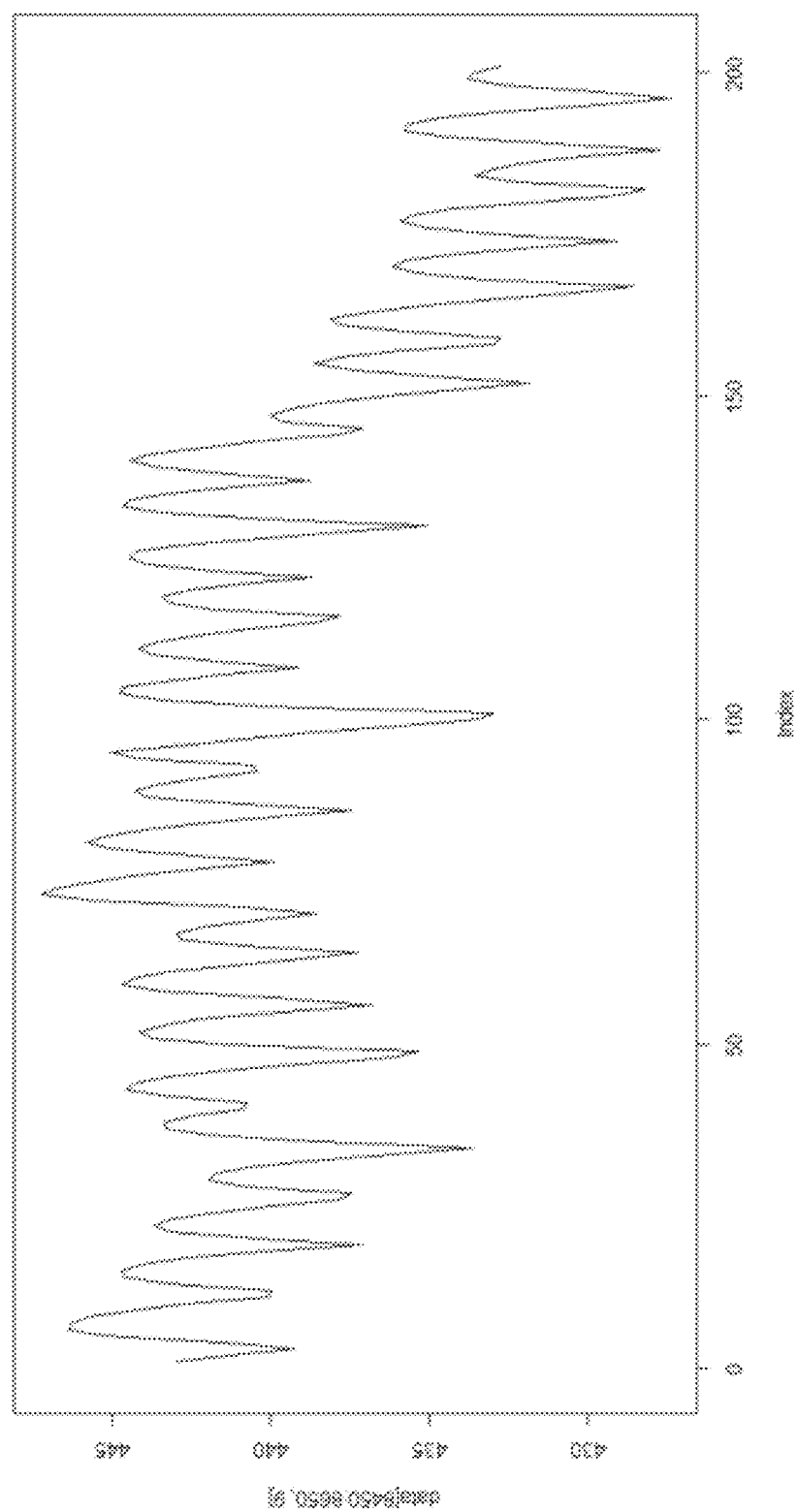

FIG. 12E depicts an illustrative temperature profile for a fifth catalyst transfer pipe, where TP=7.4, 8.1, 7.2, 7.6, 7.9. This pipe is behaving normally.

Figure 12F:
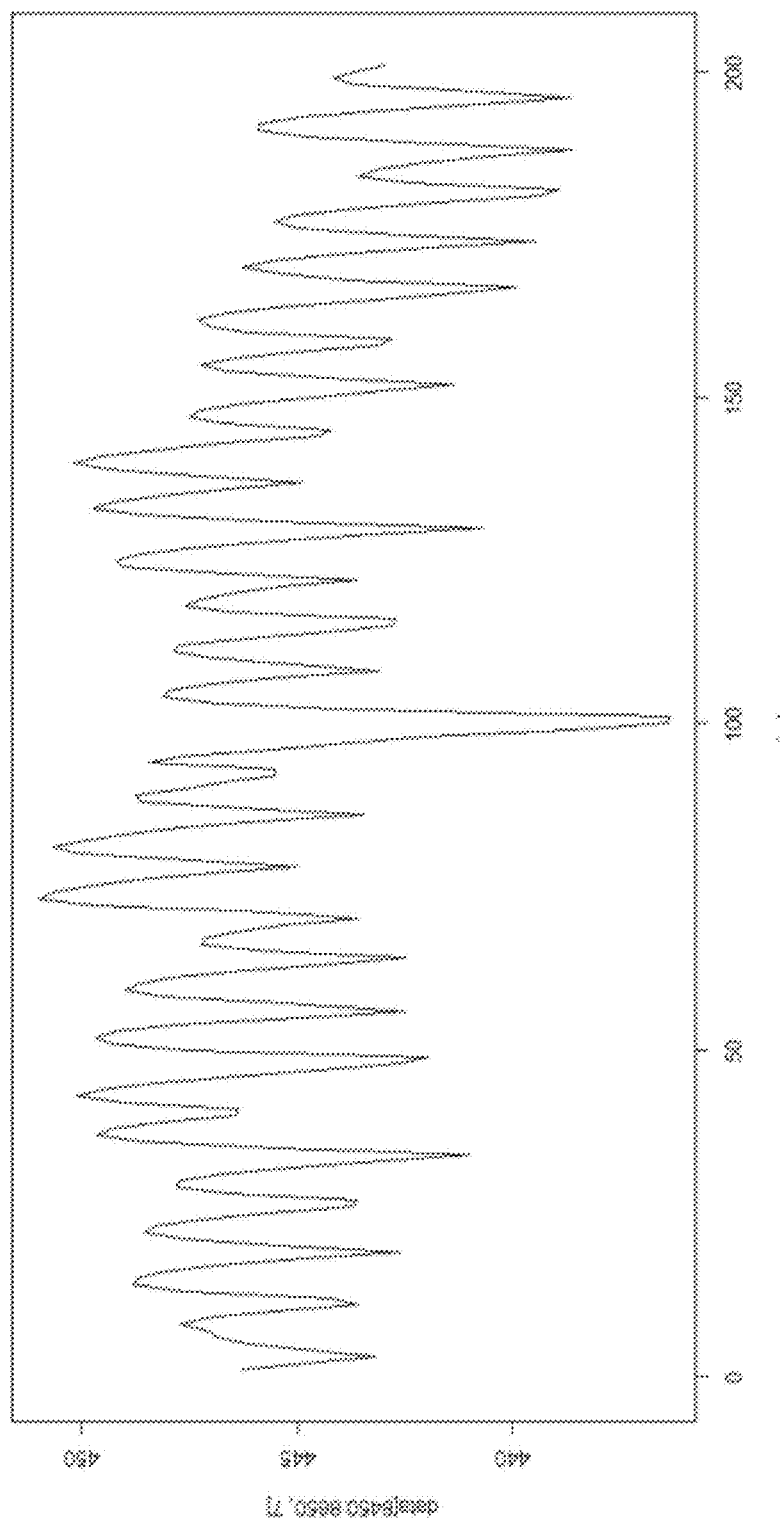

FIG. 12F depicts an illustrative temperature profile for a sixth catalyst transfer pipe, where TP=7.3, 8.1, 7.3, 7.6, 7.9. This pipe is behaving normally.

Figure 12G:
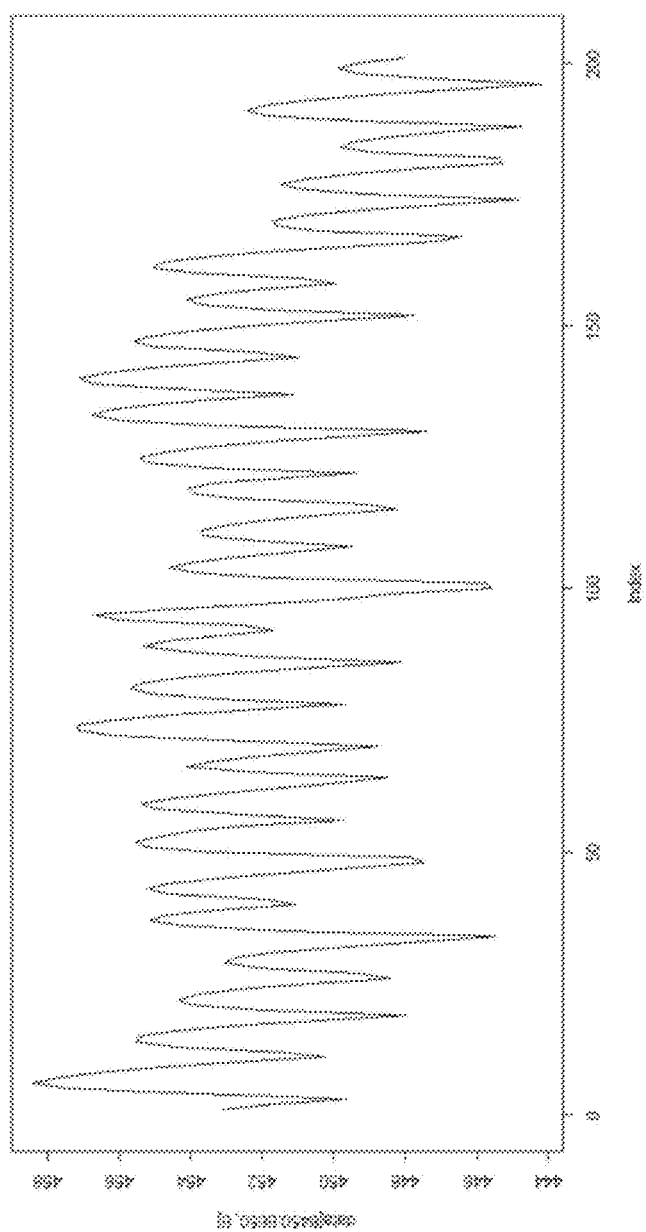

FIG. 12G depicts an illustrative temperature profile for a seventh catalyst transfer pipe, where TP=7.6, 8.1, 7.4, 7.5, 8.1. This pipe is behaving normally.

Figure 12H:
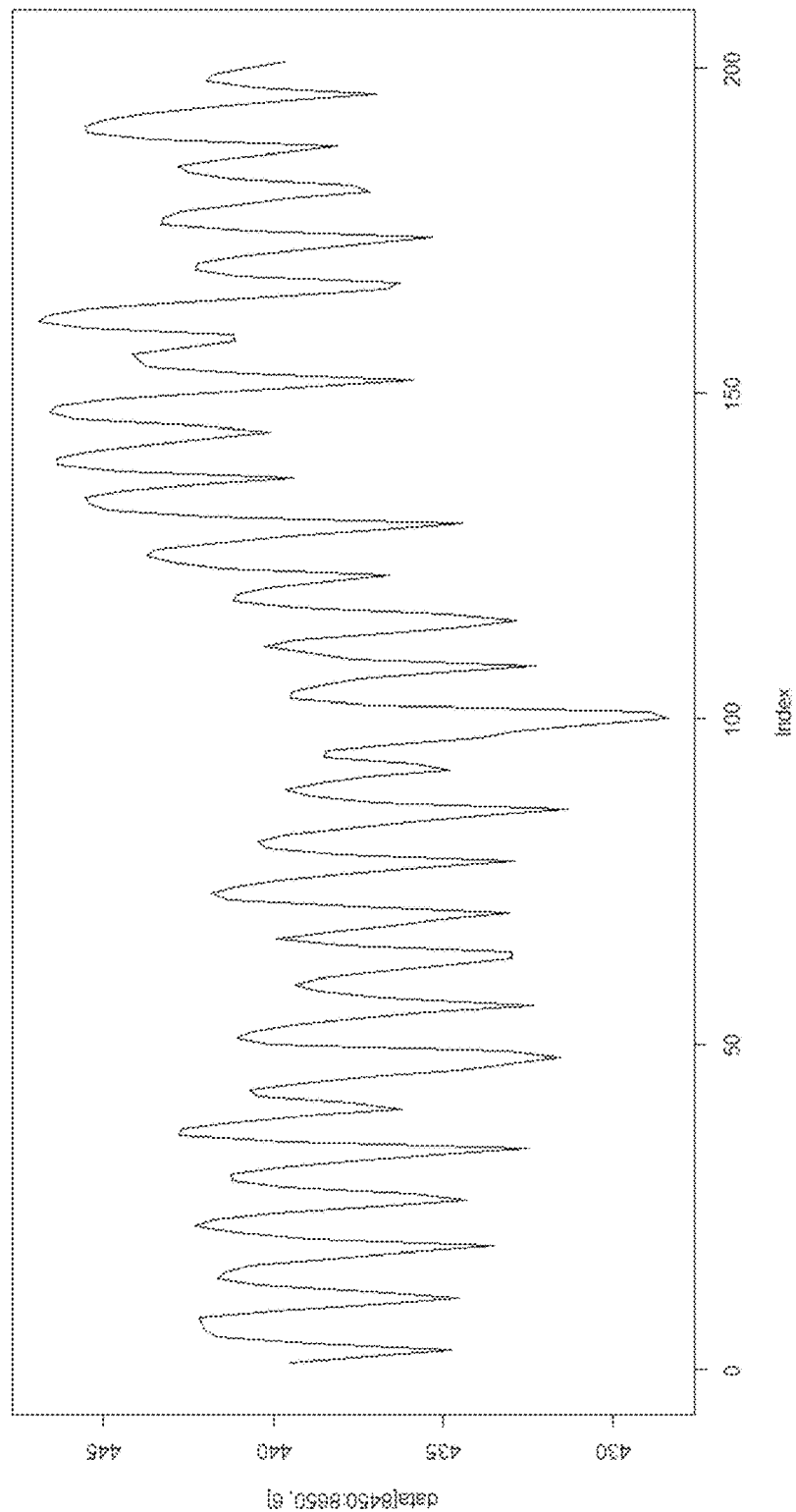

FIG. 12H depicts an illustrative temperature profile for an eighth catalyst transfer pipe, where TP=7.5, 7.9, 7.6, 7.6, 7. This pipe is behaving normally.

Figure 12I:
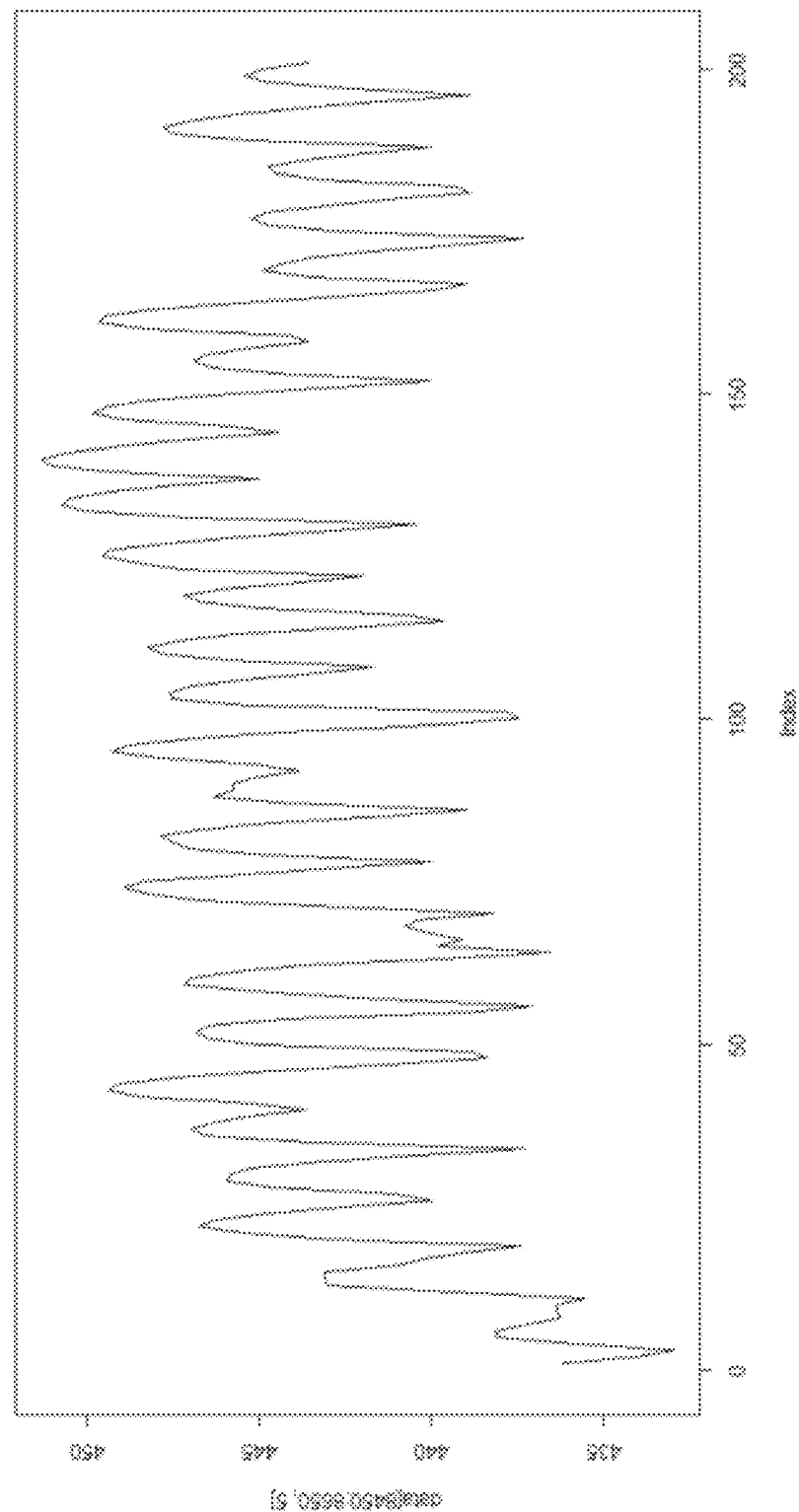

FIG. 12I depicts an illustrative temperature profile for a ninth catalyst transfer pipe, where TP=7.7, 8, 7.3, 7.5, 7.4. This pipe is behaving normally.

Figure 12J:
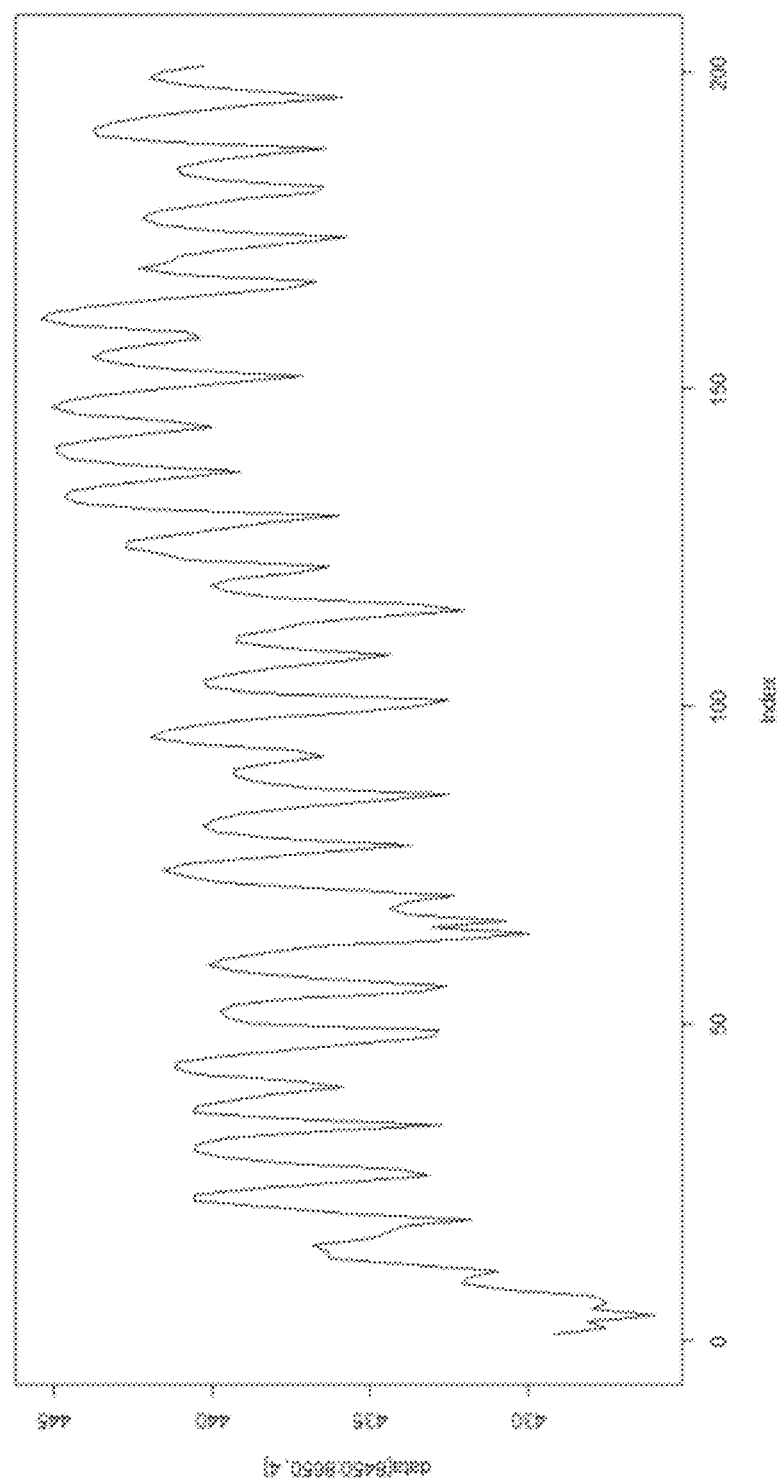

FIG. 12J depicts an illustrative temperature profile for a tenth catalyst transfer pipe, where TP=7.8, 8, 7.5, 7.6, 8.4. This pipe is behaving normally.

Figure 12K:
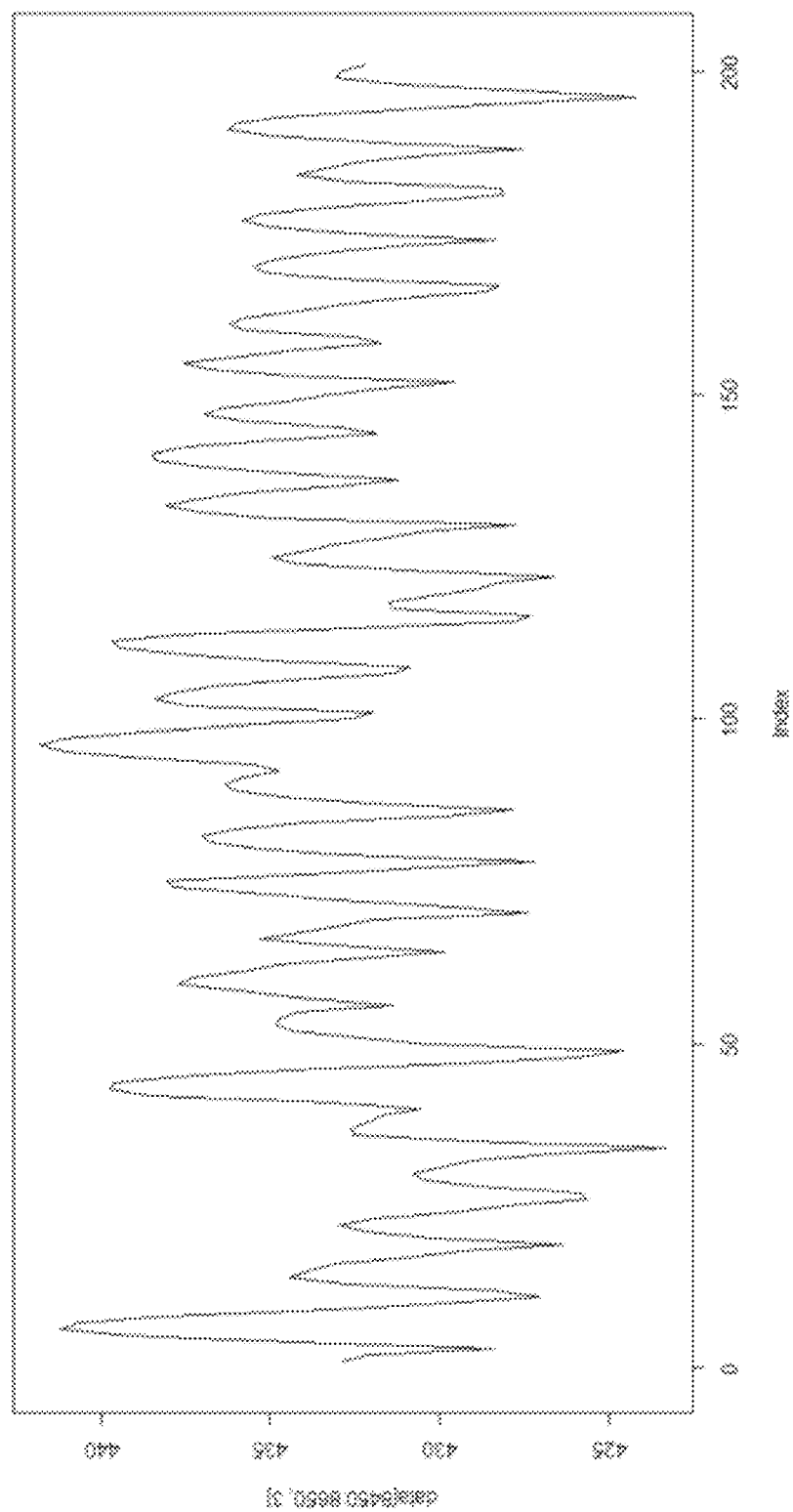

FIG. 12K depicts an illustrative temperature profile for a eleventh catalyst transfer pipe, where TP=7.4, 8.1, 7.2, 7.6, 7.9. This pipe is behaving normally.

Figure 12L:
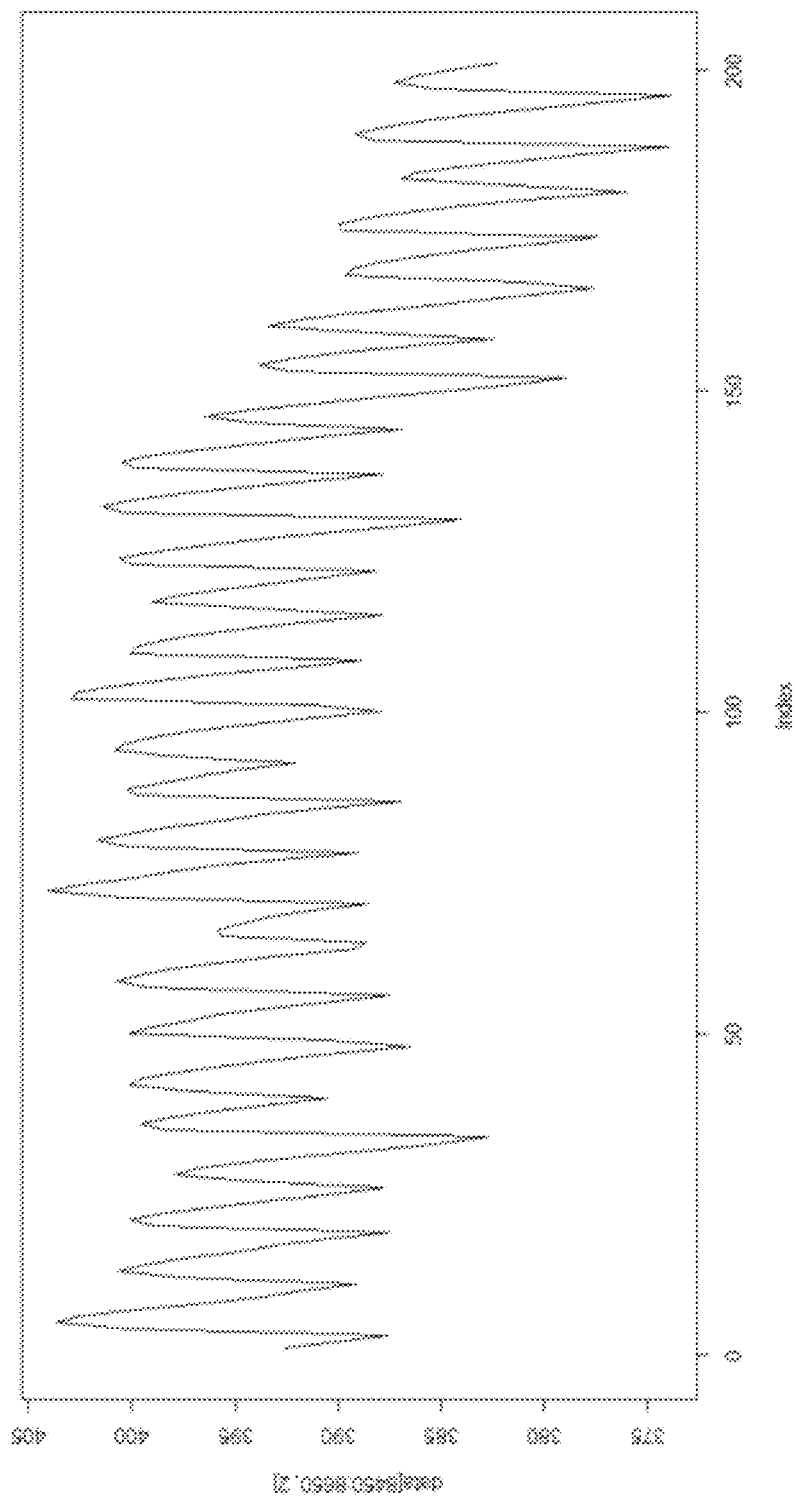

FIG. 12L depicts an illustrative temperature profile for a twelfth catalyst transfer pipe, where TP=7.7, 8.1, 7.6, 7.6, 8.5. This pipe is behaving normally.

FIG. 13 depicts an illustrative table of example peak-to-valley amplitudes. A MaxPV may be determined by referencePV+referencePV*0.5, where 0.5 may be variable. A MinPV may be determined by referencePV−referencePV*0.5, where 0.5 may be variable. If a peak-to-valley amplitude for a pipe is not within MaxPV and MinPV for a threshold number (e.g., five) of successive batches, then the alarm may be raised. For example, pipe2 may be giving an alarm based on peak-to-valley amplitude deviation.

FIGS. 14A-14L each depict an illustrative temperature profile for a different catalyst transfer pipe.

Figure 14A:
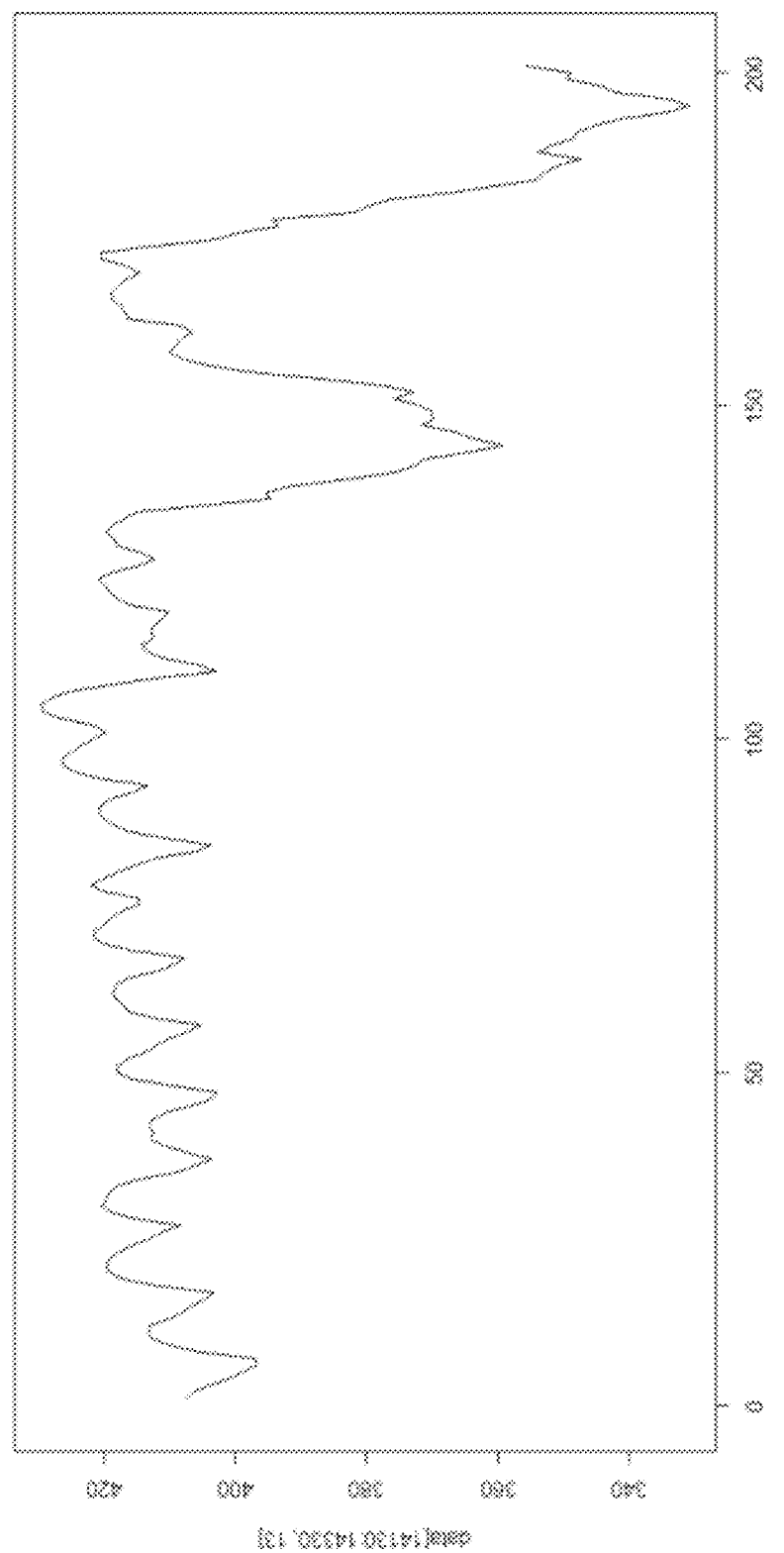
FIGS. 14A-14L each depict an illustrative temperature profile for a different catalyst transfer pipe in accordance with one or more example embodiments.

FIG. 14A depicts an illustrative temperature profile for a pipe that is behaving normally. The pipe's peak-to-valley amplitude is not deviating from a reference value.

Figure 14B:
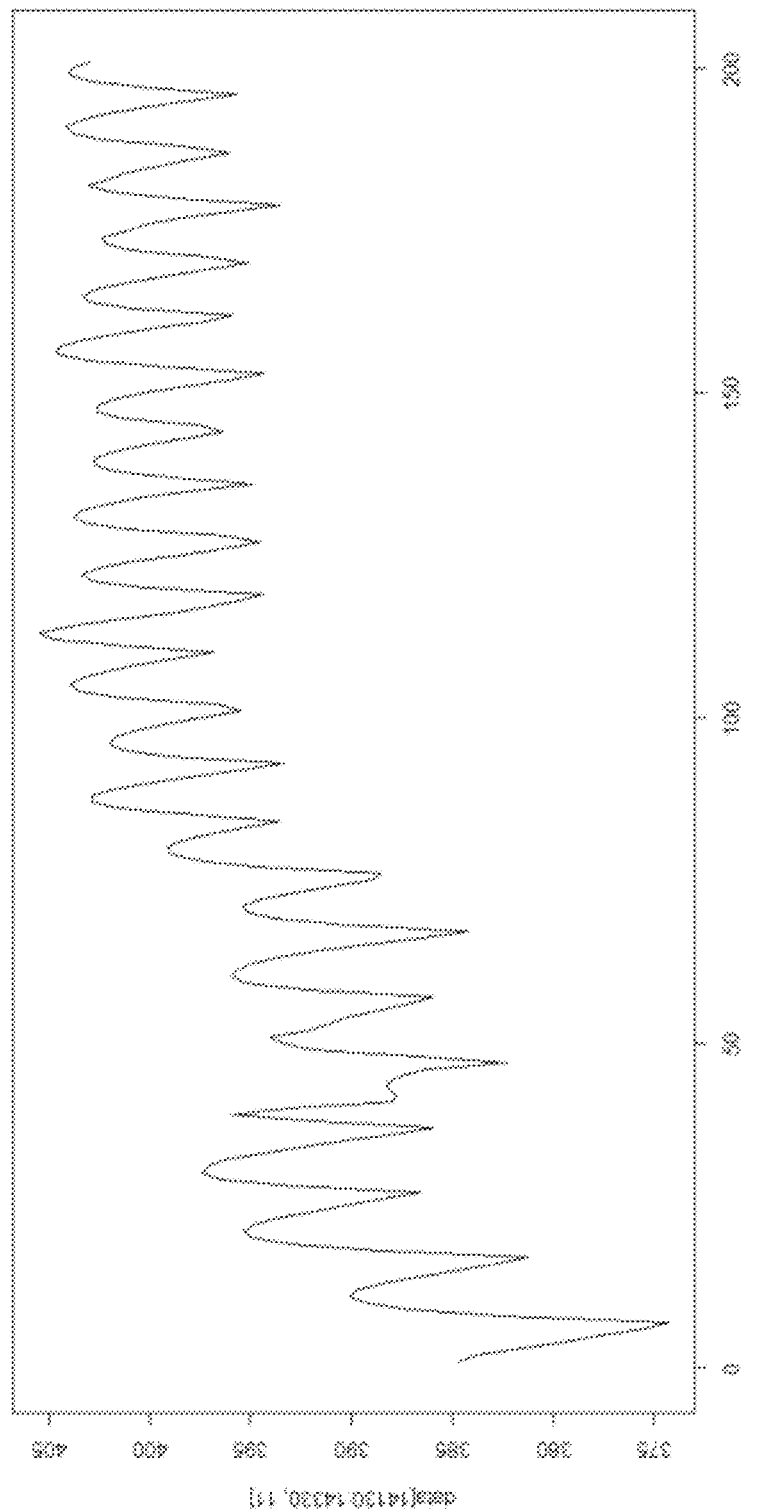

FIG. 14B depicts an illustrative temperature profile for a pipe that is behaving normally. The pipe's peak-to-valley amplitude is not deviating from a reference value.

Figure 14C:
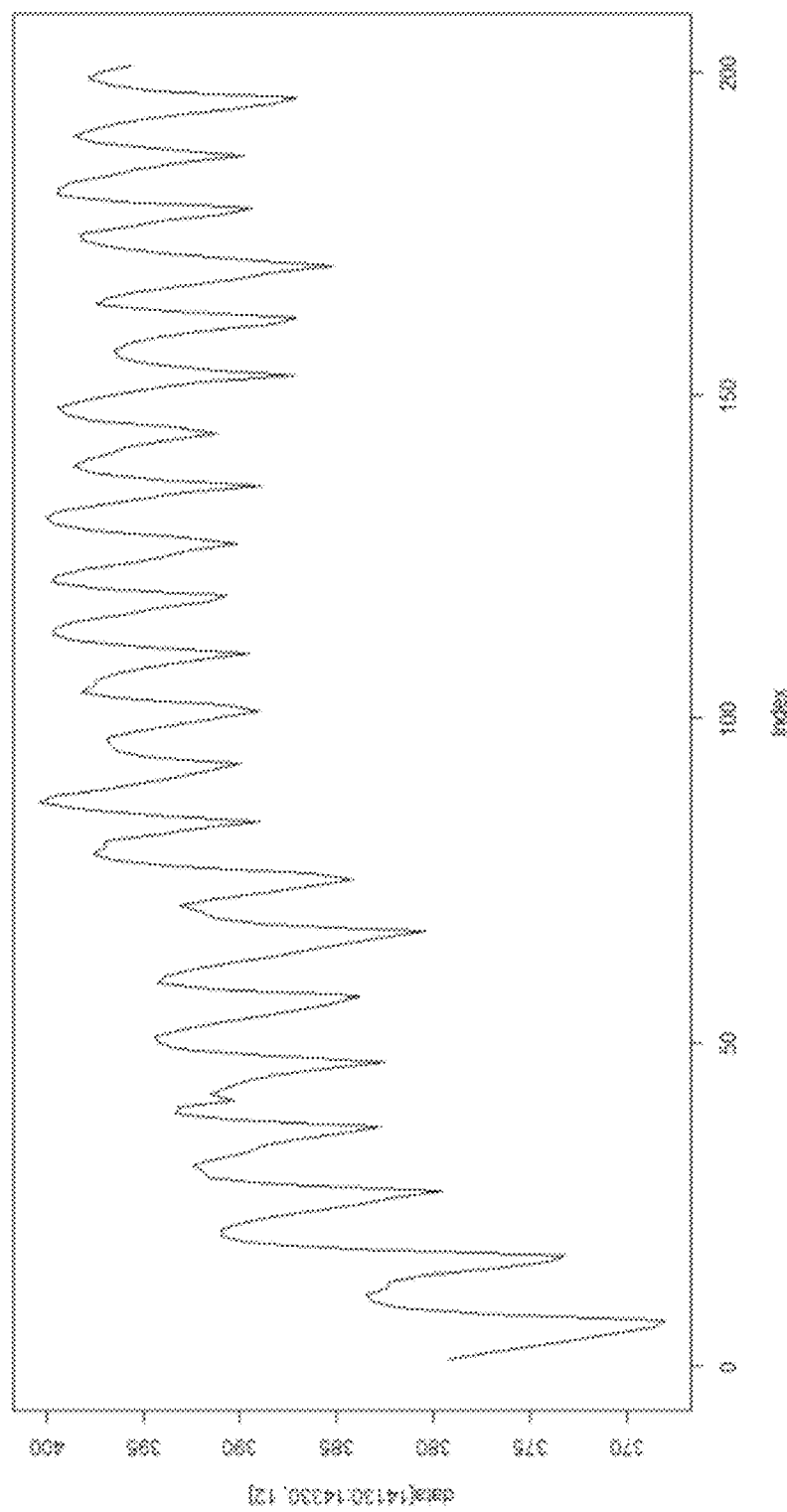

FIG. 14C depicts an illustrative temperature profile for a pipe that is behaving normally. The pipe's peak-to-valley amplitude is not deviating from a reference value.

Figure 14D:
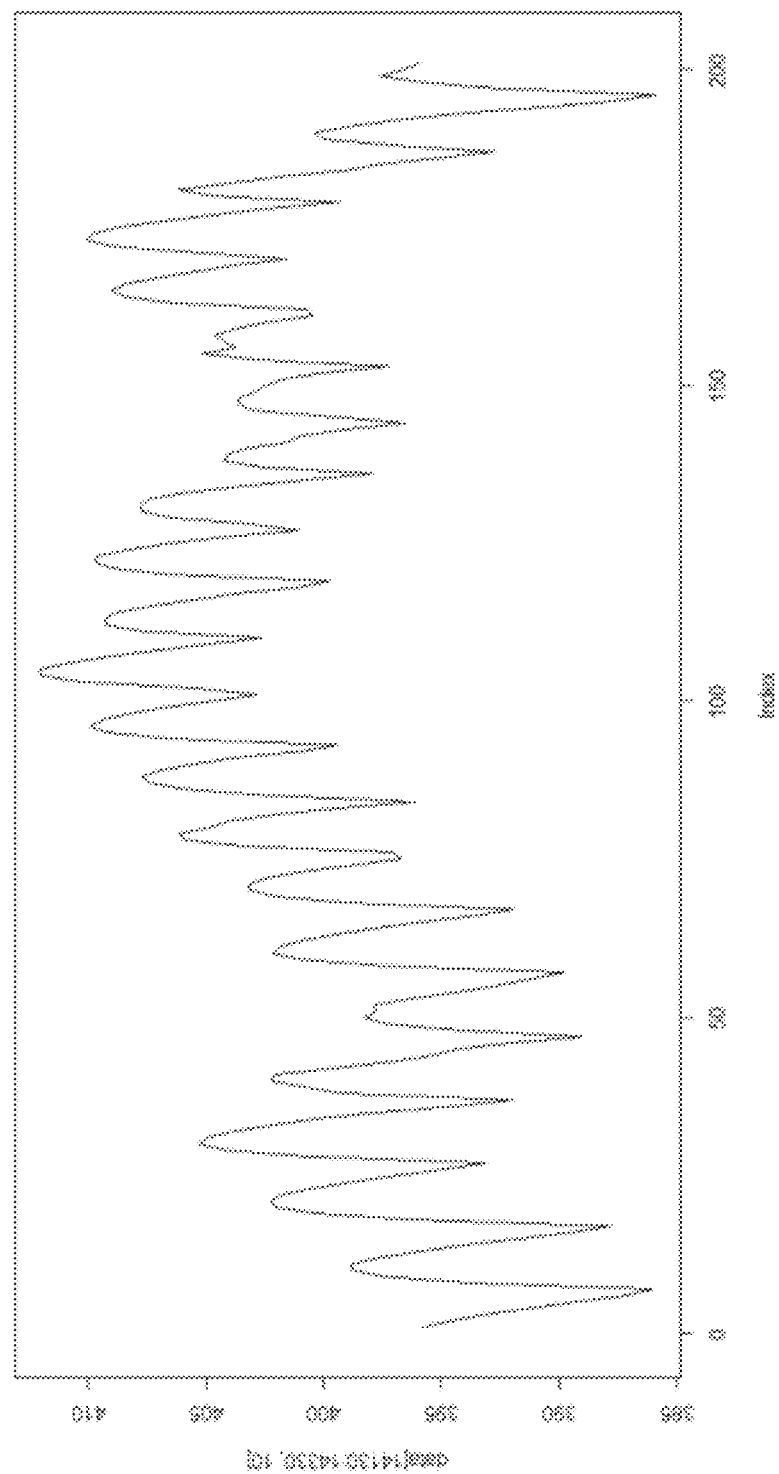

FIG. 14D depicts an illustrative temperature profile for a pipe that is behaving normally. The pipe's peak-to-valley amplitude is not deviating from a reference value.

Figure 14E:
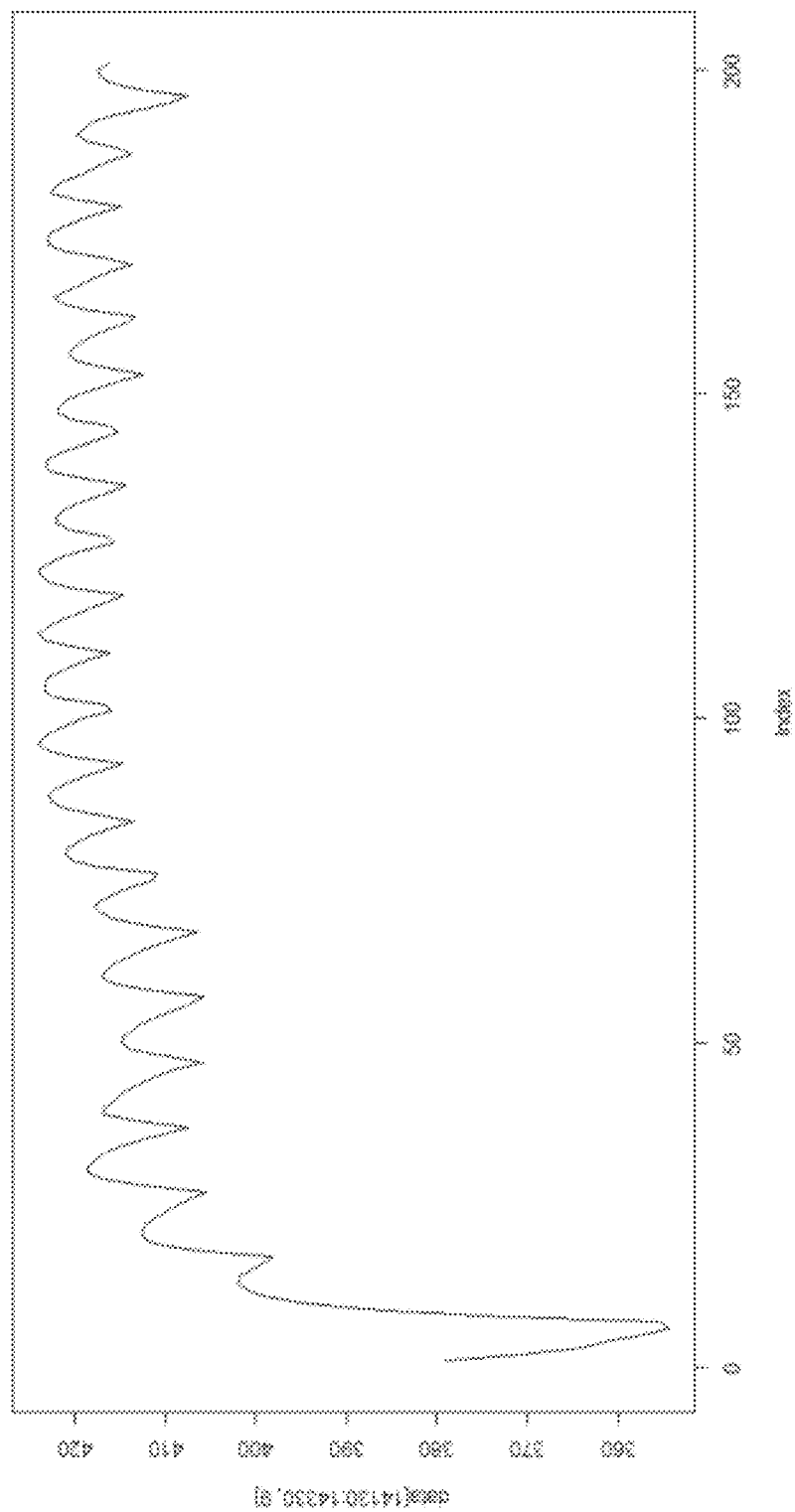

FIG. 14E depicts an illustrative temperature profile for a pipe that is behaving normally. The pipe's peak-to-valley amplitude is not deviating from a reference value.

Figure 14F:
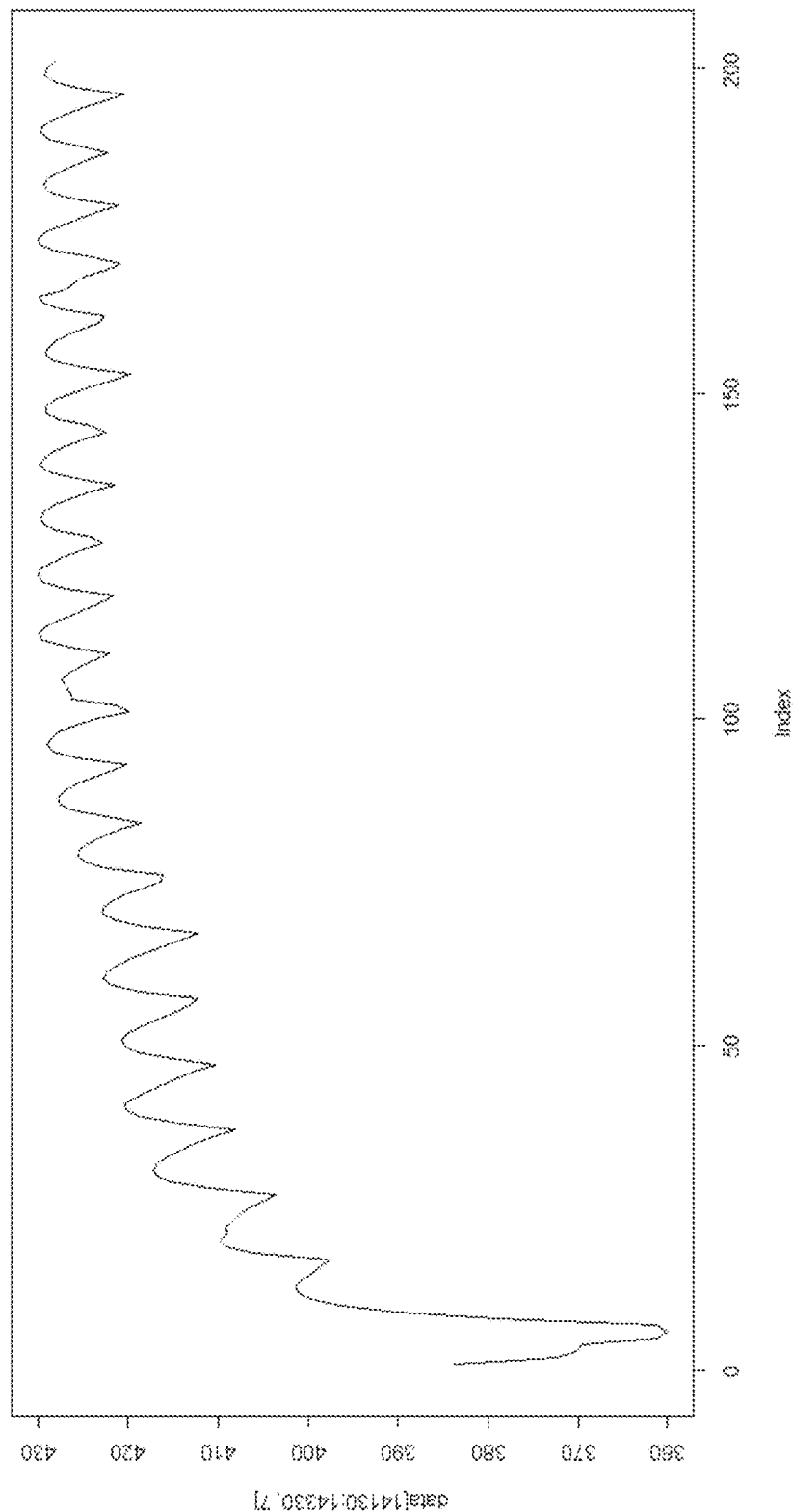

FIG. 14F depicts an illustrative temperature profile for a pipe that is behaving normally. The pipe's peak-to-valley amplitude is not deviating from a reference value.

Figure 14G:
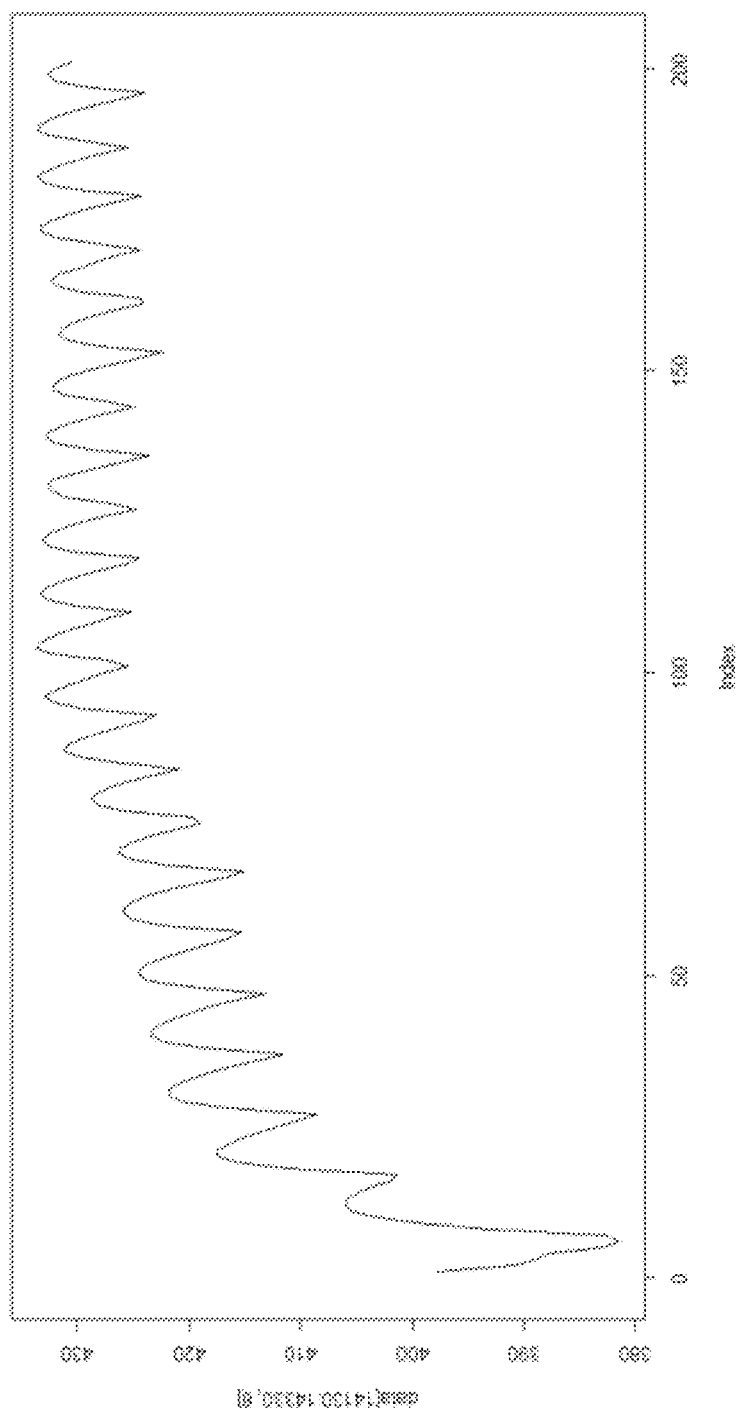

FIG. 14G depicts an illustrative temperature profile for a pipe that is behaving normally. The pipe's peak-to-valley amplitude is not deviating from a reference value.

Figure 14H:
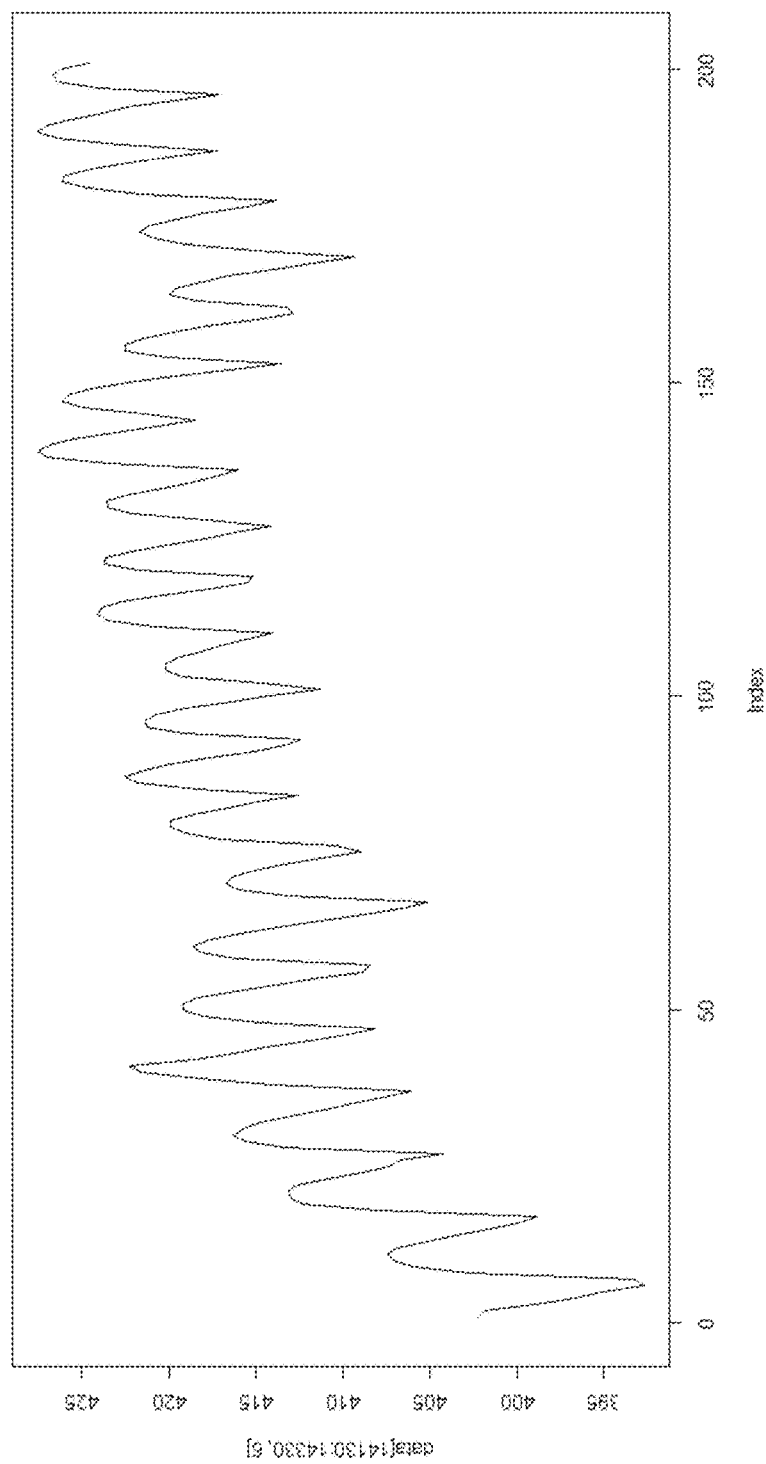

FIG. 14H depicts an illustrative temperature profile for a pipe that is behaving normally. The pipe's peak-to-valley amplitude is not deviating from a reference value.

Figure 14I:
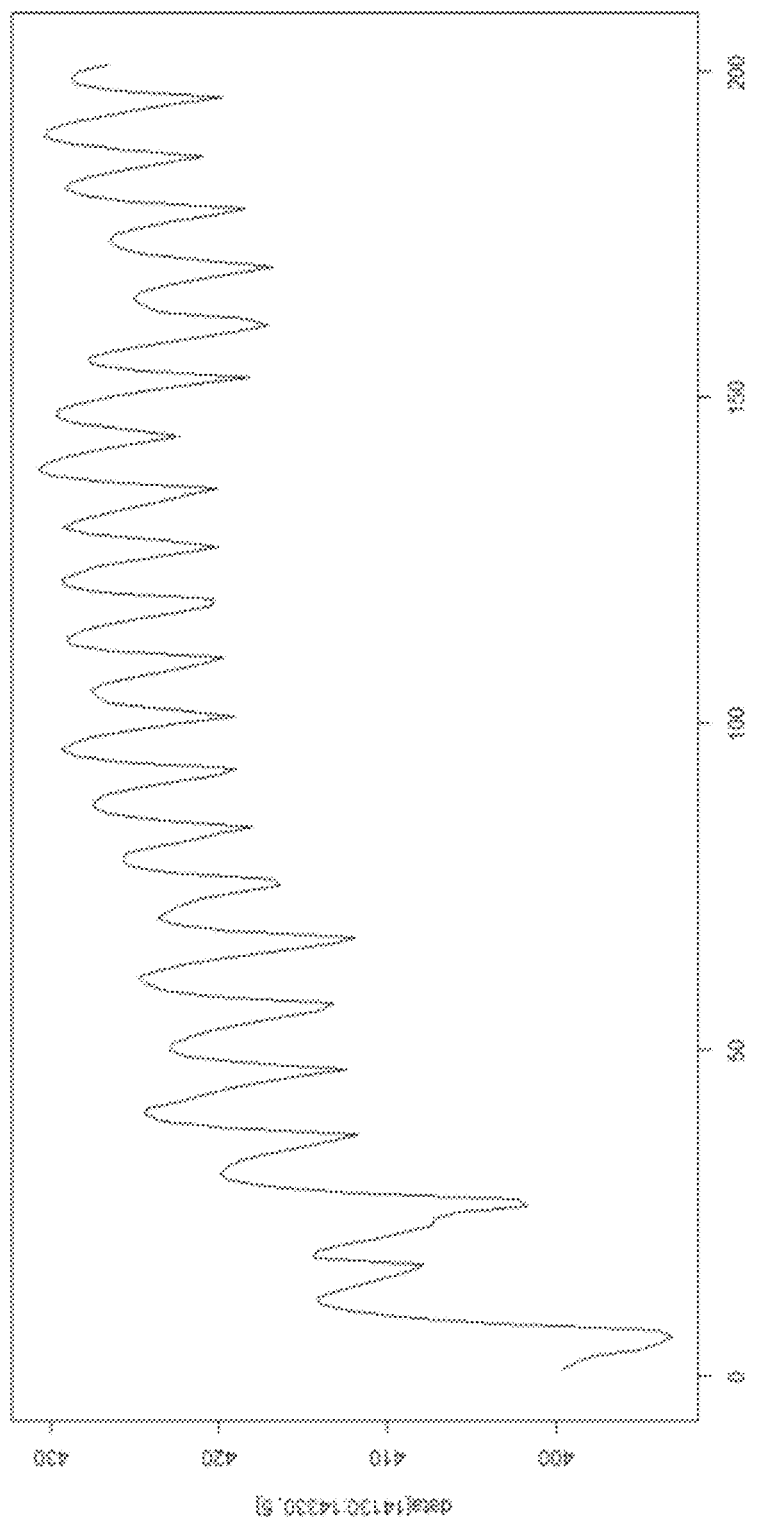

FIG. 14I depicts an illustrative temperature profile for a pipe that is behaving normally. The pipe's peak-to-valley amplitude is not deviating from a reference value.

Figure 14J:
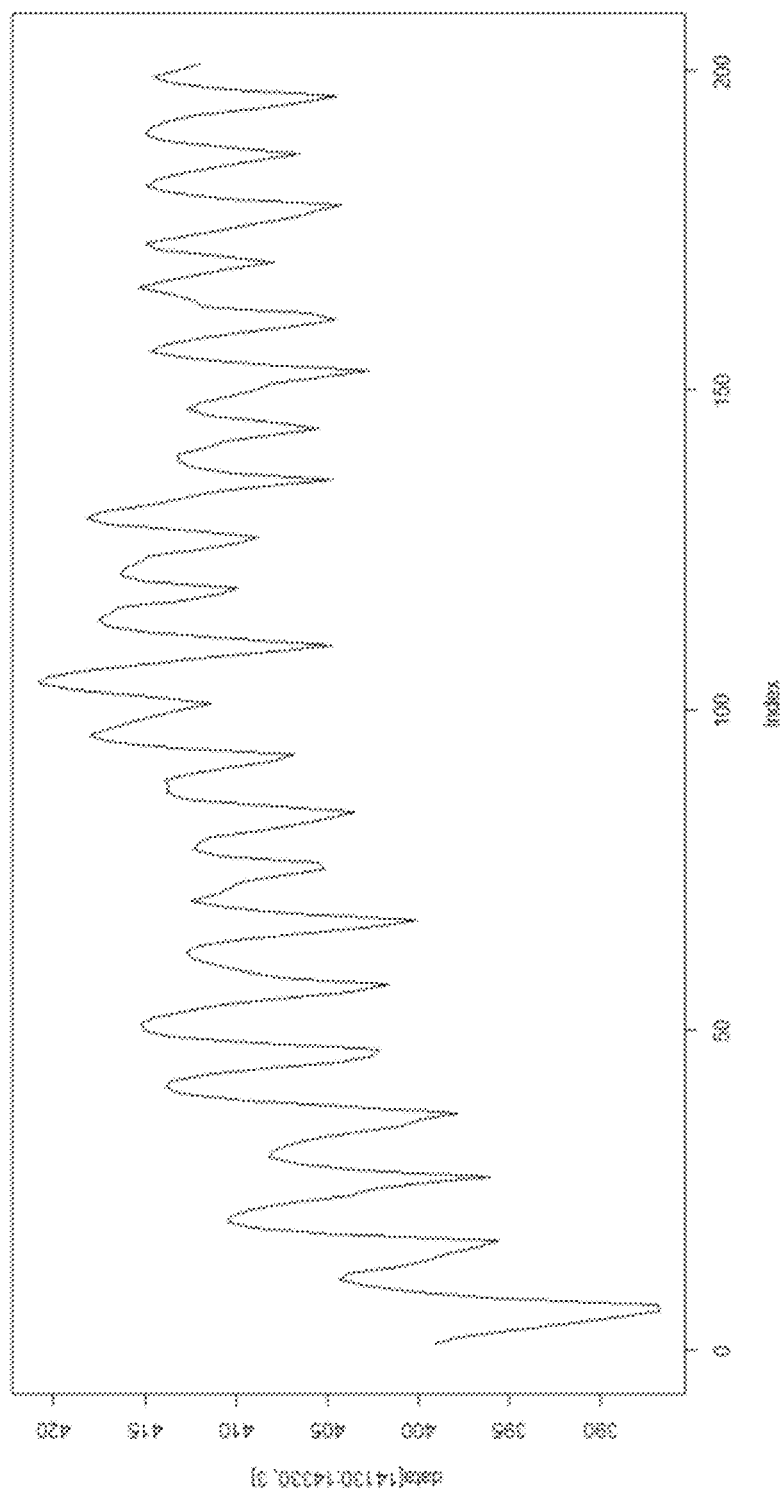

FIG. 14J depicts an illustrative temperature profile for a pipe that is not behaving normally. The pipe's peak-to-valley amplitude is deviating from a reference value by a small amount consistently for more than a threshold (e.g., three) number of cycles. Additional details are given in the table depicted in FIG. 13.

Figure 14K:
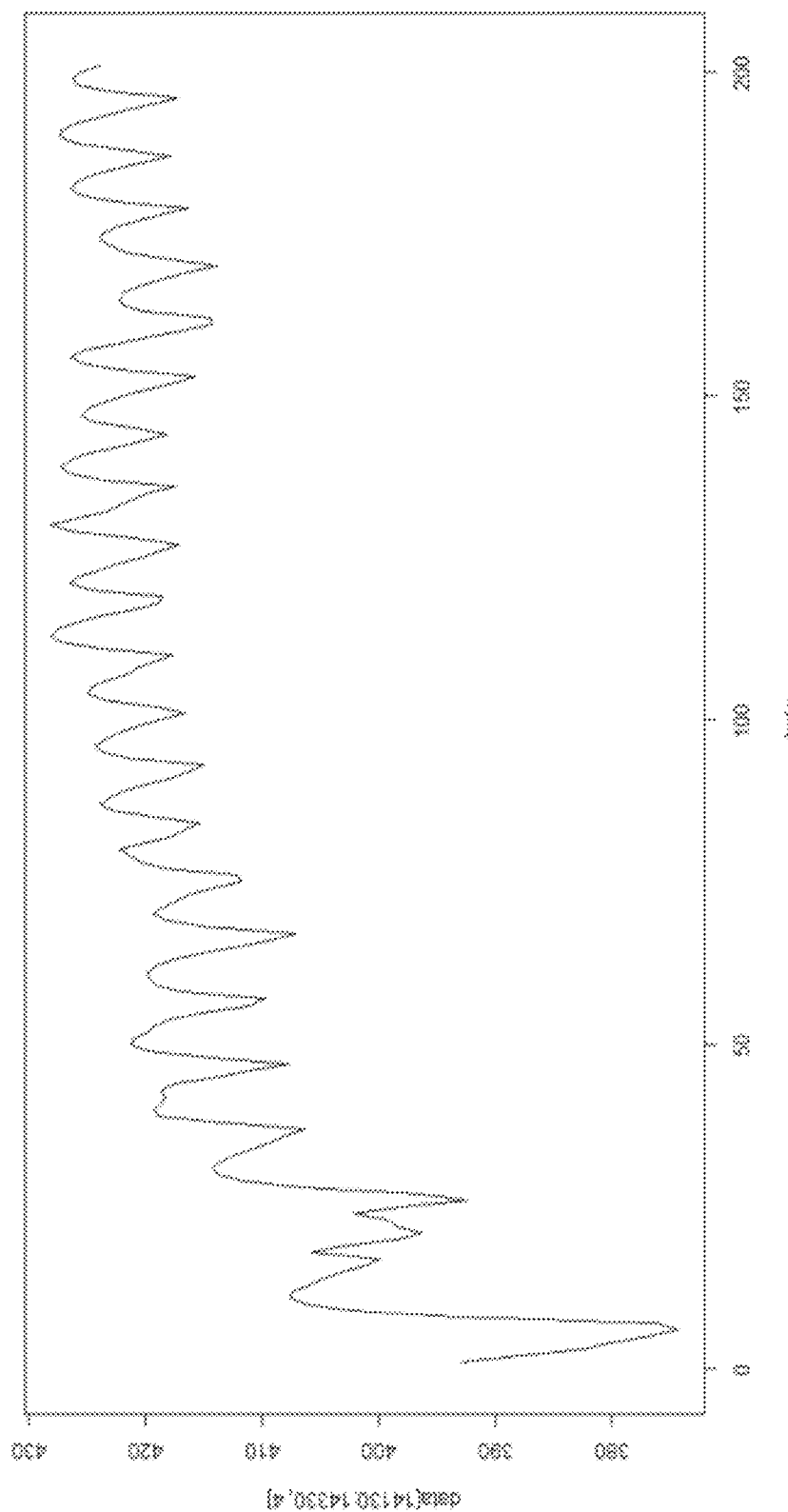

FIG. 14K depicts an illustrative temperature profile for a pipe that is behaving normally. The pipe's peak-to-valley amplitude is not deviating from a reference value.

Figure 14L:
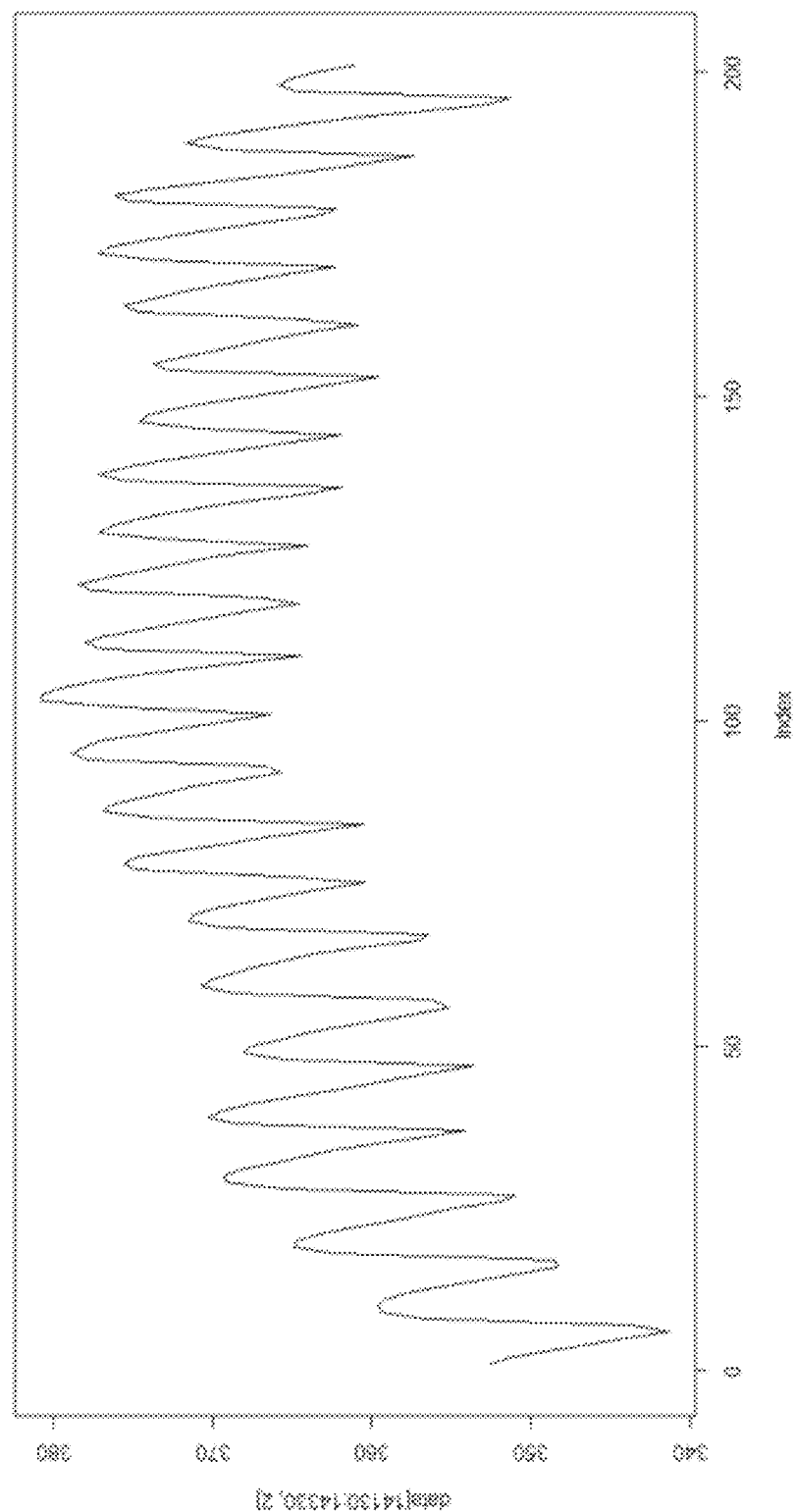

FIG. 14L depicts an illustrative temperature profile for a pipe that is behaving normally. The pipe's peak-to-valley amplitude is not deviating from a reference value.

Figure 15A:
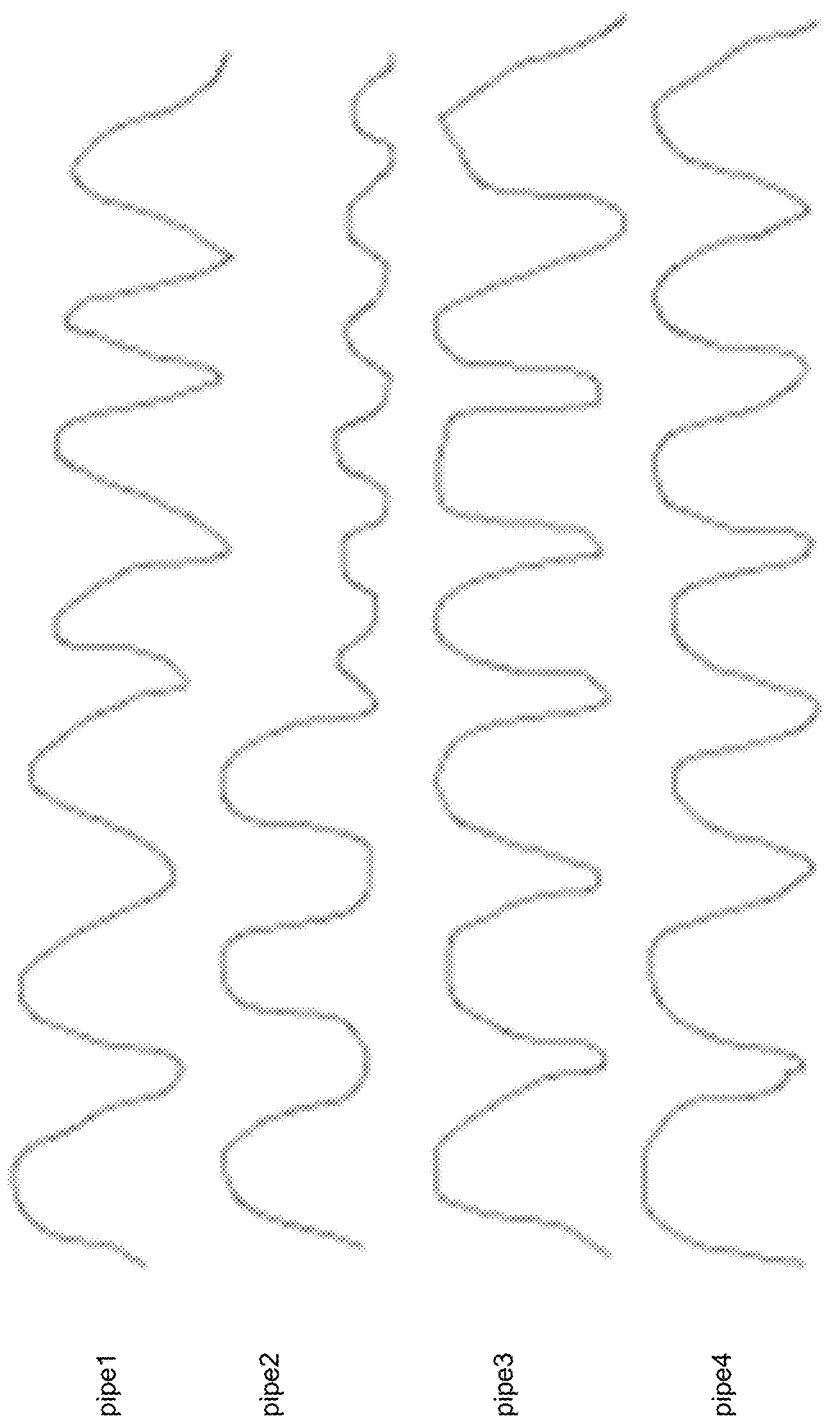
FIG. 15A depicts an illustrative graph of pipe signals, where one pipe is experiencing peak-to-valley amplitude deviation in accordance with one or more example embodiments.

FIG. 15A depict an illustrative example of a peak-to-valley amplitude deviation. As shown in FIG. 15A, signals corresponding to four pipes (e.g., pipe1, pipe2, pipe3, pipe4) may be determined. Peak to valley amplitude of each pipe may be consistent at the beginning of a measurement time period. An initial peak-to-valley amplitude may be calculated while all pipes are behaving normally (e.g., consistently relative to each other). Initially, pipes 1-4 are behaving normally.

When there is a change in peak-to-valley amplitude, if there are similar changes across a majority or all pipes, then there might be no alarm. But if there is a deviation in one or more pipes that is different from the deviations in the other pipes, there might an alarm (e.g., because those one or more pipes might be plugging).

For example, as shown for pipe2, after some time, pipe2 starts behaving abnormally. Specifically, when comparing the graph of the signal for pipe2, a determination may be made that the graph for pipe2 starts deviating relative to the graphs for pipe1, pipe3, and pipe4 in that the peak-to-valley amplitude of the graph for pipe2 is reduced from its initial peak-to-valley amplitude. Meanwhile, the peak-to-valley amplitudes for pipe1, pipe3, and pipe4 are relatively constant, and are not deviating from their respective reference peak-to-valley amplitudes.

FIG. 15B depicts an illustrative example of a time period deviation. As shown in FIG. 15B, signals corresponding to four pipes (e.g., pipe1, pipe2, pipe3, pipe4) may be determined. Initially, the time period for all four pipes may be relatively similar (e.g., nearly the same time period). An initial time period may be calculated while all pipes are behaving normally (e.g., consistently relative to each other). Initially, pipes 1-4 are behaving normally.

When there is a change in the time period of the signal, if there are similar changes across a majority or all pipes, then there might be no alarm. But if there is a deviation in one or more pipes that is different from the deviations in the other pipes, then there might be an alarm (e.g., because those one or more pipes might be plugging).

For example, as shown for pipe3, after some time, pipe3 starts behaving abnormally. Specifically, when comparing the graph of the signal for pipe 3 to the graph of the signals for pipe1, pipe2, and pipe4, a determination may be made that the graph for pipe3 starts deviating relative to the graphs for pipe1, pipe2, and pipe4 in that the time period for pipe3 is different than a reference time period. In some aspects, the time period difference may be determined relative to a normal or standard time period (e.g., established earlier). In some aspects, the time period difference may be determined relative to a mean time period of all pipes in real or substantially real time (e.g., the time period determination may lag by one cycle, two cycles, three cycles, four cycles, five cycles, by one second, by two seconds, three seconds, four seconds, five seconds). Meanwhile, pipe1, pipe2, and pipe4 are not deviating from their reference time period, and therefore it can be determined that those pipes are acting normally and that pipe3 is acting abnormally.

FIGS. 16A-16E depict illustrative histogram graphs of alarms that may be raised for a particular set of pipes over a particular time period. A sampling time may be used (e.g., five minutes). Data may be up-sampled to a particular sampling rate using linear interpolation. An algorithm may be run on CTP temperature profiles of each reactor. The histogram of alarms may be plotted for each reactor (e.g., in FIGS. 16A-16E). The algorithm may be tested on data where original data is at a particular sampling rate (e.g., 5 seconds, 10 seconds, 15 seconds, 30 seconds, 45 seconds, 60 seconds, 2 minutes, 5 minutes, 10 minutes). If data is sampled at a more frequent sampling rate, the data resolution may be higher. If data is sampled at a more infrequent sampling rate, then interpolation may be used to determine data between the samples.

Figure 16A:
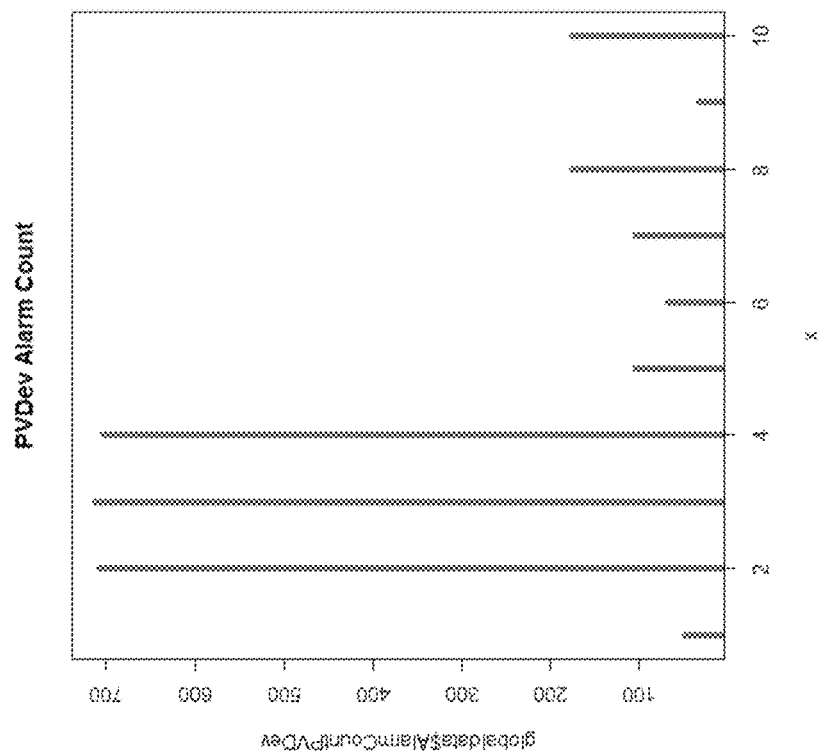
FIGS. 16A-16E depict illustrative histogram graphs of alarms that may be raised catalyst transfer pipes in accordance with one or more example embodiments.
Figure 16A:
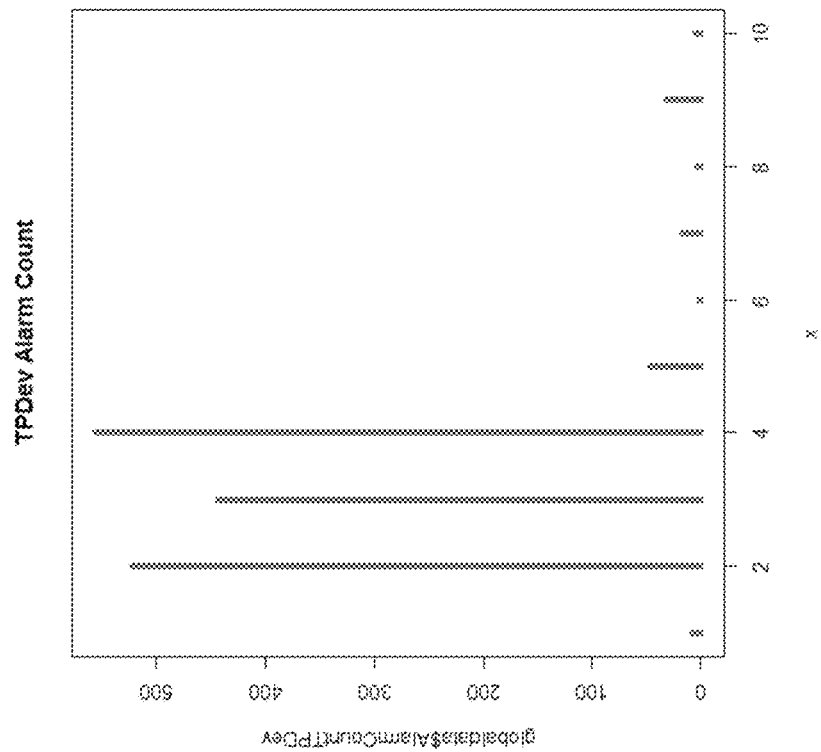

FIG. 16A depicts a histogram of a first reactor with ten pipes. The left histogram may show a number of alarms generated for each pipe based on monitoring the time period deviation for that pipe. The right histogram may show a number of alarms generated for each pipe based on monitoring the peak-to-valley amplitude deviation for that pipe.

Figure 16B:
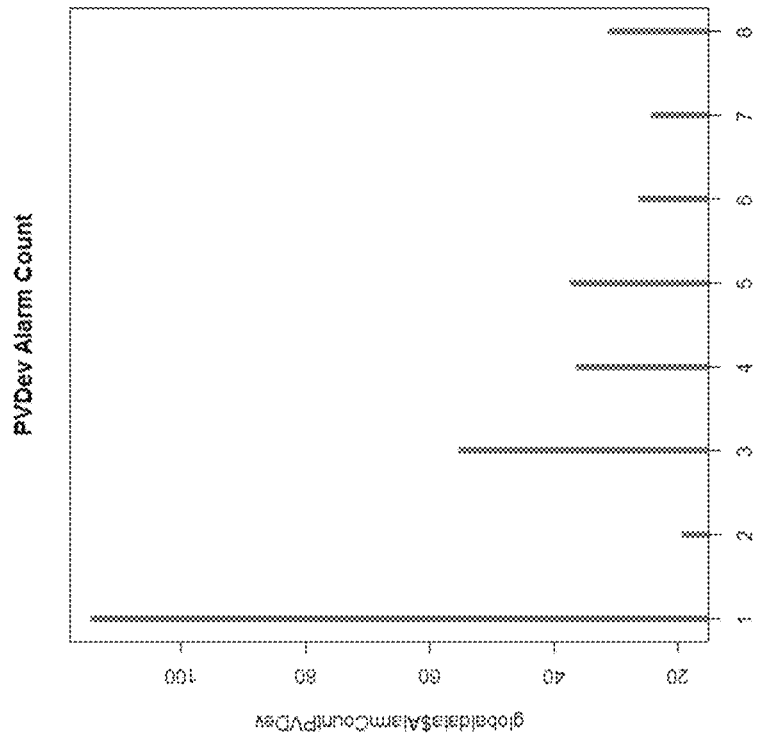
Figure 16B:
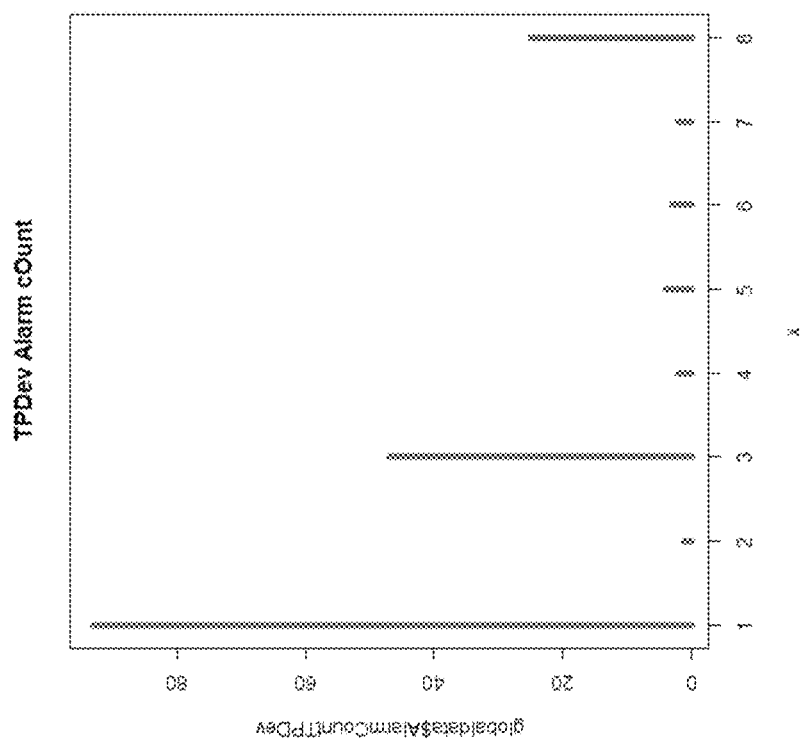

FIG. 16B depicts a histogram of a second reactor with eight pipes. The left histogram may show a number of alarms generated for each pipe based on monitoring the time period deviation for that pipe. The right histogram may show a number of alarms generated for each pipe based on monitoring the peak-to-valley amplitude deviation for that pipe.

Figure 16C:
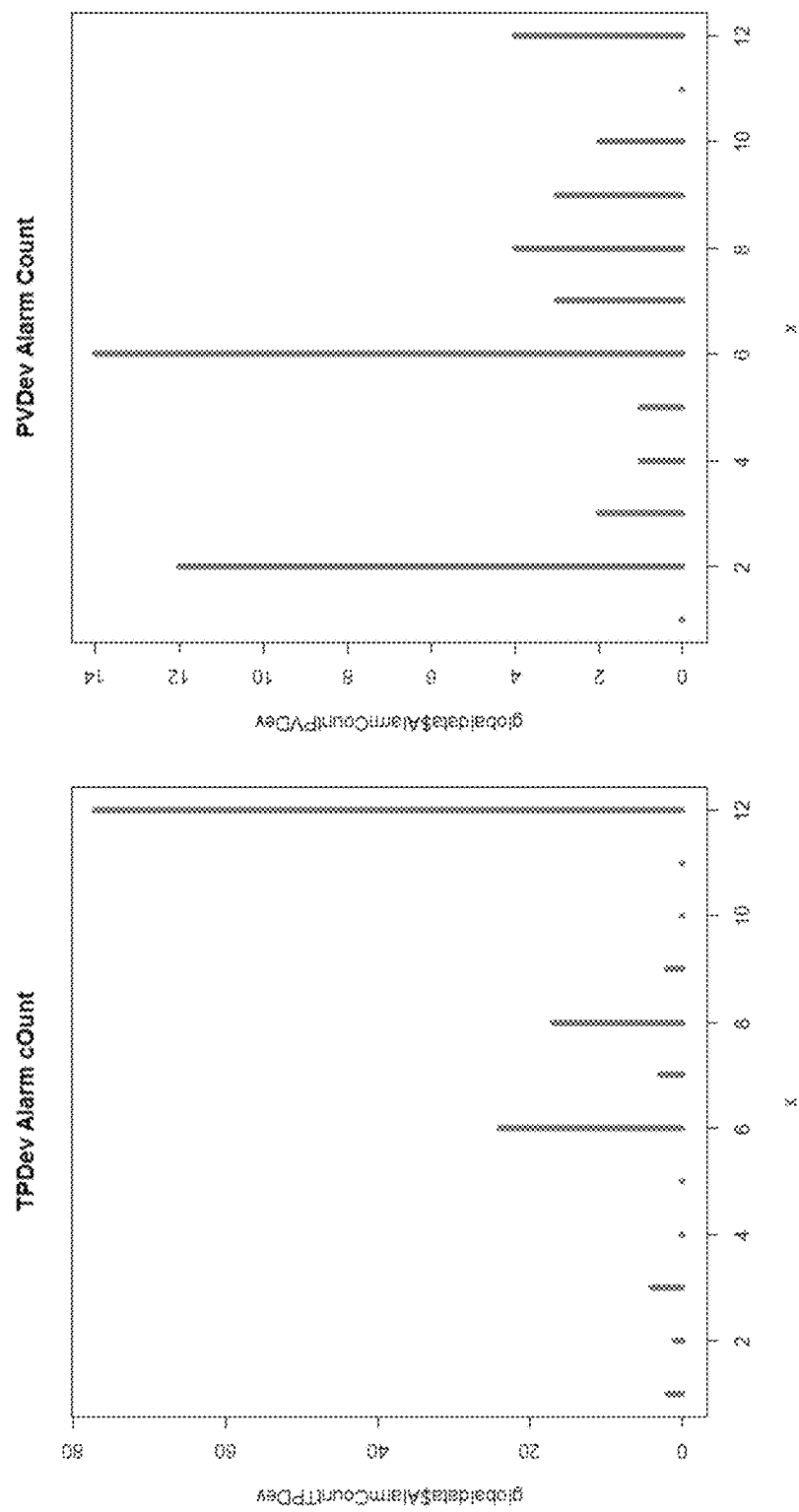

FIG. 16C depicts a histogram of a third reactor with twelve pipes. The left histogram may show a number of alarms generated for each pipe based on monitoring the time period deviation for that pipe. The right histogram may show a number of alarms generated for each pipe based on monitoring the peak-to-valley amplitude deviation for that pipe.

Figure 16D:
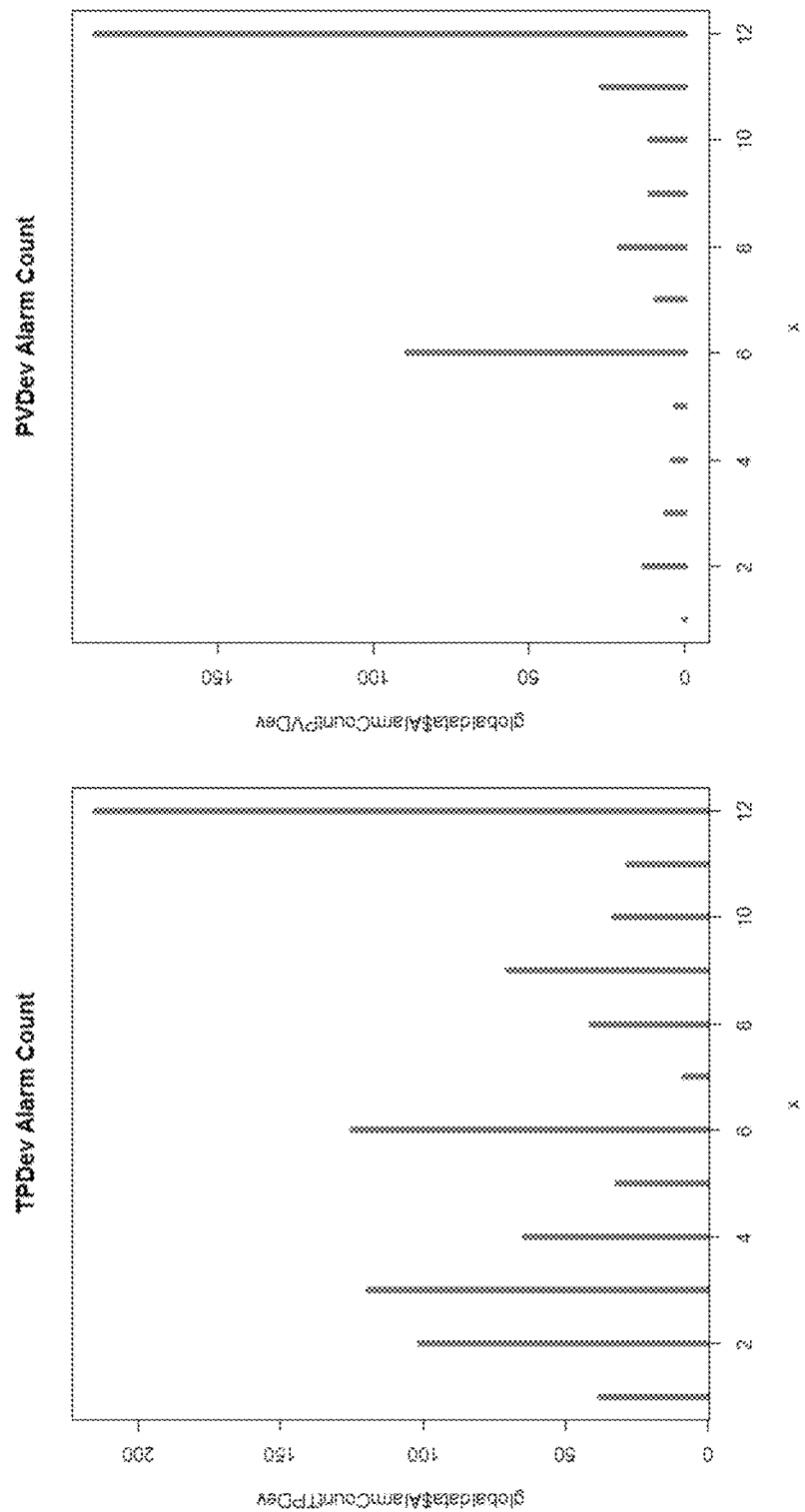

FIG. 16D depicts a histogram of a fourth reactor with twelve pipes. The left histogram may show a number of alarms generated for each pipe based on monitoring the time period deviation for that pipe. The right histogram may show a number of alarms generated for each pipe based on monitoring the peak-to-valley amplitude deviation for that pipe.

Figure 16E:
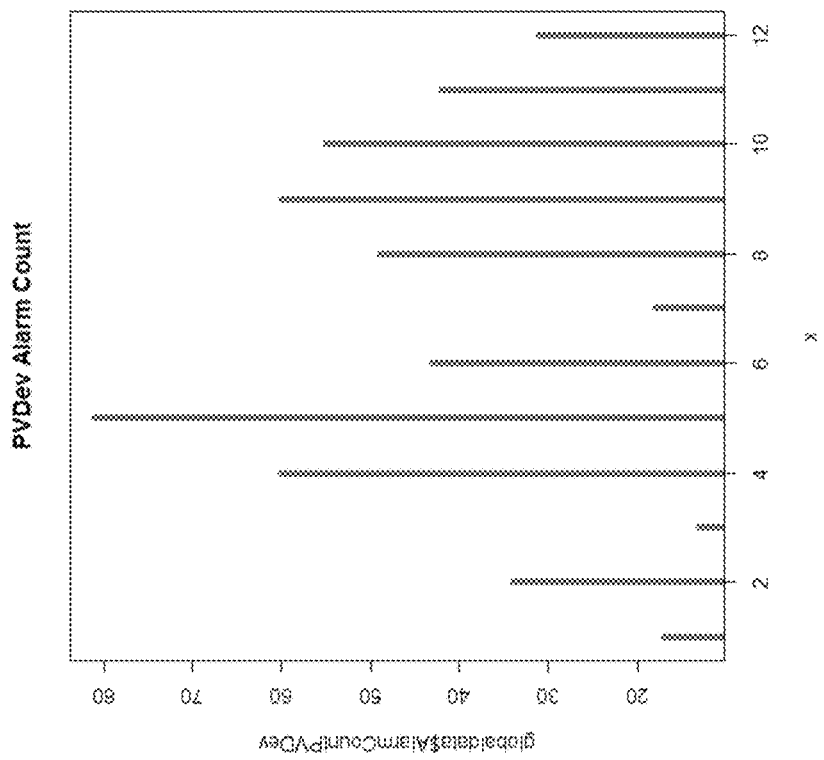
Figure 16E:
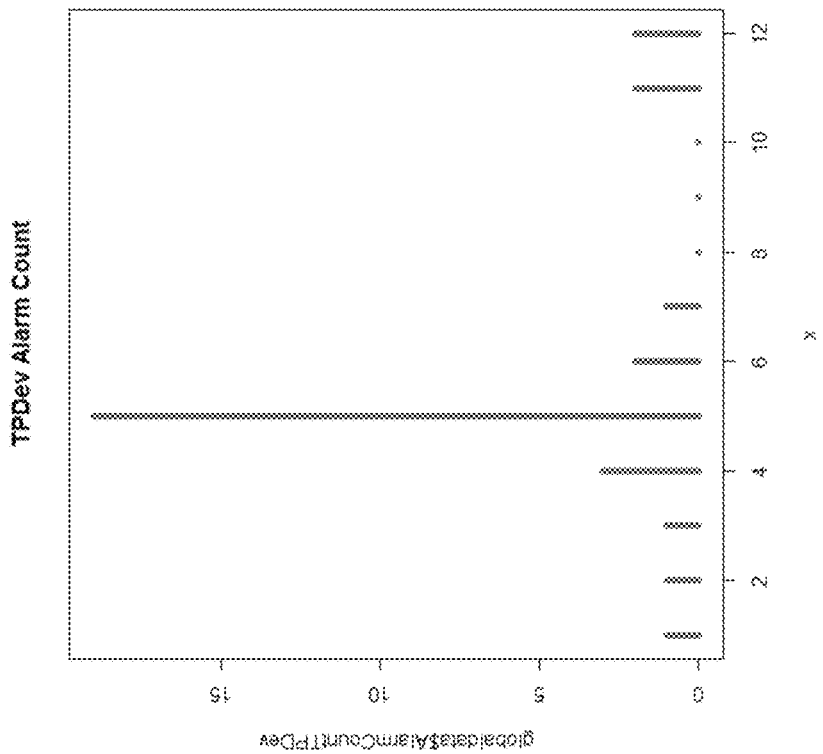

FIG. 16E depicts a histogram of a fifth reactor with twelve pipes. The left histogram may show a number of alarms generated for each pipe based on monitoring the time period deviation for that pipe. The right histogram may show a number of alarms generated for each pipe based on monitoring the peak-to-valley amplitude deviation for that pipe.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the disclosure.

What is claimed is:

1. A system for preventing catalyst-transfer-pipe plugging, the system comprising:
   a reactor configured for a dehydrogenation process, wherein the reactor is configured for use with a solid catalyst;
   a catalyst collector comprising a control valve, the catalyst collector configured to collect the solid catalyst;
   a plurality of catalyst transfer pipes extending from the reactor to the catalyst collector, the plurality of catalyst transfer pipes configured to enable flow of the solid catalyst from the reactor to the catalyst collector;
   one or more sensors affixed to an outside of a catalyst transfer pipe of the plurality of catalyst transfer pipes;
   a data collection platform comprising:
      one or more processors of the data collection platform;
      a first communication interface in communication with the one or more sensors affixed to the catalyst transfer pipe; and
      non-transitory computer-readable memory of the data collection platform storing executable instructions that, when executed, cause the data collection platform to:
         receive sensor data from the one or more sensors affixed to the catalyst transfer pipe, the sensor data comprising a plurality of data points; and
         transmit the sensor data;
   a data analysis platform comprising:
      one or more processors of the data analysis platform;
      a second communication interface; and
      non-transitory computer-readable memory of the data analysis platform storing executable instructions that, when executed, cause the data analysis platform to:
         receive the sensor data from the data collection platform;
         analyze the sensor data to determine a flow rate through the catalyst transfer pipe of the plurality of catalyst transfer pipes; and
         based on analyzing the sensor data to determine the flow rate through the catalyst transfer pipe, transmit a command to adjust the flow rate through the catalyst transfer pipe; and
   a control platform comprising:
      one or more processors of the control platform;
      a third communication interface; and
      non-transitory computer-readable memory of the control platform storing executable instructions that, when executed, cause the control platform to:
         receive the command to adjust the flow rate through the catalyst transfer pipe of the plurality of catalyst transfer pipes; and
         send a command to adjust the flow rate through the catalyst transfer pipe of the plurality of catalyst transfer pipes by adjusting the control valve of the catalyst collector.

2. The system of claim 1, the non-transitory computer-readable memory of the data analysis platform storing further executable instructions that, when executed, cause the data analysis platform to:
   using the sensor data, compute a first time period of first sensor information corresponding to the catalyst transfer pipe; and determine whether the first time period differs from a second time period of second sensor information corresponding to a different catalyst transfer pipe,
wherein transmitting the command to adjust the flow rate through the catalyst transfer pipe is based on the first time period differing from the second time period by more than a first threshold.

3. The system of claim 1, the non-transitory computer-readable memory of the data analysis platform storing further executable instructions that, when executed, cause the data analysis platform to:
compute a first peak-to-valley amplitude of first sensor information corresponding to the catalyst transfer pipe; and
determine whether the first peak-to-valley amplitude differs from a second peak-to-valley amplitude of second sensor information corresponding to the catalyst transfer pipe, the second sensor information received from a same sensor as the first sensor information,
wherein transmitting the command to adjust the flow rate through the catalyst transfer pipe is based on the second peak-to-valley amplitude differing from the first peak-to-valley amplitude by more than a threshold.

4. The system of claim 1, the non-transitory computer-readable memory of the data analysis platform storing further executable instructions that, when executed, cause the data analysis platform to:
determine a mean time period corresponding to the plurality of catalyst transfer pipes; and
using the sensor data, determine whether a time period for the catalyst transfer pipe of the plurality of catalyst transfer pipes differs from the mean time period,
wherein transmitting the command to adjust the flow rate through the catalyst transfer pipe is based on the time period for the catalyst transfer pipe differing from the mean time period by more than a first threshold.

5. The system of claim 4, wherein transmitting the command to adjust the flow rate through the catalyst transfer pipe is further based on the time period for the catalyst transfer pipe differing from the mean time period by more than the first threshold for more than a threshold number of cycles.

6. The system of claim 4, the non-transitory computer-readable memory of the data analysis platform storing further executable instructions that, when executed, cause the data analysis platform to:
using the sensor data, determine whether time periods respectively corresponding to a majority of the plurality of catalyst transfer pipes differ from the mean time period by more than the first threshold,
wherein transmitting the command to adjust the flow rate through the catalyst transfer pipe is based on the time periods respectively corresponding to the majority of the plurality of catalyst transfer pipes not differing from the mean time period by more than the first threshold.

7. The system of claim 1, wherein adjusting the flow rate comprises increasing a pressure differential across the catalyst transfer pipe, the pressure differential determined based on a first pressure at an inlet of the catalyst transfer pipe and a second pressure at an outlet of the catalyst transfer pipe.

8. The system of claim 1, the non-transitory computer-readable memory of the data analysis platform storing further executable instructions that, when executed, cause the data analysis platform to:
based on the analyzed sensor data, trigger an alarm to indicate that the catalyst transfer pipe is plugging.

9. The system of claim 1, the non-transitory computer-readable memory of the data analysis platform storing further executable instructions that, when executed, cause the data analysis platform to:
generate, for display, a representation of one or more of the plurality of catalyst transfer pipes; and
in response to determining that the catalyst transfer pipe of the plurality of catalyst transfer pipes is experiencing plugging, update the representation of the plurality of catalyst transfer pipes to visually show that the catalyst transfer pipe of the plurality of catalyst transfer pipes is experiencing plugging.

10. The system of claim 1, wherein the one or more sensors comprise a pressure sensor.

11. The system of claim 1, wherein the one or more sensors comprise a flow sensor.

12. The system of claim 1, wherein the one or more sensors comprise a temperature sensor.

13. The system of claim 2, the non-transitory computer-readable memory of the data analysis platform storing further executable instructions that, when executed, cause the data analysis platform to:
compute a first peak-to-valley amplitude of the first sensor information corresponding to the catalyst transfer pipe; and
determine whether the first peak-to-valley amplitude differs from a second peak-to-valley amplitude of third sensor information corresponding to the catalyst transfer pipe, the third sensor information received from a same sensor as the first sensor information,
wherein transmitting the command to adjust the flow rate through the catalyst transfer pipe is based on the second peak-to-valley amplitude differing from the first peak-to-valley amplitude by more than a second threshold.

14. The system of claim 13, wherein transmitting the command to adjust the flow rate through the catalyst transfer pipe is further based on the second peak-to-valley amplitude differing from the first peak-to-valley amplitude by more than the second threshold for more than a threshold number of cycles.

15. The system of claim 2, the non-transitory computer-readable memory of the data analysis platform storing further executable instructions that, when executed, cause the data analysis platform to:
determine a mean time period corresponding to the plurality of catalyst transfer pipes; and
using the sensor data, determine whether a time period for the catalyst transfer pipe of the plurality of catalyst transfer pipes differs from the mean time period,
wherein transmitting the command to adjust the flow rate through the catalyst transfer pipe is based on the time period for the catalyst transfer pipe differing from the mean time period by more than a second threshold.

16. The system of claim 15, the non-transitory computer-readable memory of the data analysis platform storing further executable instructions that, when executed, cause the data analysis platform to:
using the sensor data, determine whether time periods respectively corresponding to a majority of the plurality of catalyst transfer pipes differ from the mean time period by more than the second threshold,
wherein transmitting the command to adjust the flow rate through the catalyst transfer pipe is based on the time periods respectively corresponding to the majority of the plurality of catalyst transfer pipes not differing from the mean time period by more than the second threshold.

17. The system of claim 2, the non-transitory computer-readable memory of the data analysis platform storing further executable instructions that, when executed, cause the data analysis platform to:
- using the sensor data, compute a reference peak-to-valley amplitude for each sensor respectively corresponding to each catalyst transfer pipe of the plurality of catalyst transfer pipes;
- determine whether the reference peak-to-valley amplitude for each sensor respectively corresponding to each catalyst transfer pipe of the plurality of catalyst transfer pipes differs from a next cycle peak-to-valley amplitude for each sensor respectively corresponding to each catalyst transfer pipe of the plurality of catalyst transfer pipes; and
- determine whether a plurality of reference peak-to-valley amplitudes respectively differ from a plurality of next cycle peak-to-valley amplitudes for each sensor respectively corresponding to each catalyst transfer pipe of the plurality of catalyst transfer pipes,
- wherein transmitting the command to adjust the flow rate through the catalyst transfer pipe of the plurality of catalyst transfer pipes is based on a particular reference peak-to-valley amplitude for a particular sensor that corresponds to the catalyst transfer pipe of the plurality of catalyst transfer pipes differing from a particular next cycle peak-to-valley amplitude for the particular sensor that corresponds to the catalyst transfer pipe by more than a second threshold, while the plurality of reference peak-to-valley amplitudes do not respectively differ from the plurality of next cycle peak-to-valley amplitudes for each sensor respectively corresponding to each catalyst transfer pipe of the plurality of catalyst transfer pipes.

18. The system of claim 2, wherein transmitting the command to adjust the flow rate through the catalyst transfer pipe is further based on the first time period differing from the second time period by more than the first threshold for more than a threshold number of cycles.

19. The system of claim 1, the non-transitory computer-readable memory of the data analysis platform storing further executable instructions that, when executed, cause the data analysis platform to:
- based on analyzing the sensor data, determine that the catalyst transfer pipe of the plurality of the catalyst transfer pipes is plugging; and
- send, to a remote device, an alert indicating that the catalyst transfer pipe of the plurality of the catalyst transfer pipes is plugging, the remote device different from the data collection platform, the data analysis platform, and the control platform.

20. The system of claim 1, wherein the solid catalyst comprises dehydrogenation catalyst.

* * * * *